US008236446B2

(12) United States Patent  
Lu

(10) Patent No.: US 8,236,446 B2  
(45) Date of Patent: Aug. 7, 2012

(54) HIGH PERFORMANCE BATTERIES WITH CARBON NANOMATERIALS AND IONIC LIQUIDS

(75) Inventor: Wen Lu, Littleton, CO (US)

(73) Assignee: ADA Technologies, Inc., Littleton, CO (US)

( * ) Notice: Subject to any disclaimer, the term of this patent is extended or adjusted under 35 U.S.C. 154(b) by 521 days.

(21) Appl. No.: 12/412,047

(22) Filed: Mar. 26, 2009

(65) Prior Publication Data

US 2009/0246625 A1 Oct. 1, 2009

Related U.S. Application Data

(60) Provisional application No. 61/039,683, filed on Mar. 26, 2008.

(51) Int. Cl.  
H01M 4/02 (2006.01)  
H01M 4/13 (2006.01)

(52) U.S. Cl. ............... 429/209; 429/218.1; 429/231.5; 429/231.8; 977/742; 977/743

(58) Field of Classification Search .......... 429/209, 429/218.1, 231.8, 231.2, 231.4, 231.5, 231.9, 429/231.95; 29/623.1; 977/734, 742, 743, 977/750, 752  
See application file for complete search history.

(56) References Cited

U.S. PATENT DOCUMENTS

| 4,603,165 A | 7/1986 | McDonald et al. |
| 5,908,715 A | 6/1999 | Liu et al. |
| 6,096,453 A | 8/2000 | Grunwald |
| 6,235,433 B1 | 5/2001 | Amano et al. |
| 6,268,088 B1 | 7/2001 | Oh et al. |
| 6,283,812 B1 | 9/2001 | Jin et al. |
| 6,396,682 B1 | 5/2002 | Kim et al. |
| 6,503,660 B2 | 1/2003 | Baker et al. |
| 6,563,694 B2 | 5/2003 | Kim et al. |
| 6,667,825 B2 | 12/2003 | Lu et al. |
| 6,726,732 B2 | 4/2004 | Kim et al. |
| 6,790,425 B1 | 9/2004 | Smalley et al. |
| 6,828,062 B2 | 12/2004 | Lu et al. |
| 6,939,453 B2 | 9/2005 | Anderson et al. |
| 6,991,876 B2 | 1/2006 | Narang et al. |
| 7,061,749 B2 | 6/2006 | Liu et al. |
| 7,147,966 B2 * | 12/2006 | Ren et al. ............... 429/209 |

(Continued)

FOREIGN PATENT DOCUMENTS

DE 19829030 10/1999

(Continued)

OTHER PUBLICATIONS

V. L. Pushparaj, M. M. Shaijumon, A. Kumar, S. Murugesan, L. Ci, R. Vajtai, R. J. Linhardt, O. Nalamasu, and P. M. Ajayan. Flexible energy storage devices based on nanocomposite paper, PNAS 2007, 104(34), 13574-13577.*

(Continued)

Primary Examiner — Jerry Lorengo  
Assistant Examiner — Carlos Barcena  
(74) Attorney, Agent, or Firm — Sheridan Ross, PC

(57) ABSTRACT

The present invention is directed to lithium-ion batteries in general and more particularly to lithium-ion batteries based on aligned graphene ribbon anodes, $V_2O_5$ graphene ribbon composite cathodes, and ionic liquid electrolytes. The lithium-ion batteries have excellent performance metrics of cell voltages, energy densities, and power densities.

37 Claims, 32 Drawing Sheets

U.S. PATENT DOCUMENTS

| | | | |
|---|---|---|---|
| 7,157,588 | B2 | 1/2007 | Harmer et al. |
| 7,238,772 | B2 | 7/2007 | Harmer et al. |
| 7,283,349 | B2 | 10/2007 | Yoshida et al. |
| 7,297,289 | B2 | 11/2007 | Sato et al. |
| 7,505,250 | B2 | 3/2009 | Cho et al. |
| 7,648,406 | B2 | 1/2010 | Tai et al. |
| 2001/0024352 | A1 | 9/2001 | Kim et al. |
| 2001/0030847 | A1 | 10/2001 | Kim et al. |
| 2003/0077515 | A1 | 4/2003 | Chen et al. |
| 2004/0094741 | A1 | 5/2004 | Sato et al. |
| 2004/0167014 | A1 | 8/2004 | Yan et al. |
| 2004/0191617 | A1 | 9/2004 | Visco et al. |
| 2005/0040090 | A1 | 2/2005 | Wang et al. |
| 2005/0042450 | A1 | 2/2005 | Sano et al. |
| 2005/0081983 | A1 | 4/2005 | Nakayama et al. |
| 2005/0103706 | A1 | 5/2005 | Bennett et al. |
| 2005/0175894 | A1 | 8/2005 | Visco et al. |
| 2005/0221193 | A1 | 10/2005 | Kinouchi et al. |
| 2005/0231785 | A1 | 10/2005 | Oh et al. |
| 2005/0231891 | A1 | 10/2005 | Harvey |
| 2006/0078790 | A1 | 4/2006 | Nimon et al. |
| 2006/0100323 | A1 | 5/2006 | Schmidt et al. |
| 2006/0120021 | A1 | 6/2006 | Banno et al. |
| 2006/0203322 | A1 | 9/2006 | Radmard et al. |
| 2006/0226396 | A1* | 10/2006 | Majumdar et al. ............ 252/500 |
| 2006/0238957 | A1 | 10/2006 | Mitsuda et al. |
| 2006/0257645 | A1 | 11/2006 | Asaka et al. |
| 2007/0021569 | A1 | 1/2007 | Willis et al. |
| 2007/0031729 | A1 | 2/2007 | Sato et al. |
| 2007/0153353 | A1 | 7/2007 | Gruner |
| 2007/0201184 | A1 | 8/2007 | Plee et al. |
| 2007/0258192 | A1 | 11/2007 | Schindall et al. |
| 2008/0063585 | A1 | 3/2008 | Smalley et al. |
| 2008/0138700 | A1 | 6/2008 | Horpel et al. |
| 2008/0192407 | A1 | 8/2008 | Lu et al. |
| 2008/0212261 | A1* | 9/2008 | Ajayan et al. ................ 361/502 |
| 2010/0021819 | A1 | 1/2010 | Zhamu et al. |

FOREIGN PATENT DOCUMENTS

| | | |
|---|---|---|
| EP | 1198022 | 4/2002 |
| EP | 1380569 | 1/2004 |
| EP | 1548751 | 6/2005 |
| EP | 1672651 | 6/2006 |
| JP | 2003-234254 | 8/2003 |
| JP | 2008-016769 | 1/2008 |
| WO | WO 02/053808 | 7/2002 |
| WO | WO 02/063073 | 8/2002 |
| WO | WO 03/012896 | 2/2003 |
| WO | WO 2005/038962 | 4/2005 |
| WO | WO 2005/083829 | 9/2005 |
| WO | WO 2005/104269 | 11/2005 |
| WO | WO 2005/116161 | 12/2005 |
| WO | WO 2006/137893 | 12/2006 |
| WO | WO 2007/010039 | 1/2007 |
| WO | WO 2007/010042 | 1/2007 |
| WO | WO 2008/016990 | 2/2008 |

OTHER PUBLICATIONS

I.-H. Kim, J.-H. Kim, B.-W. Cho, and K.-B. Kim. Pseudocapacitive Properties of Electrochemically Prepared Vanadium Oxide on Carbon Nanotube Film Substrate, J. Electrochem. Soc. 2006, 153(8), A1451-1458.*

Huang et al., "Plasma Etching for Purification and Controlled Opening of Aligned Carbon Nanotubes," J. Phys. Chem. B, 2002, vol. 106(14), pp. 3543-3545.

Tsai et al., "Bias-enhanced nucleation and growth of the aligned carbon nanotubes with open ends under microwave plasma synthesis," Applied Physics Letters, Jun. 1999, vol. 74(23), pp. 3462-3464.

International Preliminary Report on Patentability for International (PCT) Application No. PCT/US2009/038415, mailed Oct. 7, 2010.

Signorelli et al. "Nanotube Enhanced Ultracapacitors," Dec. 6-8, 2004, 13 pages.

U.S. Appl. No. 12/435,992, filed May 5, 2009, Lu et al.

"High-power lithium-ion (BU5A)", BatteryUniversity.com Website, as early as Mar. 16, 2006, available at http://batteryuniversity.com/partone-5A.htm, printed on Apr. 28, 2009, pp. 1-7.

"File: Carbon nanorim armchair povray.PNG", Wikimedia Commons Website, as early as Nov. 27, 2007, available at http://commons.wikimedia.org/wiki/File:Carbon_nanorim_armchair_povray.PNG, printed on Jun. 18, 2009, pp. 1-5.

"File: Carbon nanorim armchair povray.PNG", Wikimedia Commons Website, as early as Nov. 27, 2007, available at http://commons.wikimedia.org/wiki/File:Carbon_nanotube_armchair_povray.PNG, printed on Jun. 18, 2009, pp. 1-5.

"File: Types of Carbon Nanotubes.png", Wikipedia website, as early as May 2006, available at http://en.wikipedia.org/wiki/File:Types_of_Carbon_Nanotubes.png, printed on Jun. 26, 2009, pp. 1-5.

Srinivasan, et al., "A Model-based Comparison of Various Li-ion Chemistries", Prepared for Berkeley Electrochemical Research Council, as early as May 1, 2006, available at http://berc.lbl.gov/venkat/Ragone-construction.pps, pp. 1-17.

Covalent Associates, Inc. home page, as early as Sep. 14, 2000, available at www.covalentassociates.com, pp. 1-2, printed on Jun. 19, 2009.

"Ionic Liquids", description on Solvant-innovation website, as early as Feb. 1, 2001, http://web.archive.org/web/20010203174200/www.solvent-innovation.com/Englisch/index2.htm, pp. 1-2, printed on Jun. 19, 2009.

Solvant-Innovation Home Page, as early as Feb. 1, 2001, available at http://web.archive.org/web/20010203174200/www.solvent-innovation.com/Englisch/index2.htm, pp. 1-2, printed on Jun. 19, 2009.

"Nanobatteries", Wikipedia website, as early as Dec. 26, 2007, available at http://en.wikipedia.org/wikilNanobatteries, pp. 1-2, printed on Jun. 19, 2009.

Burke, "Ultracapicitors: why, how, and where is the technology", Journal of Power Sources, 2000, vol. 91, pp. 37-50.

Conway, "Transition from 'Supercapacitor' to 'Battery' Behavior in Electrochemical Energy Storage", J. Electrochem Soc., Jun. 1991, vol. 138, No. 6, pp. 1539-1548.

Conway, et al., "Double-layer and pseudocapacitance types of electrochemical capacitors and their applications to the development of hybrid devices", J Solid State Electrochem, vol. 7, 2003, pp. 637-644.

Cottineau, et al., "Nanostructured transition metal oxides for aqueous hybrid electrochemical supercapacitors", Appl. Phys. A, 2006, vol. 82, pp. 599-606.

Croce, et al., "Sythesis and Characterization of Highly Conducting Gel Electrolytes", Electrochimica Acta, 1994, vol. 39, No. 14, pp. 2187-2194.

Duong, "2002 Annual Progress Report for Energy Storage Research and Development, FreedomCAR & Vehicle Technologies Program", Energy Storage Research & Development, U.S. DOE, May 2003, pp. 1-178.

Freemantle, "Designer Liquids in Polymer Systems: Versataile and advantageous, ionic liquids are beginning to create waves in polymer science", Chemical and Engineering News, May 3, 2004, vol. 82, No. 18, pp. 26-29, printed Jan. 26, 2009.

Herring, et al., "A Novel Method for the Templated Synthesis of Homogeneous Samples of Hollow Carbon Nanospheres from Cellulose Chars", Journal of the American Chemical Society, 2003, vol. 125, No. 33, pp. 9916-9917.

Jiang, et al., "Electrochemical supercapacitor material based on manganese oxide: preparation and characterization", Electrochimica Acta, 2002, vol. 47, pp. 2381-2386.

Kalhammer, et al., Status and Prospects for Zero Emissions Vehicle Technology: Report of the ARB Independent Expert Panel 2007, Prepared for the State of California Air Resources Board, Sacramento, California, Apr. 13, 2007, available at http://www.arb.ca.gov/msprog/zevprog/zevreview/zev_panel_report.pdf.

Kubota, et al., "Ionically conductive polymer gel electrolytes prepared from vinyl acetate and methyl methacrylate for electric double layer capacitor", Journal of Applied Polymer Science, 2000, vol. 76, pp. 12-18.

Lee, et al., "Ideal Supercapacitor Behavior of Amorphous $V_2O_5 \cdot nH_2O$ in Potassium Chloride (KCl) Aqueous Solution", Journal of Solid State Chemistry, 1999, vol. 148, pp. 81-84.

Lewandowski, et al., "Carbon-ionic liquid double-layer capacitors", Journal of Physics and Chemistry of Solids, Mar. 2004, vol. 65, Nos. 2-3, pp. 281-286.

Lu, et al., "High Performance Electrochemical Capacitors from Aligned Carbon Nanotube Electrodes and Ionic Liquid Electrolytes", Journal of Power Sources, Apr. 15, 2009, vol. 189, No. 2, pp. 1270-1277.

Lu, et al., "Ionic Liquid-Incorporated Gel Polymer Electrolytes for Ultracapacitors" submitted to 209th Electrochemical Society Meeting held May 7-12, 2006 in Denver, CO (Abstract).

Lu, et al., "Ionic Liquid-Incorporated Gel Polymer Electrolytes for Ultracapacitors", Presented to the 209th Electrochemical Society Meeting held May 7-12, 2006, Denver, CO, pp. 1-23 (PowerPoint Presentation).

Lu, et al., "Ionic Liquid-Incorporated Gel Polymer Electrolytes for Ultracapacitors", ECS Transactions, 2007, vol. 2, No. 28, pp. 15-26.

Lu, et al., "Superior Capacitive Performance of Aligned Carbon Nanotubes in Ionic Liquids", Manuscript submitted to ECS Transactions for consideration of publication, Jun. 15, 2007, pp. 1-5.

Lu, et al., "Superior Capacitive Performance of Aligned Carbon Nanotubes in Ionic Liquids", The 211th ECS Meeting, Chicago, Illinois, May 6-11, 2007, abstract only, p. 1.

Lu, et al., "Ultra-efficient Supercapacitors from Aligned Carbon Nanotubes and Ionic Liquids", Manuscript submitted to Science for consideration of publication , Jun. 13, 2007, pp. 1-31.

McEwen, et al., "EMIPF6 Based Nonaqueous Electrolytes for Electrochemical Capacitors", Electrochemical Society Proceedings, 1997, vol. 96-25, pp. 313-324.

Niu, et al., "High power electrochemical capacitors based on carbon nanotube electrodes", Appl. Phys. Lett., Mar. 17, 1997, vol. 70, No. 11, pp. 1480-1482.

Osaka, et al., "An Electrochemical Double Layer Capacitor Using an Activated Carbon Electrode with Gel Electrolyte Binder", Journal of the Electrochemical Society, 1999, vol. 146, No. 5, pp. 1724-1729.

Portet, et al., "High power density electrodes for Carbon supercapacitor applications", Electrochimica Acta, vol. 50, 2005, pp. 4174-4181.

Slane, et al., "Composite gel electrolyte for rechargeable lithium batteries", Journal of Power Sources, 1995, vol. 55, pp. 7-10.

Song et al., "Review of Gel-Type Polymer Electrolytes for Lithium-Ion Batteries", J. Power Sources, 77 (1999) 183.

Sung, et al., "Preparation and Characterization of Poly(vinyl chloride-co-vinyl acetate)-Based Gel Electrolytes for Li-Ion Batteries", Journal of the Electrochemical Society, Apr. 1988, vol. 145, No. 4, pp. 1207-1211.

Tarascon et al., "Performance of Bellcore's Plastic Rechargeable Li-Ion Batteries", Solid State Ionics, 86-88 (1996) 49-54.

Watanabe, et al., "High Lithium Ionic Conductivity of Polymeric Solid Electrolytes", Makromol. Chem. Rapid. Commun., 1981, vol. 2, pp. 741-744.

Kim, et al., "Synthesis and Electrochemical Characterization of Vanadium Oxide on Carbon Nanotube Film Substrate for Pseudocapacitor Applications", Journal of the Electrochemical Society, 2006, vol. 153, No. 6, pp. A989-A996.

Perebeinos, et al., "Electron-Phonon Interaction and Transport in Semiconducting Carbon Nanotubes", Physical Review Letters—The American Physical Society, Mar. 4, 2005, vol. 94, pp. 086802-1-086802-4.

International Search Report for International (PCT) Patent Application No. PCT/US09/38415, mailed Aug. 13, 2009.

Written Opinion for International (PCT) Patent Application No. PCT/US09/38415, mailed Aug. 13, 2009.

Ionic Liquids Product Range, EMD, Apr. 25, 2006, 12 pages found @ http://www.emdchemicals.com/showBrochure?id=200904.3312.

U.S. Appl. No. 13/113,971, filed May 23, 2011, Lu et al.

* cited by examiner

HIGH PERFORMANCE BATTERIES WITH CARBON NANOMATERIALS AND IONIC LIQUIDS

CROSS REFERENCE TO RELATED APPLICATION

The present application claims the benefits of U.S. Provisional Application Ser. No. 61/039,683, filed Mar. 26, 2008, entitled "Advanced Lithium-Ion Nanobatteries", which is incorporated herein by this reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. DE-FG02-05ER84218 awarded by the Department of Energy and IIP-0740507 awarded by the National Science Foundation.

FIELD OF THE INVENTION

The invention relates generally to electrochemical devices and particularly to electrochemical lithium-ion batteries.

BACKGROUND OF THE INVENTION

A battery is an electrochemical storage device, which stores electrochemical energy for later release as electrical energy. Batteries can be either primary or secondary batteries. A primary battery irreversibly consumes at least one chemical entity in the process of producing electrical energy, while a secondary battery reversibly consumes at least one chemical entity. In the secondary battery, the consumed chemical entity is restored (or converted) to its original chemical state by supplying electrical energy to the battery. The restoring of the consumed chemical entity to its original state, is typically referred to as re-charging. The electrical energy is supplied to the battery from another source.

Lithium-ion batteries are a type of secondary batteries. A lithium-ion battery has three main components: an anode, a cathode, and an electrolyte. The anode is typically made of graphite, while the cathode is typically made a one of the following: a layered oxide (such as lithium cobalt oxide), a polyanion (such as lithium iron phosphate) or a spinel (such as, lithium manganese oxide).

The electrolyte is typically an organic solvent containing a lithium salt. The electrolyte carries the electrical current (that is, carries lithium cations [Li$^+$]) between the cathode and anode when the lithium-ion battery is being charged or discharged. Organic solvents (such as, ethers) are used, instead of water, since lithium-ion battery voltages are generally greater than the potential at which water electrolyzes. Common lithium salts used within the electrolyte are: Li[PF$_6$], Li[BF$_4$] AND Li[ClO$_4$]. Optionally, the electrolyte also contains a solid electrolyte interphase forming material, which forms a solid layer called the solid electrolyte interphase (SEI). The solid electrolyte interphase layer is typically formed during the first battery charging. The SEI layer, while still sufficiently conductive to lithium ions, is electrically insulating and prevents further decomposition of the electrolyte after the first battery charging. Ethylene carbonate is an example of a solid electrolyte interphase forming material.

During the charging and discharging processes lithium-ions migrate into and/or out of the anode and cathode. The process of the lithium-ions migrating into the anode or cathode is referred to as intercalation. And, the process of the lithium-ion moving out of the anode or cathode is referred to as de-intercalation. During lithium-ion battery discharge, lithium-ions are de-intercalated (that is, extracted) from the anode and intercalated (that is, inserted) into the cathode. And, when the lithium-ion battery is charged, the lithium-ions are intercalated into the anode and de-intercalated from the cathode. Useful electrical work is provided when electrons flow from the lithium-ion battery through an external electrical circuit connected to the lithium-ion battery.

Electrons are generated or consumed by the anodic and cathodic half-cells. More specifically, electrons are generated when the metal oxide-containing cathode is oxidized and lithium-ions are de-intercalated during charging. The cathodic half-cell reaction is illustrated by the chemical equation (1), as follows:

$$\text{LiMO} \rightleftharpoons \text{Li}_{(1-x)}\text{MO} + x\text{Li}^+ + xe^- \qquad (1)$$

where MO denotes a metal-containing oxide (such as, CoO$_2$, MnO$_2$, and FePO$_4$). Equation (1), as written, depicts the cathodic charging process. More specifically, the metal oxide (MO) is oxidized during charging from MO$^{n+}$ to MO$^{(1+1)+}$ and reduced during discharging from MO$^{(n+1)+}$ to MO$^{n+}$. The reverse of equation (that is, the process proceeding from right-to-left) depicts the cathodic charging process, where electrons are consumed when the metal oxide-containing cathode is reduced and lithium-ions are intercalated.

The anodic half-cell reaction can be illustrated by chemical equation (2), as follows:

$$x\text{Li}^+ + xe^- + \text{AM} \rightleftharpoons \text{Li}x(\text{AM}) \qquad (2)$$

where AM represents the anodic material, such as graphite.

The internal resistance, voltage, energy density, power density, lifetime and safety level of the lithium-ion battery is substantially determined by the anode, cathode and electrolyte of the lithium-ion battery. The lithium-ion battery specific energy density can range from about 150 to about 200 Wh/kg. And, the specific power density can range from about 300 to 1,500 W/kg. The nominal cell voltage of the lithium-ion battery can range from about 3.0 to about 4.0 volts. The internal resistance of a typical lithium-ion cell is from about 250 mOhn to about around 450 mOhm.

As lithium-ion battery applications expand from small consumer electronic applications (such as, hearing aids) into larger consumer electronic (such as, laptops, cell phones, and hand-help electronic devices) and into even more demanding military, automotive, and aerospace applications, greater cycle life and performance improvements are needed. Specifically, improvements in power output and decreased internal resistance will be needed. In other words, more active anode, cathode and/or electrolytes are needed to produce lithium-ion batteries having improved energy-to-weight ratios, less maximum energy capacity loss, and a slower loss of charge during storage. More specifically, for lithium-ion batteries, an increase of power density without a decrease of energy density is needed. This means that a high power lithium-ion battery with a high-energy storage capacity is required. This has been a long sought after solution within battery technology for high-power battery applications in the areas of transportation technologies, uninterruptable power systems, and power tools, where high charge/discharge rates are required.

SUMMARY OF THE INVENTION

These and other needs are addressed by the various embodiments and configurations of the present invention.

The present invention is directed generally to the use of graphene nano-ribbons and/or ionic liquid electrolytes in electrochemical devices, particularly to lithium ion-batteries. As will be appreciated, graphene (or graphite) nano-ribbons can be in many shapes, including sheets and cylinders (known as nanotubes) and be concentrically disposed with other graphene nano-ribbons (e.g., multi-walled nanotubes).

In a first embodiment, an electrochemical battery is provided that includes:
(a) an anodic electrode;
(b) a cathodic electrode; and
(c) an electrolyte material positioned between and in contact with the anodic and cathodic electrodes.

One or both of the anodic and cathodic electrodes includes a number of graphene nano-ribbons. The graphene nano-ribbons include a number of carbon atoms. Most, if not all, of the carbon atoms in the graphene nano-ribbons include sp2 hybridized carbon. The graphene nano-ribbons are positioned adjacent to and/or in contact with the one or both of the anodic and cathodic electrodes, and most, if not all, of the graphene nano-ribbons are substantially aligned with one another.

In a second embodiment, an electrochemical battery includes:
(a) an ionic liquid electrolyte;
(b) first and second sets of aligned carbon nanotubes;
(c) an anode including the first set of carbon nanotubes;
(d) a cathode including the second set of carbon nanotubes, and
(e) a microporous membrane separator, with the ionic liquid and microporous membrane separator being positioned between the anode and cathode.

In a third embodiment, a method of discharging a battery includes the steps:
(a) de-intercalating ions from aligned carbon nano-ribbons in an anode;
(b) passing the ions through an electrolyte and microporous membrane separator; and
(c) intercalating the ions in aligned carbon nano-ribbons in a cathode.

In a fourth embodiment, a method of charging a battery includes the steps of:
(a) de-intercalating ions from aligned carbon nano-ribbons in the cathode;
(b) passing the ions through the electrolyte and microporous membrane separator; and
(c) intercalating the ions in aligned carbon nano-ribbons in the anode.

In one configuration, the graphene nano-ribbons are substantially flat. The substantially flat graphene nano-ribbons are preferably aligned substantially parallel to one another.

In another configuration, the graphene nano-ribbons are in the form of nanotubes. The carbon nanotubes can be plasma etched to open the free ends of the nanotubes, thereby exposing more surface area for ionic intercalation. The carbon nanotubes are preferably hollow and have a diameter of about 3 nm to about 50 nm. The preferred carbon nanotube length ranges from about 20 μm to about 1,000 μm. The specific surface area of the nanotubes, on a mass basis, is preferably greater than about 200 m² per gram, even more preferably at least about 600 m² per gram, and even more preferably at least about 800 m² per gram.

The highly conductive nature of the graphene nano-ribbons can provide a high charge transport capability. The electron mobility of the nanotubes is typically about 15,000 $cm^2V^{-1}s^{-1}$ or greater.

In either configuration, the electrochemical energy storage device can have desirable properties. The graphene ribbon mass loading on the electrode ranges preferably from about 0.1 to about 4.5 mg per $cm^2$ of the electrode surface. The total graphene surface area on the electrode typically ranges from about 250 to about 10,000 $cm^2$ per $cm^2$ of the electrode. The spacing between substantially parallel, oriented nearest neighbor graphene ribbons commonly ranges from about 10 to about 250 nm. The graphene ribbon electron mobility is frequently about 15,000 $cm^2V^{-1}s^{-1}$ or greater. In a preferred configuration, the anode and/or cathode has a lithium-ion intercalation and/or de-intercalation value preferably of about 200 mAh/g or greater, even more preferably of about 600 mAh/g or greater, and even more preferably of about 700 mAh/g or greater.

In another configuration, the nano-ribbons in the cathode have a continuous or discontinuous metal oxide thin film. Vanadium oxide is a preferred metal oxide. The vanadium oxide coating thickness ranges from about 1 to about 100 nm. The capacity of the vanadium coated carbon nanotubes is commonly at least about 400 mAh per gram of vanadium oxide. Preferably, the cathode has a capacity of about 500 mAh per gram of vanadium oxide. Nano-structured large-surface-area substrate cathodic electrodes can apply a large amount of active materials (as thin films) on the electrode to overcome limits imposed by diffusion on the depth of penetration of ion ($Li^+$) intercalation.

In one configuration, an ionic liquid electrolyte is positioned between first and second electrodes. Preferably, the ionic liquid includes:
(A) at least one cation selected from the group consisting essentially of the following compounds and mixtures thereof:

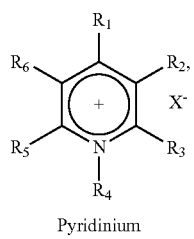
Pyridinium

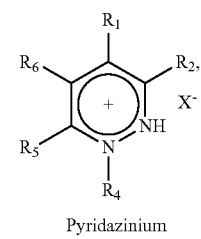
Pyridazinium

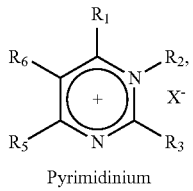
Pyrimidinium

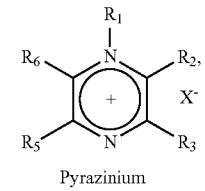
Pyrazinium

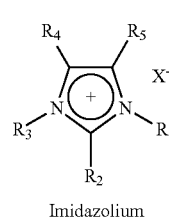
Imidazolium

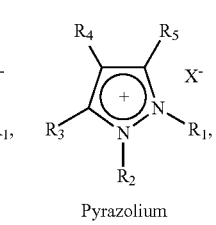
Pyrazolium

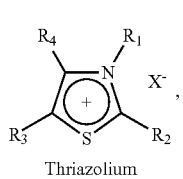
Thriazolium

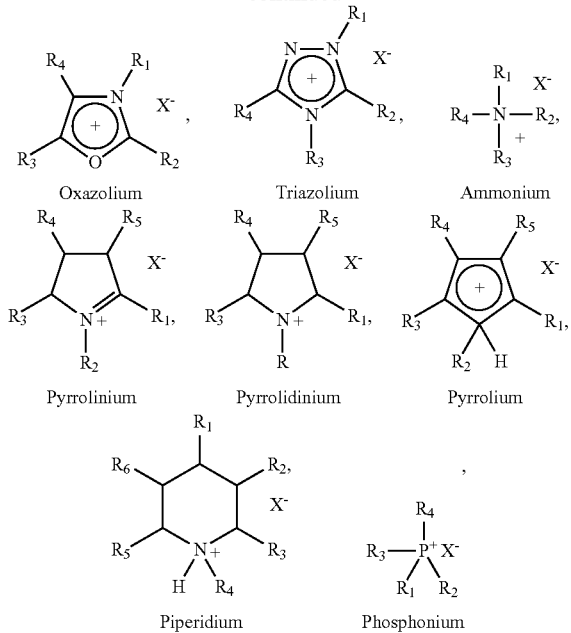

Oxazolium    Triazolium    Ammonium
Pyrrolinium    Pyrrolidinium    Pyrrolium
Piperidium    Phosphonium wherein $R_1$, $R_2$, $R_3$, $R_4$, $R_5$, and $R_6$ of the cationic components are identical or different and are selected from the group consisting essentially of:
(i) a hydrogen;
(ii) a halogen;
(iii) a hydroxyl;
(iv) an amine;
(v) a thiol;
(vi) a $C_1$ to $C_{25}$ straight-chain, branched aliphatic hydrocarbon radical;
(vii) a $C_5$ to $C_{30}$ cycloaliphatic hydrocarbon radical;
(viii) a $C_6$ to $C_{30}$ aromatic hydrocarbon radical;
(ix) a $C_7$ to $C_{40}$ alkylaryl radical;
(x) a $C_2$ to $C_{25}$ linear or branched aliphatic hydrocarbon radical having interruption by one or more heteroatoms, such as, oxygen, nitrogen or sulfur;
(xi) a $C_2$ to $C_{25}$ linear or branched aliphatic hydrocarbon radical having interruption by one or more functionalities selected from the group consisting essentially of:
(a') a carbonyl;
(b') an ester;
(c') an amide, where R' selected from the group consisting essentially of hydrogen, $C_1$-$C_{12}$ straight-chain, branched or cyclic alkane or alkene;
(d') a sulfonate;
(e') a sulfonamide, where R' selected from the group consisting essentially of hydrogen, $C_1$-$C_{12}$ straight-chain, branched or cyclic alkane or alkene;
(xii) a $C_2$ to $C_{25}$ linear or branced aliphatic hydrocarbon radical terminally functionalized by Cl, Br, F, I, NH, OH, $NH_2$, $NHCH_3$ or SH;
(xiii) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH;
(xiv) a $C_7$ to $C_{40}$ alkylaryl radical heteroatom selected from the group consisting essentially of O, N, S, and optionally substituted with at least one of the following:

(a'') a $C_2$ to $C_{25}$ straight-chain, branched hydrocarbon radical substituted with at least one of the following Cl, Br, F, I, NH, OH, $NH_2$, $NHCH_3$ or SH;
(b'') a $C_5$ to $C_{30}$ cycloaliphatic hydrocarbon radical substituted with at least one of the following Cl, Br, F, I, NH, OH, $NH_2$, $NHCH_3$ or SH
(c'') a hydroxyl;
(d'') an amine;
(e'') a thiol;
(xv) a polyether of the type —O—(—$R_7$—O—)$_n$—$R_8$ or block or random type —O—(—$R_7$—O—)$_n$—(—$R_{7'}$—O—)$_m$—$R_8$, wherein at least of the following is true:
(a''') $R_7$ is a linear or branched hydrocarbon radical having from 2 to 4 carbon atoms;
(b''') $R_{7'}$ is a linear or branched hydrocarbon radical having from 2 to 4 carbon atoms; and
(c''') wherein n is from 1 to 40; and
(d''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and
(xvi) a polyether of the type —O—(—$R_7$—O—)$_n$—C(O)—$R_8$ or block or random type —O—(—$R_7$—O—)$_n$—(—$R_{7'}$—O—)$_m$—C(O)—$R_8$, wherein at least of the following is true:
(a'''') $R_7$ is a linear or branched hydrocarbon radical having from 2 to 4 carbon atoms;
(b'''') $R_{7'}$ is a linear or branched hydrocarbon radical having from 2 to 4 carbon atoms; and
(c'''') wherein n is from 1 to 40; and
(d'''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and
(B) at least one anion selected from the group consisting essentially of $F^-$; $Cl^-$; $Br^-$; $I^-$; $NO_3^-$; $N(CN)_2^-$; $BF_4^-$; $ClO_4^-$; $PF_6^-$; $RSO_3^-$; $RCOO^-$; where R is an alkyl group, substituted alkyl group, or phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $CF_3CF_2(CF_3)_2CO^-$, $(CF_3SO_2^-)_2CH^-$, $(SF_5)_3C^-$, $(CF_3SO_2)_3C^-$, $[O(CF_3)_2C_2(CF_3)_2O]_2PO^-$, $CF_3(CF_2)_7SO_3^-$, and mixtures thereof.

Preferably, the ionic liquid has a melting point of no more than about 100 degrees Celsius, a decomposition temperature of at least about 200 degrees Celsius, a viscosity of no more than about 200 Cp, an ionic conductivity of at least about 0.01 mS/cm, and an electrochemical window of at least about 4 Volts.

The electrolyte can include a polymer host selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof. Preferably, the molar ratio of ionic liquid to polymer host ranges from about 0.1:1 to about 10:1.

Optionally, the battery includes a membrane separator. The membrane separator is a highly-porous membrane having a thickness from about 2 μm to about 200 μm. Preferably, the membrane separator is fully wettable by at least one of a hydrophobic and a hydrophilic ionic liquid.

The various embodiments can have a number of advantages. By way of illustration, aligned nano-ribbons, particularly carbon nanotubes, can provide high electrical conductivity, high charge transport capability, high mesoporosity, and high electrolyte accessibility. This can ensure a high charge/discharge rate capability for both the aligned graphene nano-ribbons in the anode and the metal oxide-coated, aligned graphene nano-ribbon composite cathode. The electrochemical energy storage device disclosed herein can overcome the problem posed by the relatively high viscosity of ionic liquids (when compared to conventional aqueous and organic electrolytes) to provide a high energy storage/delivery capability. These properties can produce excellent energy/power densities for the resulting electrochemical energy storage devices. Unique properties of the ionic liquid electrolytes (e.g., large electrochemical window, wide liquid phase range, non-flammability, non-toxicity, and non-volatility) can provide excellent safety and cycle life for the electrochemical energy storage devices.

"Polymer" refers to both polymers and copolymers. Copolymers include all polymers having more than one monomer type. Copolymers therefore include terpolymers, tetrapolymers, and other polymers with multiple monomer types.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

DETAILED DESCRIPTION OF THE INVENTION

The Energy Storage Device

Figure 1:
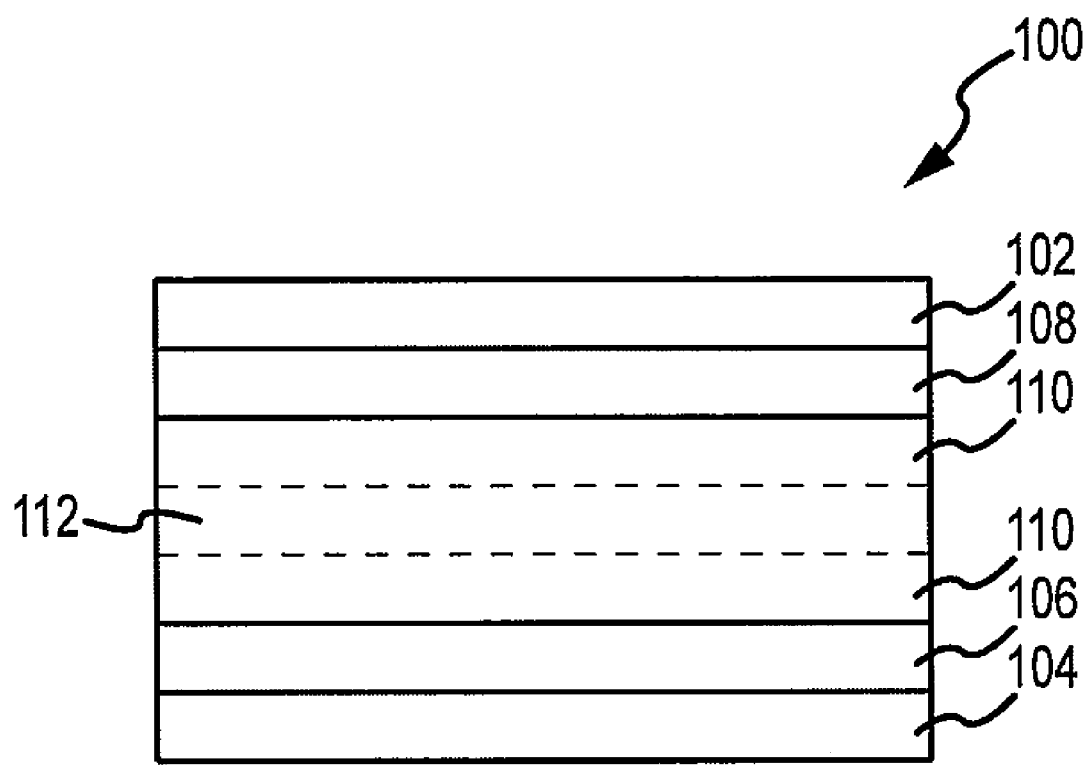
FIG. 1 depicts a cross-sectional view of a battery according to one embodiment of the present invention.

An electrochemical device according to a first embodiment of the present invention is shown in FIG. 1. In one aspect of the present invention, the electrochemical device is an electrochemical battery 100 comprising first 102 and second 104 current collectors, an anode 106, a cathode 108, and an ionic liquid electrolyte 110 and a membrane 112 positioned between the anode 106 and cathode 108. The performance of the electrochemical battery 100 is substantially determined by the physical properties of the anode 106, the cathode 108 and the ionic liquid electrolyte 110. As will be appreciated, the electrochemical battery can be of other designs, including, without limitation, stacked and spiral-wound configurations. Alternatively, each of the anode 106 and cathode 108 can act both as an electrode and a current collector.

The Ionic Liquid Electrolyte

Although the electrolyte can be a liquid electrolyte (such as a salt dissolved in a solvent) or a gel polymer electrolyte, an ionic liquid electrolyte is preferred. The ionic liquid electrolyte 110 commonly comprises an ionic liquid, a lithium salt, and a solid electrolyte interphase film-forming additive. The ionic liquid is believed to act as a solvent for the lithium salt. While not wanting to be bound by theory, the composition of the ionic liquid electrolyte affects lithium-ion intercalation and de-intercalation. More specifically, one or more of the ionic liquid, lithium salt, and solid electrolyte interphase individually or combinedly affect lithium-ion intercalation and de-intercalation. The ionic liquid electrolyte 110 can include a gel polymer to form an ionic liquid-incorporated gel polymer electrolyte. The ionic liquid-incorporated gel polymer electrolyte is formed by contacting the ion liquid with a polymer host.

The lithium salt can be any lithium salt. Lithium salts having substantial thermal stability and solubility in the ionic liquid are preferred. Non-limiting examples of preferred lithium salts comprise: lithium hexafluorophosphate, lithium chloride, lithium bromide, lithium hexafluoroarsenate, lithium perchlorate, lithium tetrafluoroborate, lithium bis(trifluoromethylsulfonyl)imide, lithium tris(trifluoromethylsulfonyl)methide, and lithium bis(oxalato) borate. More preferred lithium salts comprise one or more of lithium tetrafluoroborate (LiBF$_4$), lithium bis(trifluoromethylsulfonyl)imide (Li[TFSI]) and lithium bis(oxalato) borate (Li[BOB]). The lithium salt concentration ranges from about 0.1 M to about 5 M (based on the molar concentration of the lithium salt). Preferred lithium salt concentrations are from about 0.5 M to about 2.5 M.

The ionic liquid can be any suitable electrochemically stable, water miscible and/or immiscible (with water immiscible being preferred) ionic liquid having a relatively low melting point (e.g. preferably less than about 100° C. and more preferably from about −5 to about −125° C.). Preferably, the ionic liquid has a relatively high thermo-decomposition temperature (e.g., remain substantially thermally stable at temperatures of about 400° C. or less), a suitable hydrophobic:hydrophilic ratio (e.g., ability to substantially dissolve one or more lithium-ion containing salts), a low viscosity (e.g., preferably no more than about 200 Cp and even more preferably ranging from about 20 to about 150 Cp), a relatively high ionic conductivity (e.g. preferably at least about 0.01 at about 25° C., more preferably from about 1 to about 20 mS/cm) and wide electrochemical window (e.g., preferably at least about 2 volts, more preferably at least about 4 volts, and even more preferably at least about 5 to about 20 volts).

Figure 2:
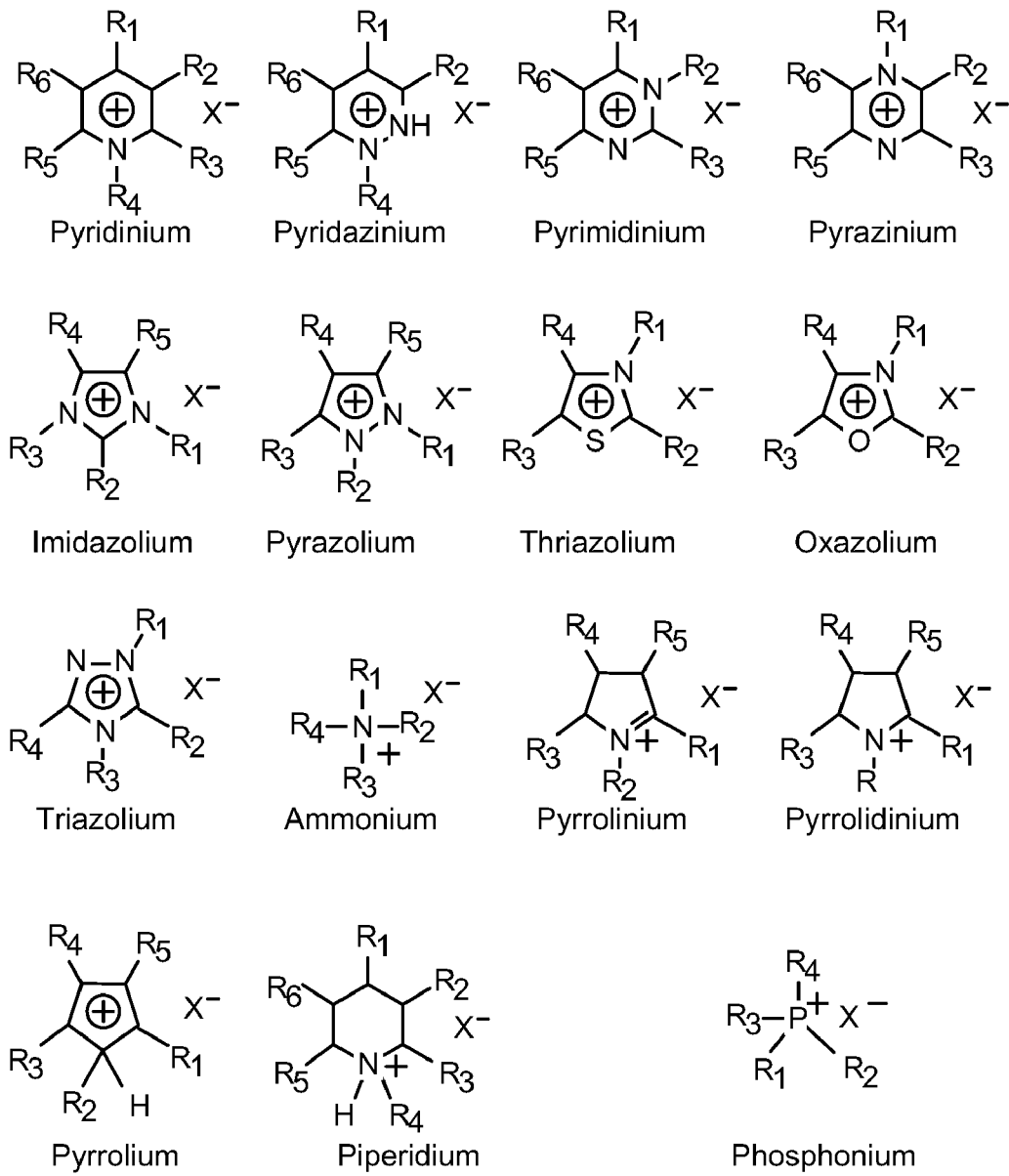
FIG. 2 shows examples of ionic liquids based on various monocations.
Figure 3:
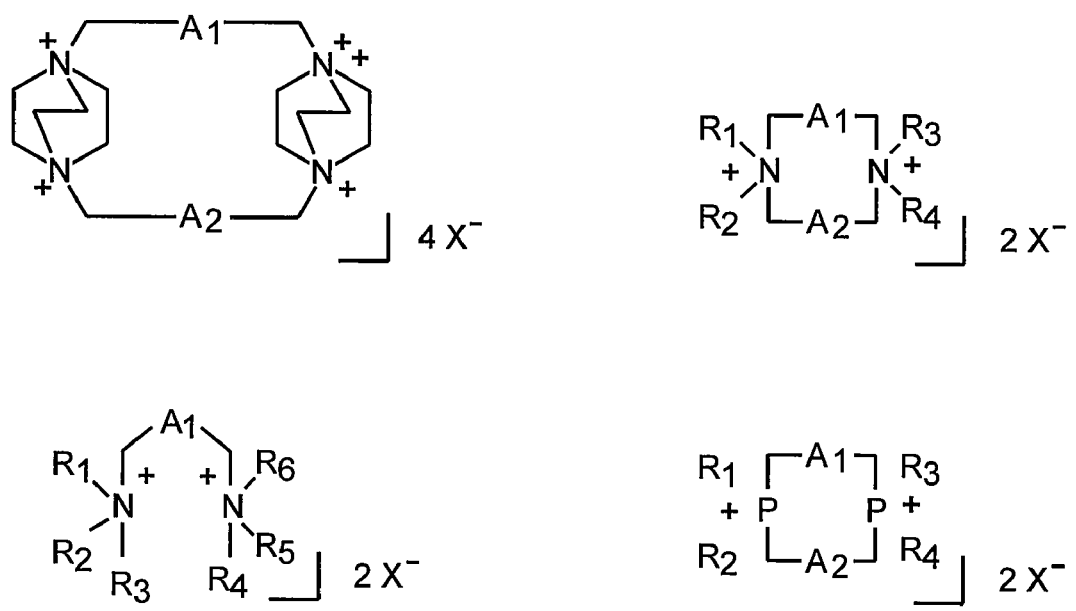
FIG. 3 shows examples of ionic liquids based on various polycations.

Non-limiting examples of suitable ionic liquids based on various mono-cations are shown in FIG. 2 and non-limiting examples of suitable ionic liquids based on polycations are shown in FIG. 3. The $R_1$, $R_2$, $R_3$, $R_4$, $R_5$, and $R_6$ of the cationic components are identical or different and are preferably selected from the group consisting essentially of:

(a) hydrogen (—H)
(b) a halogen (—Cl, —Br, —I, or —F)
(c) a hydroxyl (—OH)
(d) an amine (—NH$_2$)
(e) a thiol (—SH)
(f) a $C_1$ to $C_{25}$ straight-chain, branched aliphatic hydrocarbon radical
(g) a $C_5$ to $C_{30}$ cycloaliphatic hydrocarbon radical
(h) a $C_6$ to $C_{30}$ aromatic hydrocarbon radical
(i) a $C_7$ to $C_{40}$ alkylaryl radical
(j) a $C_2$ to $C_{25}$ linear or branched aliphatic hydrocarbon radical having interruption by one or more heteroatoms, such as, oxygen, nitrogen or sulfur
(k) a $C_2$ to $C_{25}$ linear or branched aliphatic hydrocarbon radical having interruption by one or more functionalities selected from the group consisting essentially of:
 a. a carbonyl (—C(O)—)
 b. an ester (—C(O)O—)
 c. an amide (—C(O)NR'—), where R' selected from the group consisting essentially of hydrogen, $C_1$-$C_{12}$ straight-chain, branched or cyclic alkane or alkene
 d. a sulfonate (—S(O)$_2$O—)
 e. a sulfonamide (—S(O)$_2$NR'—), where R' selected from the group consisting essentially of hydrogen, $C_1$-$C_{12}$ straight-chain, branched or cyclic alkane or alkene
(l) a $C_2$ to $C_{25}$ linear or branced aliphatic hydrocarbon radical terminally functionalized by Cl, Br, F, I, NH, OH, NH$_2$, NHCH$_3$ or SH
(m) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, NH$_2$, NHCH$_3$ or SH (n) a $C_7$ to $C_{40}$ alkylaryl radical heteroatom selected from the group consisting essentially of O, N, S, and optionally substituted with at least one of the following
  a. a $C_2$ to $C_{25}$ straight-chain, branched hydrocarbon radical substituted with at least one of the following Cl, Br, F, I, NH, OH, $NH_2$, $NHCH_3$ or SH
  b. a $C_5$ to $C_{30}$ cycloaliphatic hydrocarbon radical substituted with at least one of the following Cl, Br, F, I, NH, OH, $NH_2$, $NHCH_3$ or SH
  c. a hydroxyl
  d. an amine
  e. a thiol
(o) a polyether of the type $-O-(-R_7-O-)_n-R_8$ or block or random type $-O-(-R_7-O-)_n-(-R_{7'},-O-)_m-R$ where
  a. $R_7$ is a linear or branched hydrocarbon radical having from 2 to 4 carbon atoms
  b. $R_{7'}$ is a linear or branched hydrocarbon radical having from 2 to 4 carbon atoms
  c. n is from 1 to 40
  d. $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical
(p) a polyether of the type $-O-(-R_7-O-)_n-C(O)-R_8$ or block or random type $-O-(-R_7-O-)_n-(-R_{7'},-O-)_m-C(O)-R_5$ where
  a. $R_7$ is a linear or branched hydrocarbon radical having from 2 to 4 carbon atoms
  b. $R_{7'}$ is a linear or branched hydrocarbon radical having from 2 to 4 carbon atoms
  c. n is from to 40
  d. $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical.

The anionic component is preferably selected from the group consisting essentially of:
  (a) halides, i.e., chloride, bromide, and iodide, preferably iodide
  (b) phosphates
  (c) halophosphates, preferably hexafluorophosphate
  (d) alkylated phosphates
  (e) nitrate
  (f) sulfates, i.e., hydrogen-sulfate
  (g) alkyl sulfates, preferably octyl sulfate
  (h) aryl sulfates
  (i) perfluorinated alkyl sulfates
  (j) perflorinated alkyl ether sulfates
  (k) halogenated alkyl sulfates
  (l) perfluorinated aryl sulfates
  (m) perflorianted aryl ether sulfates
  (n) sulfonates
  (o) alkylsulfonates
  (p) arylsulfonates
  (q) perfluorinated alkyl- and arylsulfonates, preferably triflate (or trifluoromethan sulfonate)
  (r) perfluorinated alkyl ether and aryl ether sulfonates
  (s) halogenate alkyl- and arylsulfonates,
  (t) perchlorate
  (u) tetrachloroaluminate
  (v) tetrafluoroborate
  (w) alkylated borates, preferably $B(C_2H_5)_3C_6H_{13}^-$
  (x) tosylate
  (y) saccharinate
  (z) alkyl carboxylates, and
  (aa) bis(perfluoroalkylsulfonyl)amide anions, preferably the bis(trifluoromethylsulfonyl)amide anion, or is
  (bb) a mixture of two or more of these anionic species.

In one preferred embodiment, the ionic liquid has halogen-free anions selected from the group consisting essentially of phosphate, alkyl phosphates, nitrate, sulfate, alkyl sulfates, aryl sulfates, sulfonate, alkylsulfonates, arylsulfonates, alkyl borates, tosylate, saccharinate, and alkyl carboxylates, particular preference being given to alkyl sulfates, in particular octyl sulfate, and to tosylate.

In another preferred embodiment, the ionic liquid has various anions and/or cations. The ionic liquids used by way of example as plasticizers may therefore be used individually or in a mixture in the polymer composition of the invention.

Ionic liquids based on polycations are formed when monocations are joined together; FIG. 3 shows monocations joined to form polycationic ring structures, where $A_1$ and $A_2$ are alkylene groups and substituted alkylene groups. The anion $X^-$ includes, without limitation, but is not limited to, $F^-$; $Cl^-$; $Br^-$; $I^-$; $NO_3^-$; $BF_4^-$; $N(CN)_2^-$; $BF_4^-$; $ClO_4^-$; $PF_6^-$; $RSO_3^-$; $RCOO^-$, where R is an alkyl group; substituted alkyl group; phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $CF_3CF_2(CF_3)_2CO^-$, $(CF_3SO_2^-)_2CH^-$, $(SF_5)_3C^-$, $(CF_3SO_2SO_2)_3C^-$, $[O(CF_3)_2C_2(CF_3)_2O]_2PO^-$, and $CF_3(CF_2)_7SO_3^-$.

Preferably, the ionic liquid is a composition having at least one cation selected from the group consisting essentially ammonium, imidazolium, and pyrrolinium and at least one anion selected from the group consisting essentially of $N(CN)_2^-$ and $(CF_3SO_2^-)_2N^-$. Particularly preferred ionic liquids include ethyl-dimethyl-propylammonium bis(trifluoromethyl-sulfonyl)imide ([EDMPA][TFSI]), N-ethyl-N,N-dimethyl-2-methoxyethylammonium bis(trifluormethylsulyl)imide ([EDMMEA][TFSI]), 1-butyl-1-methylpyrrolidinium bis(trifluoromethylsulfonyl)imide ([BMP][TFSI]), and 1-butyl-1-methylpyrrolidinium dicyanamide ([BMP][DCA]).

The solid electrolyte interphase film-forming additive comprises one of: an alkly carbonate; a cyclic carbonate; an acyclic carbonate; and a combination thereof. Examples of preferred carbonates are, without limitation: propylene carbonate, ethylene carbonate, ethylmethyl carbonate, and combinations thereof. Preferred carbonates comprise, ethylene carbonate (e.g., 1,3-dioxolan-2-one or $(CH_2CH_2O)_2C=O$) and linear carbonate mixtures comprising ethylene carbonate. In an ionic liquid electrolyte, the solid electrolyte interphase film-forming additive can be used to modify and/or control some of the physical properties of the ionic liquid electrolyte, for example, lowering the viscosity of the resultant electrolyte. In a preferred embodiment, the solid electrolyte interphase film-forming additive is a component that forms a passivation film on the anode. That is, the solid electrolyte interphase film forming additive contacts the anode, during the electrochemical process, to form a passivation film on the anode. The passivation film is also typically referred to as the solid electrolyte interface. In a preferred embodiment, the solid electrolyte interface is substantially formed during one or more of the first to about the tenth battery chargings. In a more preferred embodiment, the solid electrolyte interface is substantially formed during one or more of the first to about the fifth battery chargings and even more preferred from about the first to third battery chargings. The solid electrolyte interphase comprises from about 2 volume % to about 50 volume % of the electrolyte, more preferably from about 10 volume % to about 30 volume % of the electrolyte.

The polymer host can be any thermoplastic or thermosetting polymer having a melting point of at least about 60° C. and a high solubility in a selected low boiling point (organic) solvent. When thermosetting polymers are used, the polymer preferably cross-links at a temperature below the decomposition temperature of the ionic liquid and/or in response to ultraviolet light or heat. Thermosetting polymers, when cross-linked, form three-dimensional polymer networks through which the ionic liquid can move. Cross-linked polymers do not crystallize and have the advantage of superior dimensional stability and mechanical strength. When thermoplastic polymers are used, the polymer preferably melts at a temperature below the decomposition temperature of the ionic liquid.

The polymer host can be any suitable high molecular weight polymer. Examples of suitable host polymers include homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof.

Figure 4:
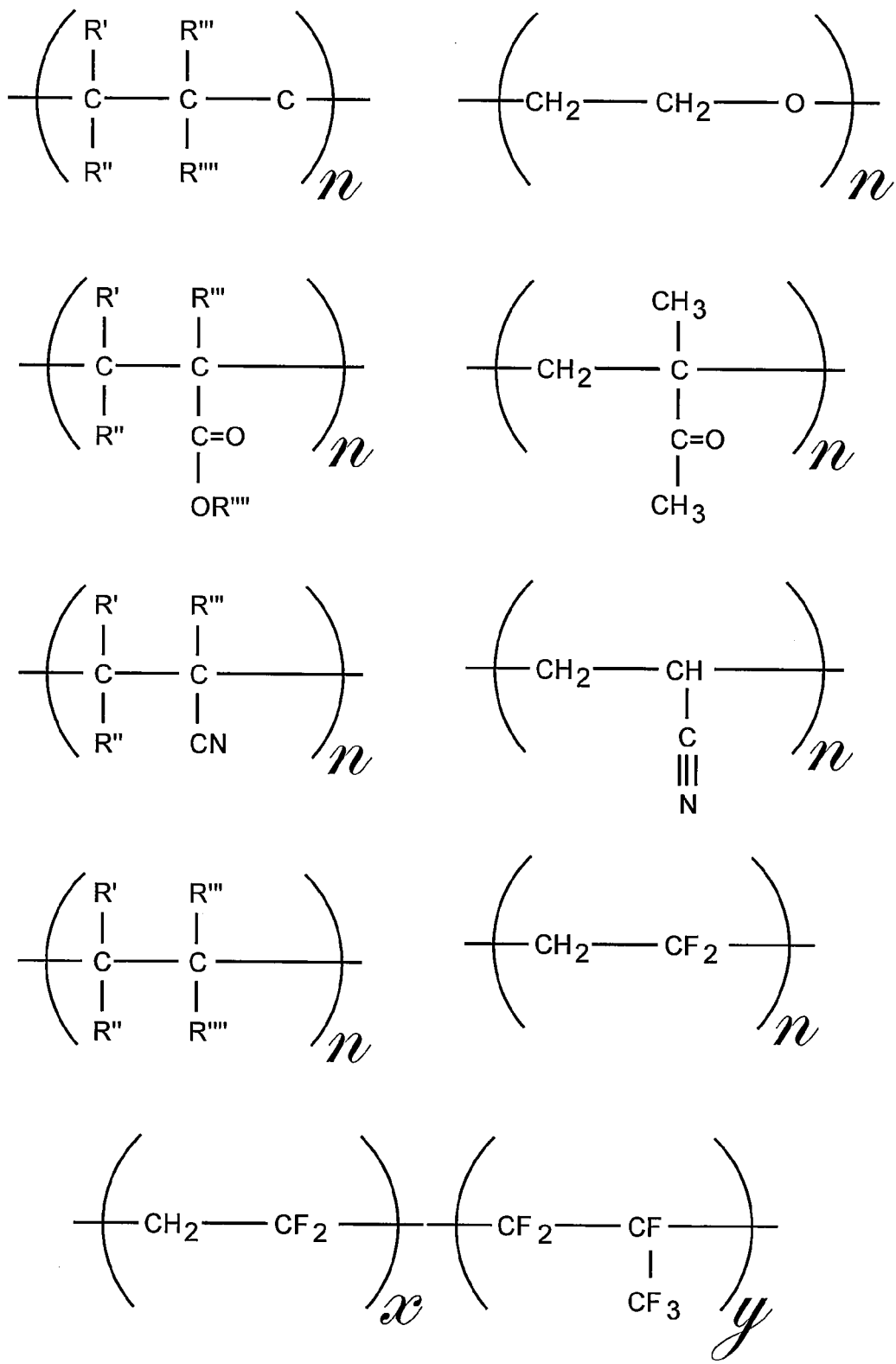
FIG. 4 shows examples of polymer hosts.

Preferred polymers are semicrystalline or amorphous polymers having no ionic groups. Examples of suitable host polymers are shown in FIG. 4. Particularly preferred host polymers include:

Polyoxides formed by the homo- or co-polymerization of alkylene oxides, R'R"C(O)CR'"R"", where R', R", R'", and R"" can separately be hydrogen and/or a $C_1$-$C_{18}$ linear or branch alkyl group, or a $C_2$-$C_{26}$ cyclic alkyl and/or aryl group, wherein the cyclic or aryl group can contain at least hetero atom selected from the group consisting essentially of O, N and S and wherein the cyclic and/or acyclic alkyl group can be saturated or unsaturated. Preferred the linear or branched alkyl groups are $C_1$-$C_4$. The most preferred polyoxide is poly(ethylene oxide) (PEO).

Polyacrylics formed by the homo- or co-polymerization of: acrylic acid or its derivatives: R'R"C=CR'"C(=O)OR"", and/or R'R"C=CR'"C(=O)SR"", and/or R'R"C=CR'"C(=O)NR""R""'; and/or acrylontrile, R'R" C=CR'"CN, where R', R", R'", R"", and R""', can be hydrogen and/or a $C_1$-$C_{18}$ linear or branch alkyl group, or a $C_2$-$C_{26}$ cyclic alkyl and/or aryl group, wherein the cyclic or aryl group can contain at least hetero atom selected from the group consisting essentially of O, N and S, and wherein the cyclic and acyclic alkyl group may be saturated or unsaturated. Preferred linear or branched alkyl groups are $C_1$-$C_{12}$, and the more preferred are $C_1$-$C_6$ linear or branched alkyl groups. The most preferred are methyl methacrylate homopolymer and acrylonitrile homopolymer.

Polyhalo-olefins formed by the homo- or co-polymerization of holgenated olefins, R'R"C=CR'"R"", where R', R", R'", and R"" that can independently be:

a hydrogen,
a halogen,
a $C_1$-$C_{18}$ linear or branched, saturated or unsaturated, alkyl group that may be partially or fully halogenated,
a $C_2$-$C_{26}$ cyclic, saturated or unsaturated, alkyl group and/or aryl group, the cyclic alkyl or aryl group may be partially or fully halogenated.

A preferred linear or branched alkyl group is $C_1$-$C_{12}$ that can be partially or fully halogenated. The more preferred halogen is fluoride and the more preferred linear or branched alkyl group is $C_1$-$C_{12}$ that can be halogenated, wherein the alkyl group may be partially or fully halogenated. The most preferred are poly(vinyldiene fluoride) where R' and R" are hydrogen and R'" and R"" are fluoride, and poly(vinyldiene fluoride-co-hexafluoropropylene), a co-polymer wherein one component is R' and R" are hydrogen and R'" and R"" are fluoride and the other component is R', R", R'" are fluoride and R"" is trifluoromethyl.

For any polymer formula "N" refers to the number of repeating units in the polymer chain and typically is at least 25 and even more typically ranges from 50 to 50,000. "X" and "Y" is an integer value preferably in the range of 3 to 1,000. "X" and "Y" may, of course, have different values.

Particularly preferred polymer hosts include poly(ethylene oxide) (PEO), polyacrylonitrile (PAN), poly(methyl methacrylate) (PMMA), poly(vinylidene fluoride) (PVdF), and poly(vinylidene fluoride-co-hexafluoropropylene) (PVdF-HFP), with PAN and PVdF-HFP being even more preferred. PAN and PVdF, have relatively high thermal stability. In addition, PVdF-based polymer electrolytes are highly anodically stable due to the strongly electron-withdrawing functional group —C—F. PVdF co-polymerized with hexafluoropropylene (PVdF-HFP), can be used to improve the gel properties of the polymer electrolytes because of its greater solubility in organic solvents, lower crystallinity, and lower glass transition temperature than the PVdF polymer alone in the gel.

In a preferred polymer composition, the mass ratios of ionic liquid to polymer host range from about 0.1:1 to about 1:1 and even more preferably from about 0.1:1 to about 10:1. Stated another way, the ionic liquid-containing gel polymer electrolyte preferably comprises from about 9 to about 50 and even more preferably from about 9 to about 90 wt. % ionic liquid, with the remainder being the polymer host.

The ionic liquid can include additives to provide more desirable electrochemical properties. By way of example, viscosity reducers can be added to the ionic liquid to lower viscosity and increase ionic conductivity of the ionic liquid-containing gel polymer electrolyte. Examples of potential viscosity reducers include propylene carbonate, ethylene carbonate, dimethylformamide, and acetonitrile.

The ionic liquid-containing gel polymer electrolyte is in the form of gel. The ionic liquid-containing gel can form a layer having desirable properties. By way of example, the ionic conductivity of the ionic-liquid containing gel polymer electrolyte is preferably at least about 0.01 mS/cm at about 50 degrees Celsius and more preferably ranges from about 0.1 to about 100 mS/cm at about 50 degrees Celsius.

As will be appreciated, the ionic liquid can be ungelled; that is to say, the ionic liquid can be free of the polymer additive.

Figure 5:
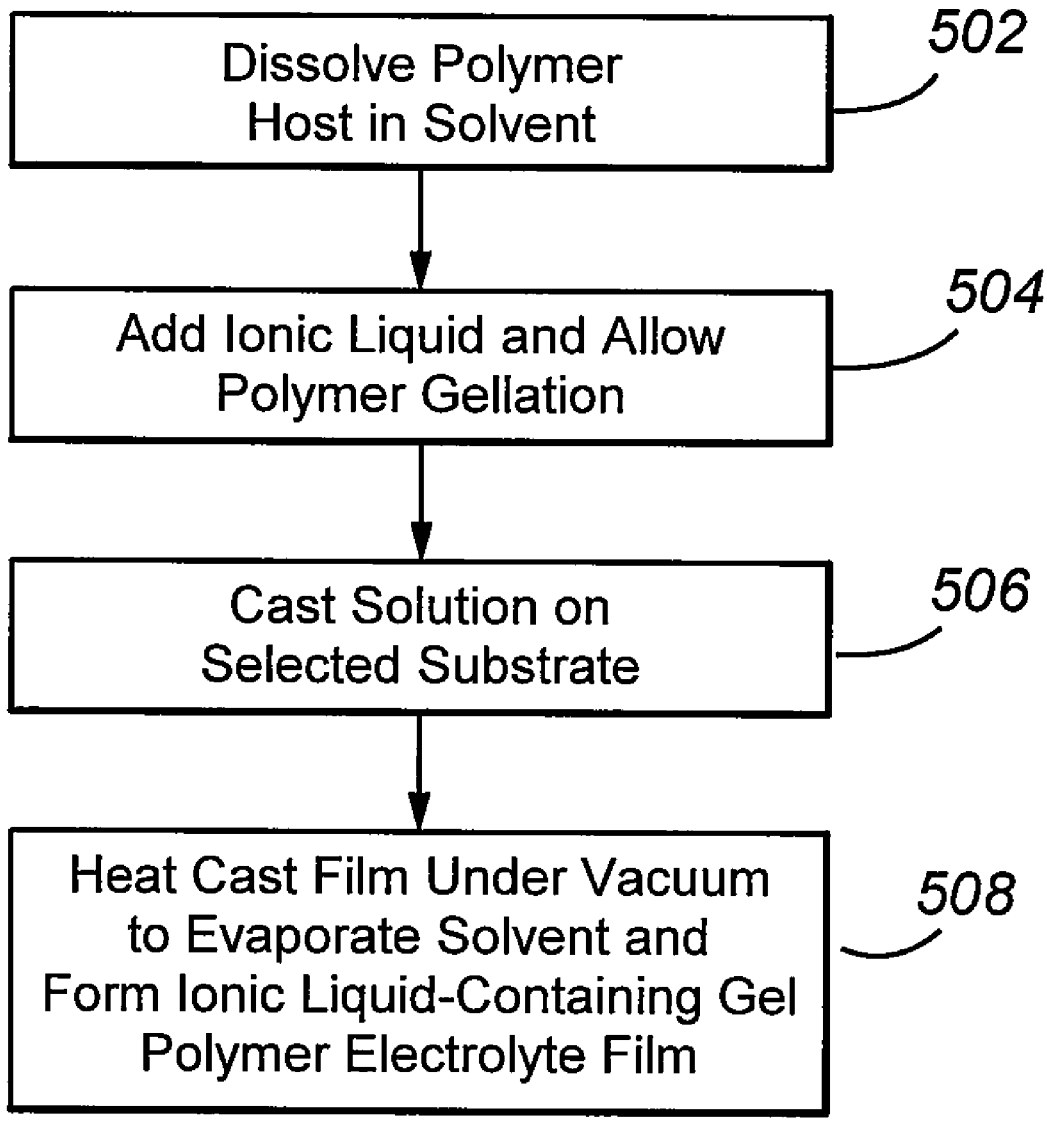
FIG. 5 is a flowchart of a method to produce an ionic liquid-containing gel polymer electrolyte layer according to an embodiment of the invention.

FIG. 5 illustrates a method of manufacturing a layer of the ionic liquid-containing gel polymer electrolyte according to an embodiment of the invention.

In step 502, the polymer host (preferably in powder form) is dissolved in a low-boiling point solvent under magnetic stirring. To effect rapid dissolution, the average or mean particle size of the host preferably is no more than about 50 micrometers. The polymer host can be precipitated, spray-dried, or milled.

The solvent, or swelling agent, is preferably an organic solvent for the polymer host. The solvent preferably has a low boiling point, which is more preferably no more than about 200 degrees Celsius and even more preferably ranges from about 50 to about 200 degrees Celsius. Particularly preferred solvents include pyrrolidinone, acetone, dimethylformamide, acetonitrile, and tetrahydrofuran.

In step 504 when the polymer host is fully dissolved in the solvent, the viscous solution is mixed with an appropriate amount of an ionic liquid under magnetic stirring to allow the gellation of polymer with the ionic liquid. As will be appreciated, "gellation" of the polymer refers to the polymer chains being placed in a more disordered state, thereby occupying a greater volume than the volume of the undissolved, more highly ordered polymer host before step 502.

In step 506, the resultant mixture is processed by solution casting on a selected substrate, such as a glass plate.

In step 508, the solvent cast mixture is heated under a dynamic vacuum to evaporate at least most, if not all, of the low boiling-point solvent to form a layer of the ionic-liquid-containing gel polymer electrolyte. This heating process is preferably performed at a temperature higher than the boiling point of the low-boiling point solvent but lower than the decomposition temperature of the ionic liquid and polymer host. The freestanding and self-supporting film of the ionic liquid-containing gel polymer electrolyte can be easily peeled off from the substrate for later assembly of the lithium-ion-battery.

When the polymer host is a thermosetting polymer, the polymer is cross-linked while in the presence of the ionic liquid and/or filler. To produce such ionic liquid-containing gel polymer electrolytes, appropriate monomers are mixed with the selected ionic liquid, followed by cross-linking reactions. The ionic liquid molecules are trapped in the resulting cross-linked polymer structures. Suitable plasticizers and cross-linking agents may be added to the mixture. For the cross-linking step, several methods, such as ultraviolet (UV) irradiation, electron-beam irradiation, and thermal polymerization, can be selected to initiate cross-linking.

Exemplary cross-linking monomers include acrylate monomers (e.g., ethylene glycol diacrylate, polyethylene glycol diacrylate, trimethylolpropane triacrylate, vinyl acetate, and divinyl adipate, 1,6-hexanediol diacrylate, 1,9-nonanediol diacrylate, 2-butyl-2-ethyl-1,3-propaneiol diacrylate, 2-hydroxy 3-phenyoxy propyl acrylate, 2-hydroxylethyl acrylate, 2-hydroxypropyl acrylate, butoxy ethyl acrylate, behenyl acrylate, diaccrylate of ethylene oxide modified bisphenol A, dipentaerythritol hexaacrylate, neopentyl glycol diacrylate, ethoxy diethyleneglycol acrylate, hexyl polyethyleneglycol acrylate, diethylene glycol diacrylate, isoamyl acrylate, isobornyl acrylate, lauryl acrylate, methoxy triethyleneglycol acrylate, neopentglycol diacryalate, tetraethylene glycol di(chloroacrylate), neopenthylglycol benzoate acrylate, PEG#200 diacrylate, PEG-400 diacrylate, PEG-600 diacrylate, perflorooctylethyl acrylate, triethylene glycol diacrylate, phenoxy ethyl acrylate, diglycerol diacrylate, trimethylolpropane triacrylate, teterahethylene glycol diacrylate, phenoxoy polyethyleneoglycol acrylate, atearyl acrylate, tetrahydro furfuryl acrylate, triethyleneglycol diacrylate, triethyleneglycol diacrylate, trimethylpropane triacrylate, trimethylpropane benzoate acrylate, 2-ethylhexyl acrylate, butyl acrylate, can combinations thereof), methyacrylate monomers (e.g., methyl methacrylate, ethylene glycol dimethacrylate, diglycerol tetramethacrylate, butylene glycol dimethacrylate, polyethylene glycol dimethacrylate, hcyrosyproply methacrylate, diethylene glycol dimethacrylate, triethylene glycol dimethacrylate, tetraethylene glycol dimethacrylate, di(pentamethylene glycol) dimethacrylate, and combinations thereof).

The Membrane Separator

Any microporous polymer membrane separator that is permeable to the selected ionic liquid may be employed. Examples of suitable membrane separators include battery and ultracapacitor separators, such as those sold by PPG Industries Inc. under the tradename TESLIN™ (a microporous, highly filled polyethylene matrix sheet material), EXCELLERATOR PTFE separators sold by W. L. Gore & Associates, Inc., Daramic Industrial CL™ (a microporous, highly filled polyethylene matrix sheet material) sold by Daramic, Inc., SOLUFILL™ and SOLUPOR™, both sold by DSM Solutech of the Netherlands and Teijin Fibers Limited of Japan, TYVEK™ (spun bonded polyethylene fibers) sold by E.I. du Pont de Nemours and Company, and the battery separator membranes sold by Celgard, or by Daramic, Inc. under the tradename ARTISYN™. ARTISYN™ is an uncoated, mono-layer, highly filled polyolefin sheet. Other preformed microporous and permeable organic membranes, such polymer membrane separators designed for energy storage applications (i.e., batteries and ultracapacitors), may also be employed.

Figure 6:
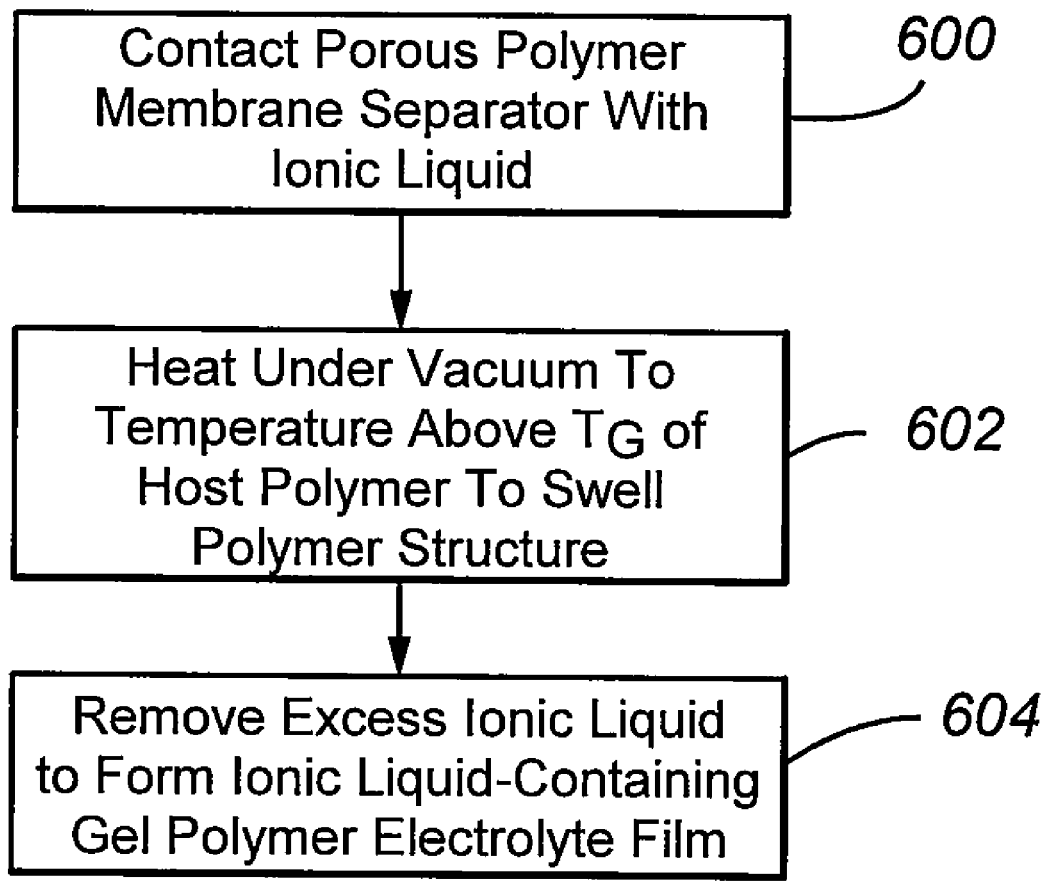
FIG. 6 is a flowchart of a method to produce an ILGPE layer according to an embodiment of the invention.

FIG. 6 shows a method known as the ionic liquid-inorganic-polymer composite method, where a pre-made microporous and permeable polymer separator is impregnated with a selected ionic liquid dispersion. Preference is given to impregnation of polymer powders by an ionic liquid, and particular preference to impregnation of films, fibers, foams, or injection moldings, using auxiliaries, e.g., solvent.

In step 600, the preformed, microporous and permeable polymer membrane is contacted with the ionic liquid by placing the membrane in a bath of the ionic liquid.

In step 602, the polymer membrane, while in contact with the ionic liquid or ionic liquid/solvent mixture, is heated at a temperature above the glass transition temperature of the polymer host in the membrane, but below the decomposition temperatures of the ionic liquid and polymer host, to directly swell and/or gell the polymer host and form a layer of the ionic liquid-containing gel polymer electrolyte (ILGPE). Preferably, the temperature to which the membrane is heated is at least about 50 degrees Celsius and more preferably ranges from about 50 to about 200 degrees Celsius. Swelling and/or gelling of the polymer membrane by the ionic liquid is enhanced at an elevated temperature and/or exposure to a dynamic vacuum. The vacuum is preferably at a pressure of no more than about −0.1 atm and more preferably ranges from about −0.1 to about −1 atm. The vacuum can improve the uptaking of ionic liquid in the polymer network and thus enhance ionic conductivity of the resulting ionic liquid-containing gel polymer electrolytes. Use of the dynamic vacuum can help the penetration of the ionic liquid into the depth of the polymer network and thus enhance ionic conductivity of the resulting ionic liquid-containing gel polymer electrolytes.

In step 604, the resultant ionic-liquid gel polymer electrolyte impregnated membrane is removed from the ionic liquid and the excess ionic liquid on the membrane is removed, such as by hanging the membrane for a few minutes.

The Current Collectors

The first 102 and second 104 current collectors are any highly conductive and/or superconductive materials. Examples include, without limitation, conductive metals (e.g.

copper, aluminum, nickel, and stainless steel), graphite, superconductive ceramics, and the like. In one embodiment, nickel foil is used for one or both of the first 102 and second 104 current collectors.

The Anode and Cathode

Preferably, the anode 106 and cathode 108 are, respectively, a lithium-ion intercalation/de-intercalation anode and a lithium-ion intercalation/de-intercalation cathode. The anode 106 and cathode 108 store and deliver electrochemical energy by intercalation/de-intercalation of lithium ions. Stated another way, the electrochemical energy storage and delivery components of the lithium-ion battery 100 are the anode 106 and cathode 108. More specifically, the electrochemical energy storage and delivery properties (such as, energy density and power density) of the lithium-ion battery 100 are determined by the lithium-ion intercalation/de-intercalation properties of the anode 106 and cathode 108.

The anode 106 and cathode 108 can be any material having a relatively high degree of one or more of: a) electrolyte accessibility; b) lithium-ion intercalation; and c) lithium-ion de-intercalation. The anode 106 and cathode 108 can be, for example, a high-surface area carbon-containing material (such as graphite), a transition metal oxide (such as, an oxide of cobalt, manganese, and nickel-cobalt manganese), and an electro-active polymer.

Figure 7A:
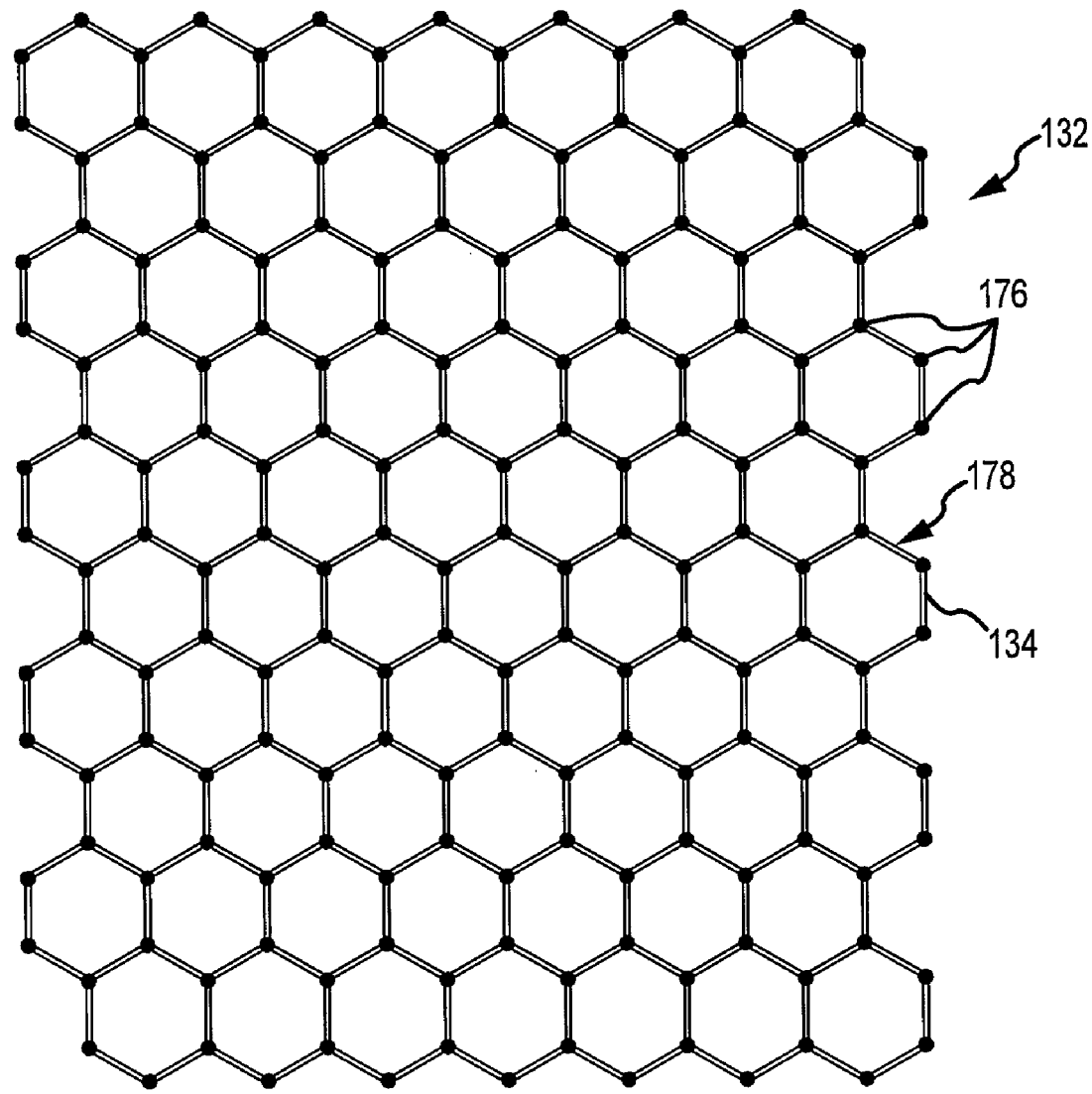
FIGS. 7A and 7B depict a graphene nano-ribbon and elements thereof according to another embodiment of the present invention.
Figure 7B:
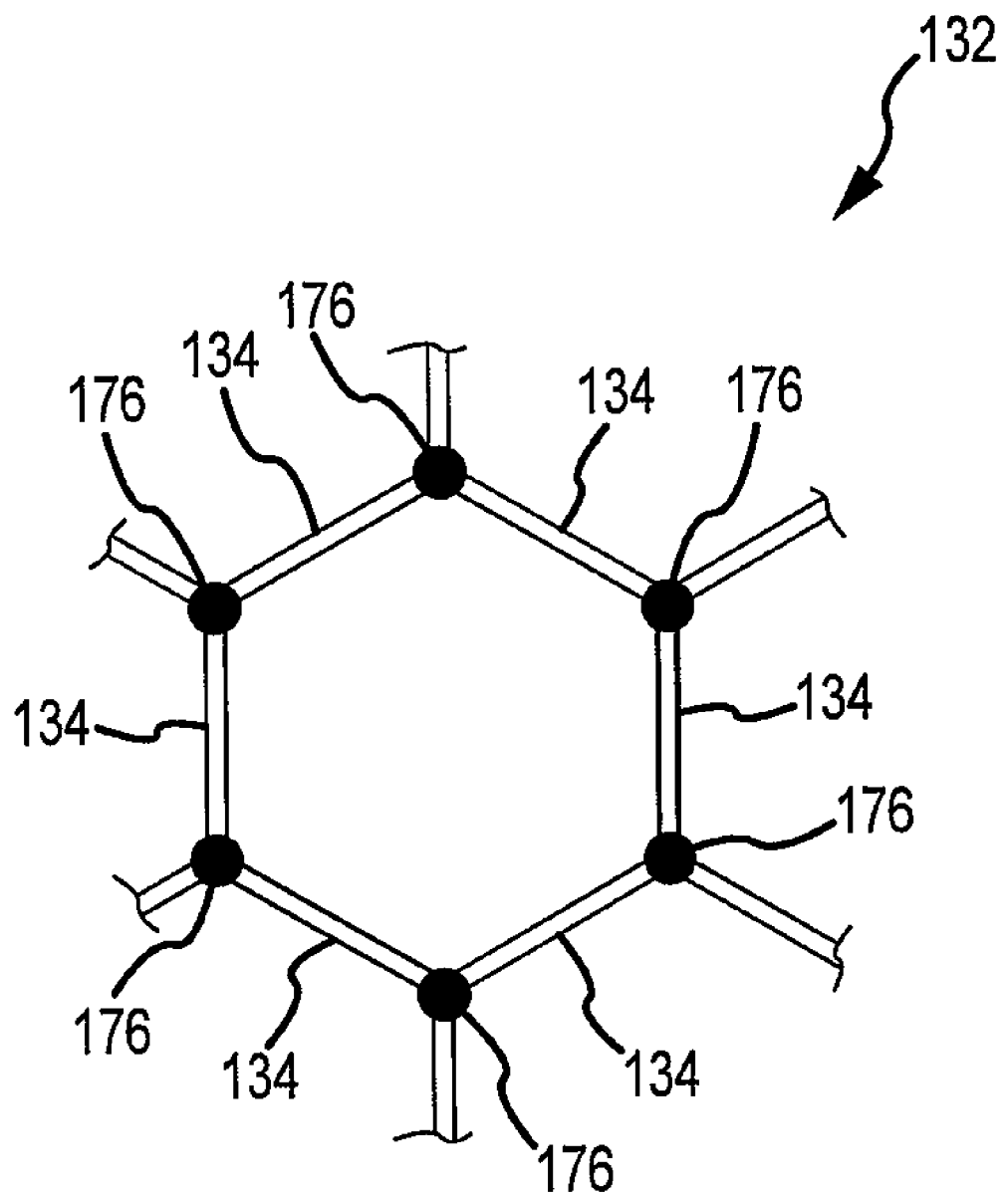
Figure 7C:
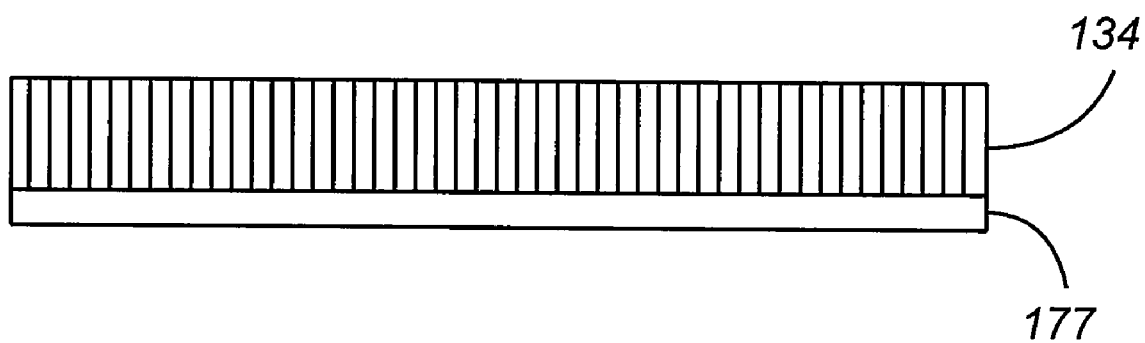
FIG. 7C depicts the composite electrode including the graphene nano-ribbons and electrode substrate.
Figure 8A:
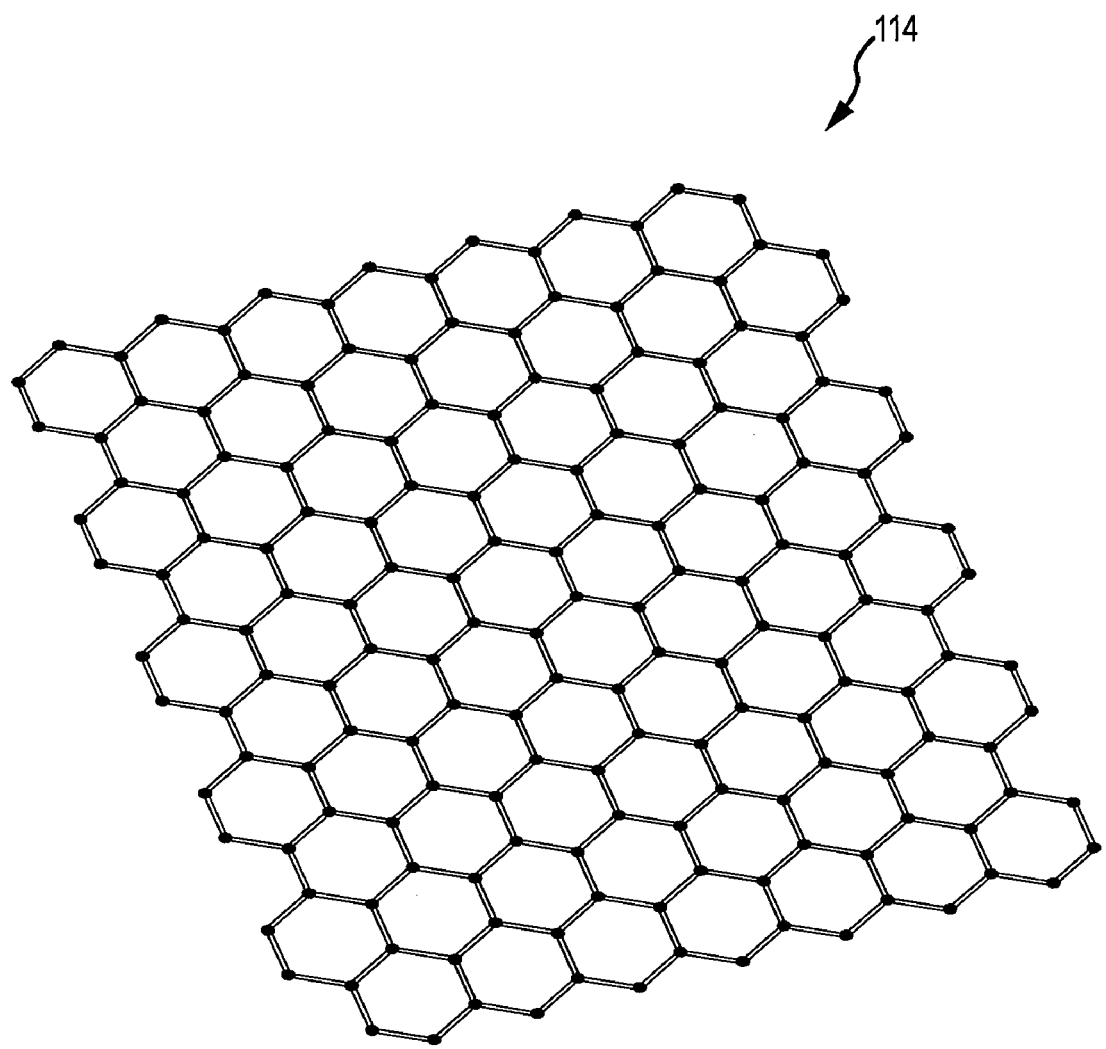
FIG. 8A depicts a flat, planar graphene nano-ribbon according to another embodiment of the present invention.
Figure 8B:
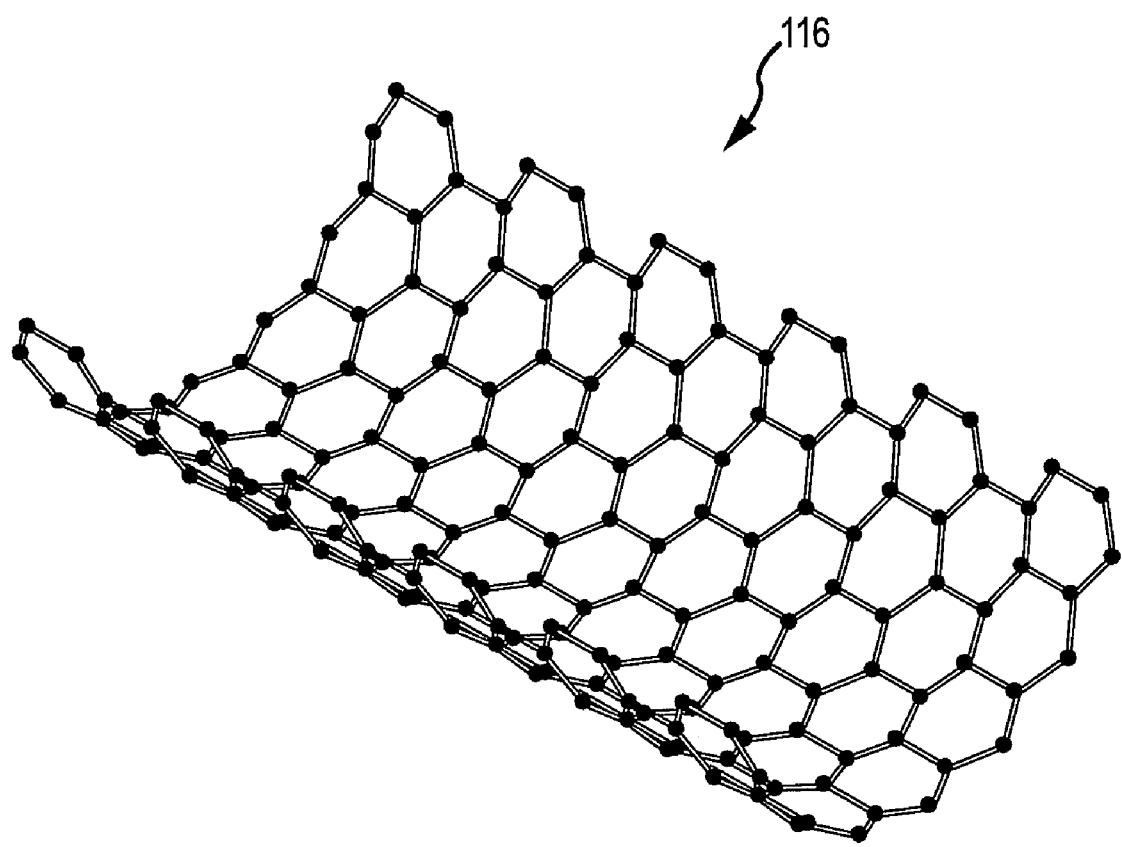
FIG. 8B depicts a non-planar graphene nano-ribbon according to another embodiment of the present invention.
Figure 8C:
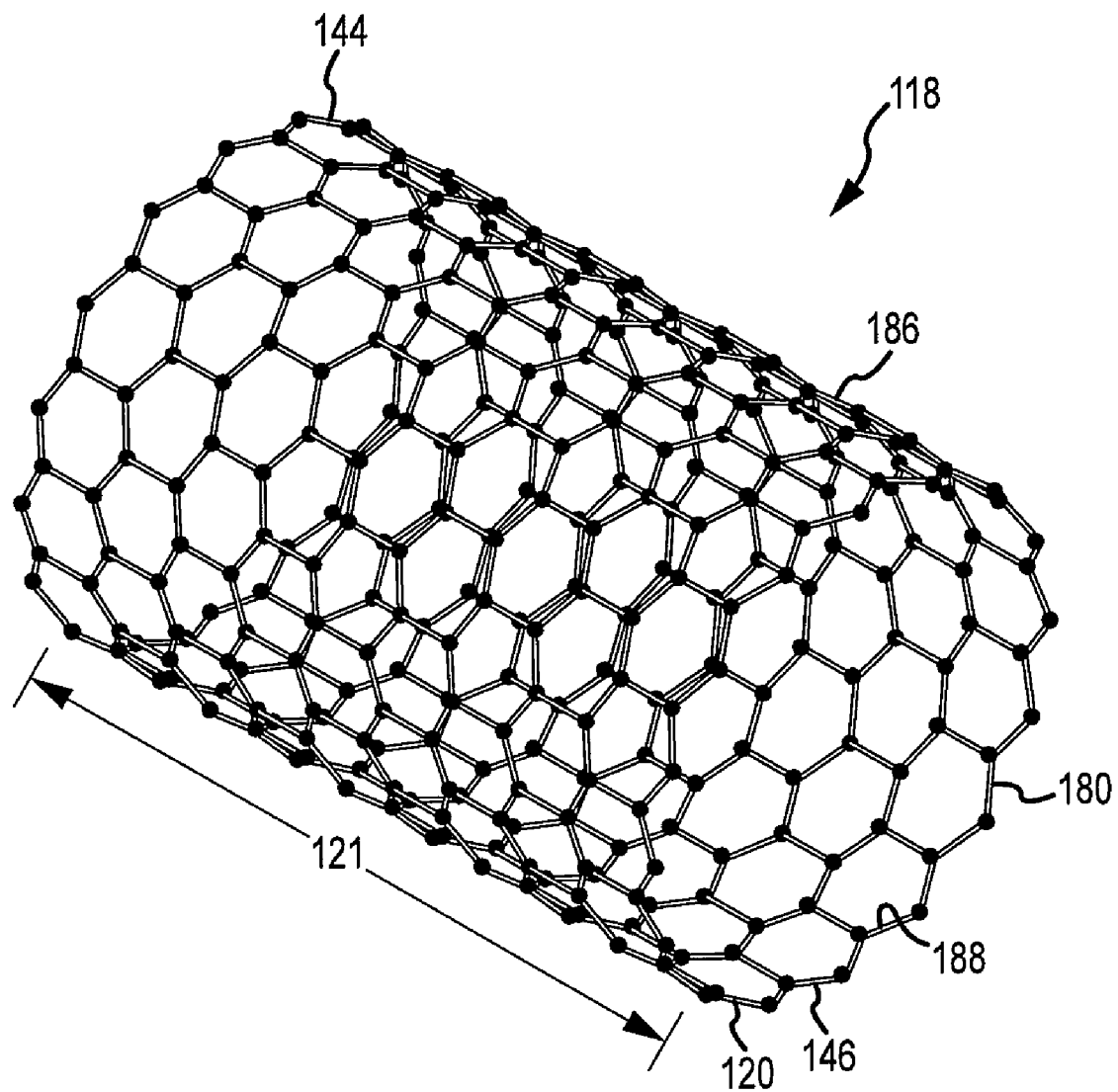
FIG. 8C depicts a cylindrical graphene nano-ribbon according to another embodiment of the present invention.

In a preferred embodiment, one or both of the anode 106 and cathode 108 comprise a plurality of graphene nano-ribbons 134 (FIGS. 7A, 7B, and 7C) positioned on a conductive or semi-conductive (electrode) substrate 177 (which can act as a current collector). The graphene nano-ribbon 134 comprise one of: a planar-shaped graphene nano-ribbon 114 (FIG. 8A); a non-planar shaped graphene nano-ribbon 116 (FIG. 8B); a cylindrically-shaped graphene nano-ribbon, also known within the art and referred to herein as a carbon nanotube (CNT) 118 (FIG. 8C); and any geometrically shaped graphene nano-ribbon (such as, those known within the art as bucky balls or buskmisterfullerenes). As will be appreciated, planar-shaped graphene nano-ribbons 134 can be made by forming, using known techniques, cylindrically-shaped graphene nano-ribbon, which are then longitudinally opened by etching and/or ball milling. The graphene nano-ribbon 134 is preferred for due to its high electrical conductivity, high charge transport capability, high surface area, high meso-porosity, and high electrolyte accessibility. As used herein meso-porosity refers to the spacing and/or distance between two or more graphene nano-ribbons 134.

The graphene ribbon comprises a plurality of $sp^2$-hybrized carbon atoms 176 interconnected to form a one-atom thick sheet 178. In some embodiments, the graphene ribbon has one or more ripples with the sheet 178. The ripples have an amplitude of at least less than about 25 nanometers, preferably an amplitude of about one nanometer. It can be appreciated that the amplitude of the one or more ripples can differ. That is, one ripple may have an amplitude of a and another ripple may have an amplitude of δ, where α and δ differ. The graphene ribbon has an electron mobility of at least about 5,000 $cm^2V^{-1}s^{-1}$. In a preferred embodiment, the electron mobility of the graphene ribbon is at least about 10,000 $cm^2V^{-1}s^{-1}$, and even more preferred is electron mobility of at least about 15,000 $cm^2V^{-1}s^{-1}$. The high electron mobility of the graphene ribbon supports a charge transport capability.

The plurality of $sp^2$-hybrized carbon atoms 176 are interconnected in groups. In one embodiment, at least most of the $sp^2$-hybrized carbon atoms in the graphene ribbon are interconnected in groups of six carbon atoms, with each group of six carbon atoms forming a substantially flat, regular hexagon 132. In a preferred embodiment, at least about 95% of the $sp^2$-hybrized carbon atoms 176 in the graphene ribbon are interconnected in groups of six carbon atoms to form a plurality of regular hexagons 132. In a more preferred embodiment, at least about 99% of the carbon atoms in 176 are interconnected to form a plurality of regular hexagons 132. In an even more preferred embodiment, at least about 99.99% of the $sp^2$-hybrized carbon atoms 176 in the graphene ribbon 114 are interconnected to form a plurality of regular hexagons 132.

Each side 134 of the regular hexagon 132 has a carbon 176-carbon 176 bond length from about 0.075 nm to about 0.35 nm. In a preferred embodiment, each side 134 of the regular hexagon 132 has a carbon-carbon bond length from about 0.1 nm about 0.2 nm and even more preferred from about 0.13 nm to about 0.16 nm. It can be appreciated that the graphene ribbon comprises a large aromatic molecule comprising a plurality of $sp^2$-hyrdrized carbon atoms 176.

Typically, at least some of the $sp^2$-hybrized carbon atoms 176 of the graphene ribbon are interconnected in one or more groups of four, five, seven, eight and nine carbon atoms. The one or more groups of four, five, seven, eight and nine carbon atoms are interconnected to one or more of the regular hexagon 132 groups of the $sp^2$-hybrized carbon atoms 176. In one embodiment, at least some of the $sp^2$-hybrized carbon atoms 176 are interconnected in groups of five carbon atoms, each group of five carbon atoms forming a substantially regular pentagon. In yet another embodiment, at least some of the $sp^2$-hybrized carbon atoms 176 are interconnected in groups of seven carbon atoms, each group of seven carbon atoms forming a substantially regular heptagon.

A carbon nanotube 118 can be a single walled nanotube (SWCNT) or multi-walled nanotube (MWCNT). As noted, a carbon nanotube 118 can be thought of as a graphene ribbon 134 rolled up into a tubular or cylindrical form.

Figure 9:
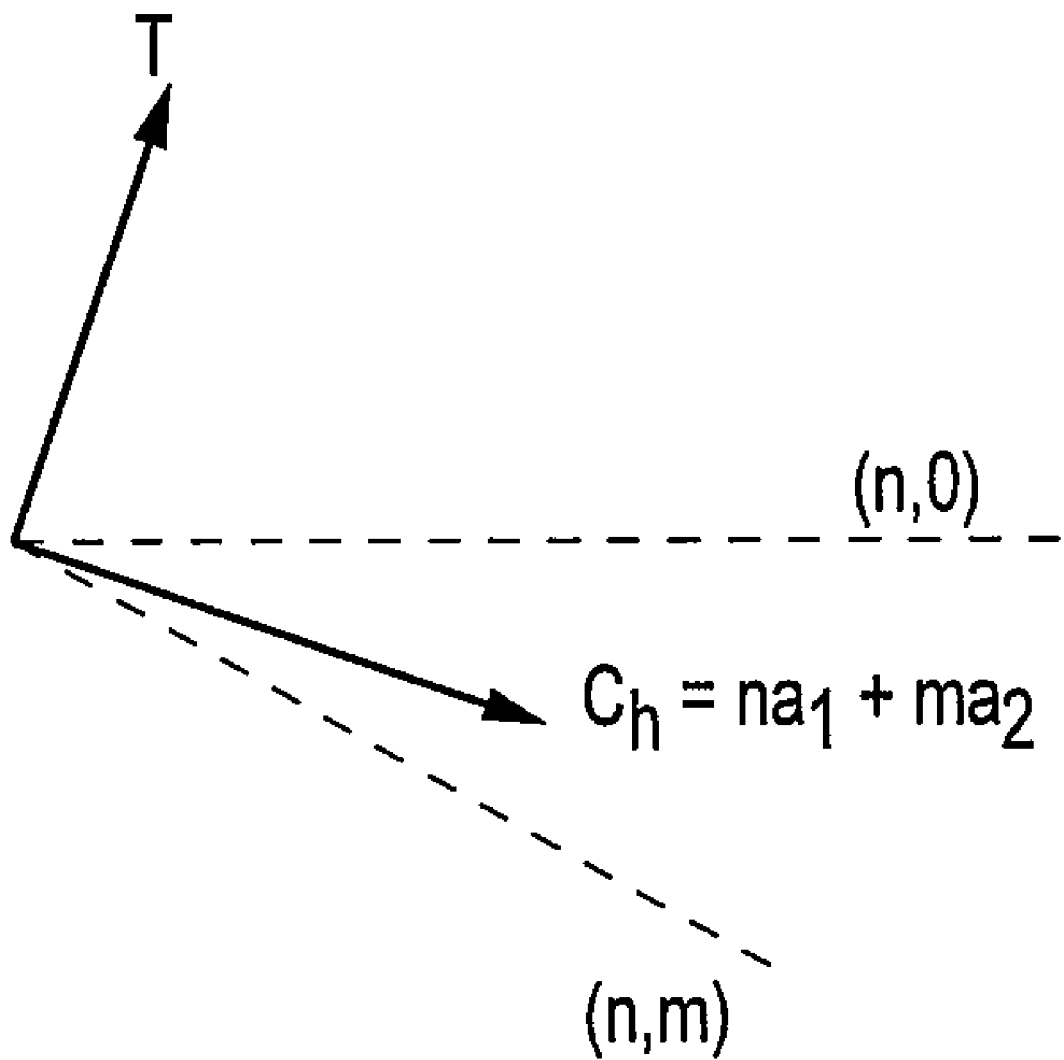
FIG. 9 depicts the carbon nano-tube vector (n, m)

The SWCNT comprises a single graphene ribbon 134 configured as a nanotube. Structurally, the SWCNT comprises a seamless hollow tube having a one-atom thick graphene wall 180 and a chiral vector 124 (FIG. 9). In an embodiment, the SWCNT further comprises a hemispherical graphene cap comprising from about 3 to about 10 pentagons at one or more ends of the SWCNT.

Figure 10:
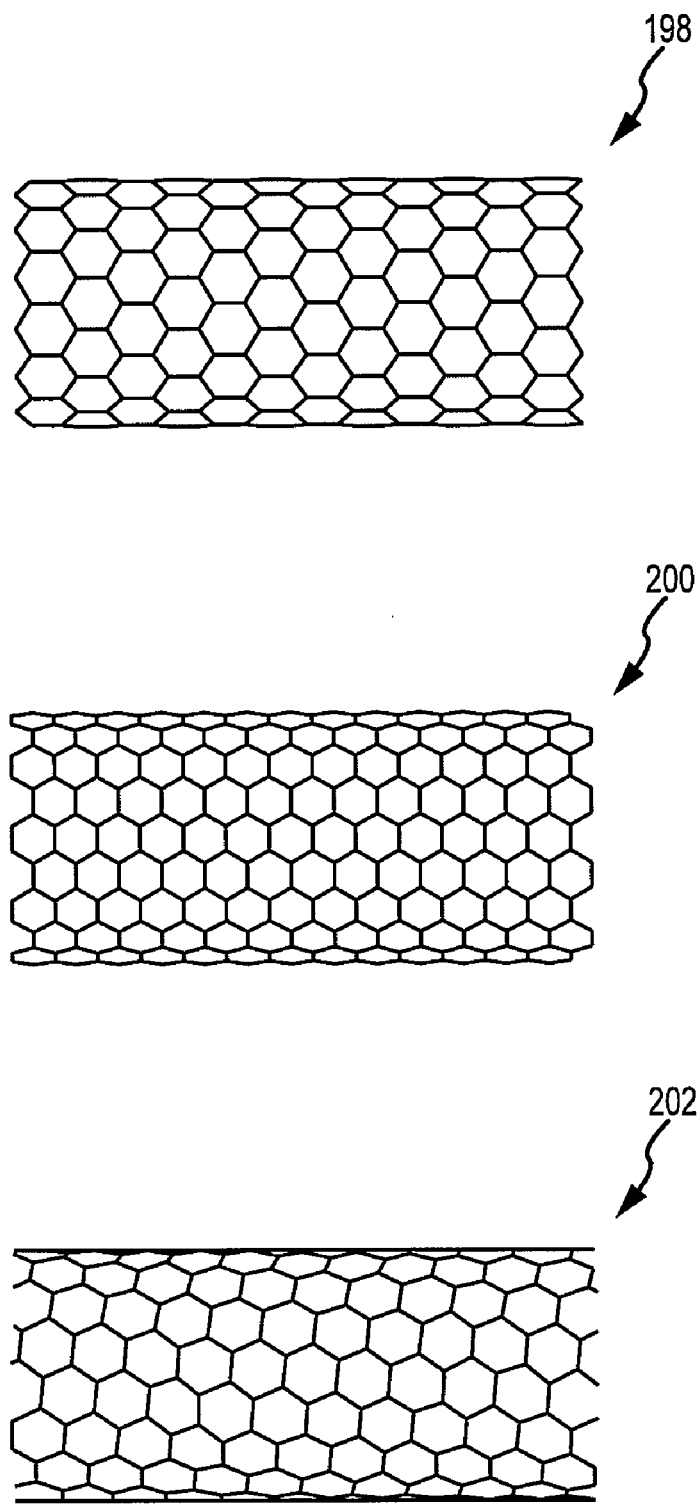
FIG. 10 depicts carbon nanotubes having differing chiral vectors according to another embodiment of the present invention.

The chiral vector 124 comprises a pair of indices (n,m), which denote unit vectors along two directions of the crystal lattice of the graphene ribbon. While not wanting to be bound by any theory, the chiral vector 124 affects the SWCNT electrical properties. Preferred SWCNTs have vectors 124 where one of the following is true: a) n=m; and b) (n−m)/3 is an integer. FIG. 10 depicts single-wall carbon nanotubes 118 having chiral vectors of (0,10), (7,10) and (10, 10), respectively, denoted in FIG. 10 as CNTs 198, 200, and 202.

The carbon nanotubes have a diameter ("ID") 120, length 122 and chiral vector 124. The carbon nanotube diameter ("ID") 120 ranges from about 1 Å to about 200 nanometers. The average, mean or modal lengths of the carbon nanotubes in the anode and cathode can be different. For the anode, the average, mean, or modal carbon nanotube length or height ("H") 122 preferably ranges from about 1,000 nanometers to about 10 centimeters, even more preferably from about 200 μm to about 1,000 μm, and even more preferably from about 500 μm to about 600 μm nanometers. For the cathode, the average, mean, or modal carbon nanotube length or height ("H") 122 preferably ranges from about 1,000 nanometers to about 10 centimeters, even more preferably from about from about 200 μm to about 1,000 μm, and even more preferably from about 500 μm to about 600 μm. Shorter nanotube lengths are preferred for the anode to inhibit the undesirable voltage hysteresis between charge and discharge. The preferred CNT diameter ("ID") 120 ranges from about 3 nm to about 50 nm, and the more preferred CNT diameter 120 (and inter-tube spacing) ranges from about 10 nm to about 20 nm to permit Li and ionic liquid movement into a tube. While not wanting to be limited by theory, for lithium-ion battery applications the CNT length 122 can be more important than the CNT diameter 120.

The CNT has opposing first 144 and second 146 ends. The first 144 and second 146 ends can be opened or closed. The first end is positioned on the electrode surface (that is, one of the anode 106 and cathode 108). Similarly, the graphene ribbon 134 has first and second ends, the first end being positioned on the electrode surface.

Figure 11A:
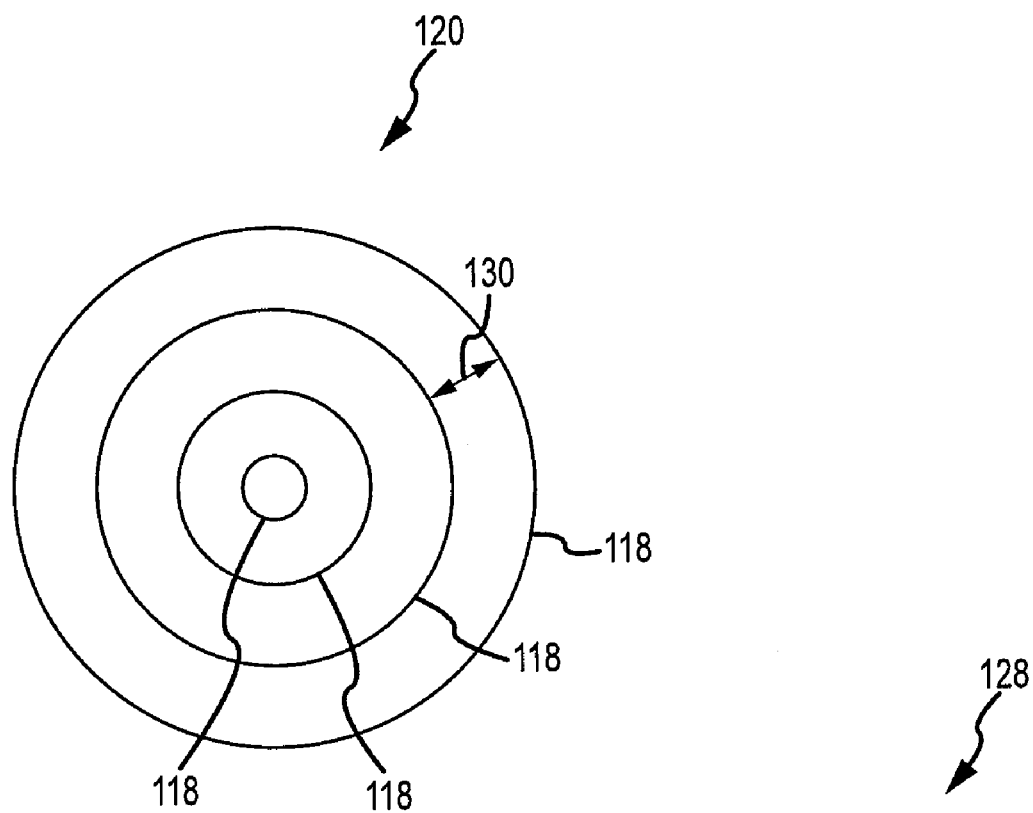
FIGS. 11A and 11B depict cross-sections of multi-walled carbon nanotubes according to an embodiment of the present invention.
Figure 11B:
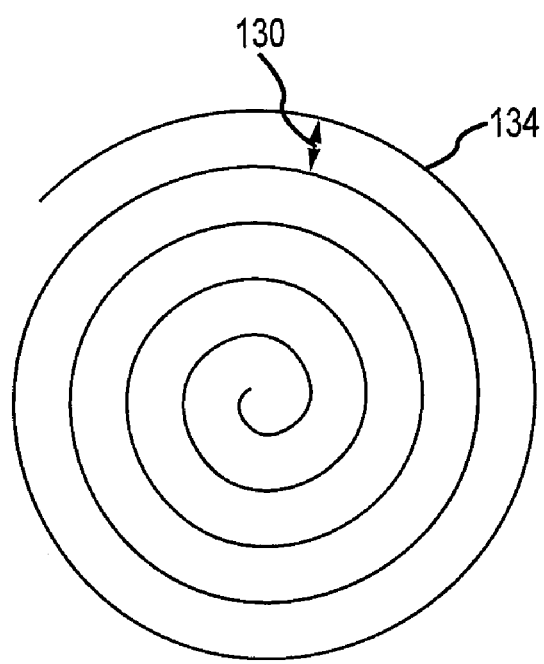

The MWCNT comprises one or more graphene nano-ribbons 134 rolled up around a SWCNT core, the one or more graphene nano-ribbons 134 forming multiple graphene walls 180 (FIG. 11). While not wanting to be bound by any theory, the MWCNT can comprise one of: a) a series of seamless SWCNT tubes arranged as concentric cylinders one inside of another (126) or b) a single graphene nano-ribbon 134 rolled spirally around itself (128). The annular space between the inner and outer CNT walls, or difference between the outer CNT diameter and inner CNT diameter, preferably is larger than the molecular size(s) of the cations and anions comprising the ionic liquid electrolyte 110. The interlay distance 130 between graphene layers ranges from about 1 Å to about 10 Å, preferably from about 2 Å to about 4 Å.

Graphene nano-ribbons 134 can be made by known methods, such as by: expitaxial growth; silicon carbide reduction; hydrazine reduction; sodium reduction of ethanol; chemical vapor deposition; gas-phase synthesis from high temperature, high pressure carbon monoxide; catalytic vapor deposition using carbon-containing feed-stocks and metal catalyst particles; laser ablation; arc method, template synthesis, template-free synthesis, and self-assembly synthesis, or any other method for synthesizing graphene nano-ribbons 134 and/or carbon nanotubes (SWCNT and/or MWCNT).

Figure 12:
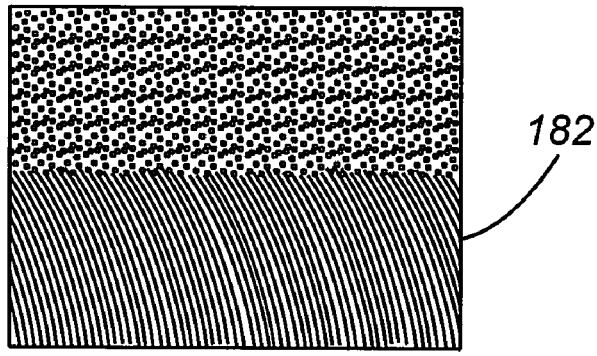
FIG. 12 is a scanning electron microscope image of perpendicularly aligned carbon nanotubes.
Figure 13:
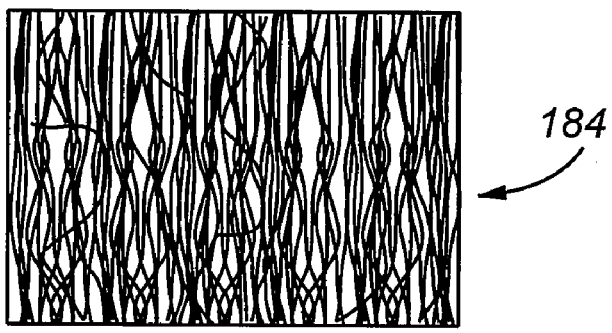
FIG. 13 is a high magnification scanning electron microscope image of perpendicularly aligned carbon nanotubes of FIG. 12.

Preferred methods are chemical vapor deposition to grow random CNTs and plasma-enhanced chemical vapor deposition to grow aligned CNTs on various conductive or semiconductive electrode substrates. The carbon nanotubes can be used as synthesized or after modification. etals, such as Group VIB and/or VIIIB, are possible catalysts/substrates for the synthesis of carbon nanotubes. In one process configuration, a 10 nm aluminum layer is coated on a conductive substrate prior to deposition of a 3-nm thick iron film as a catalyst for CNT growth. Nickel-foil is a preferred conductive substrate but other metals may be employed. The aluminum layer can be important for CNT growth on the conductive substrate. The conductive substrate ensures direct use of the resultant CNT/collector electrode (that is, first 102 and/or second 104 collectors) assemblies without a time-consuming procedure of conductive-layer coating and transferring on an insulting substrate (such as SiO$_2$/Si of the prior art). The catalyst-coated substrate is heated in a quartz tube furnace to a temperature of about 750° C. prior to exposing the catalyst-coated substrate to gaseous mixture comprising about 48% argon, about 28% molecular hydrogen, and about 24% ethylene for a period of time ranging from about 10 to about 20 minutes. In another process configuration, the CNTs are grown by template-free synthesis, which can produce better-aligned CNTs in large-scale with a high purity. Aligned CNTs are prepared through pyrolysis of iron (III) phthalocyanine (FePc) onto a pristine quartz substrate under the atmosphere described above at a temperature of approximately 800 to approximately 1,100° C. followed by a sputter-coated metal (e.g., aluminum) thin (e.g., ranging from about 5 μm to about 100 μm in thickness) layer onto the aligned CNT film. The aligned CNTs/metal assembly is peeled off the quartz substrate in a dry state using a commercially available double-sided conducting tape. In either configuration, the CNT length 122 can be controlled by the controlling pressure of the gaseous mixture and the period of time the heated substrate is exposed to the gaseous mixture. The CNTs are substantially well spaced and vertically attached (that is, perpendicular) to the substrate in a highly aligned manner (FIG. 12).

Figure 29:
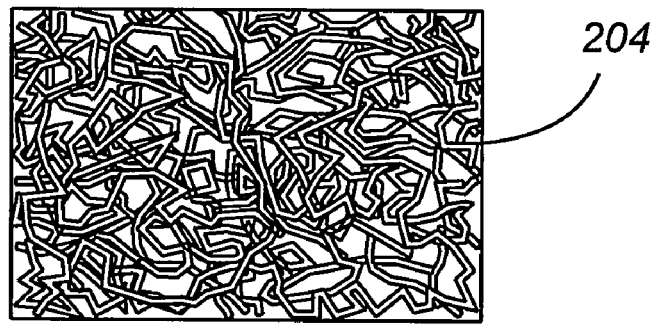
FIG. 29 is a scanning electronic microscope image of randomly entangled CNTs.
Figure 14:
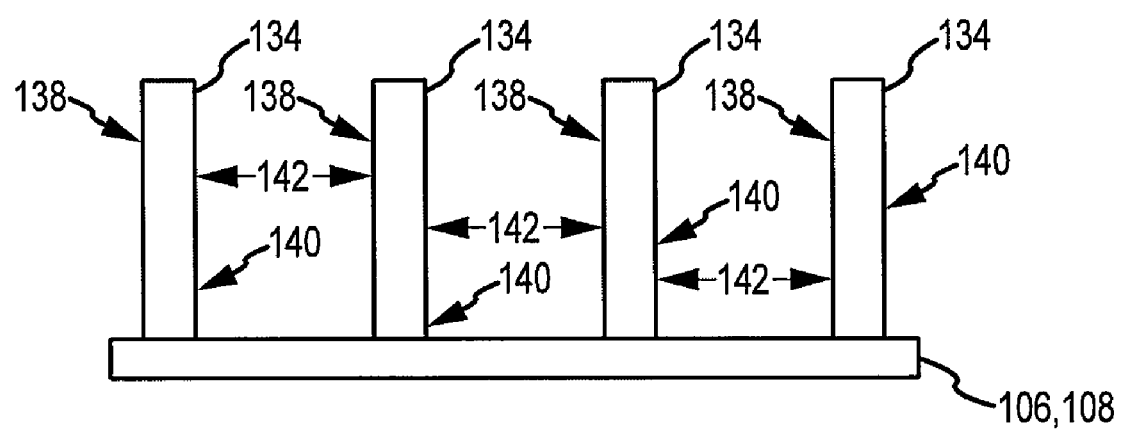
FIG. 14 depicts a cross-sectional view of perpendicularly aligned graphene nano-ribbons.
Figure 15:
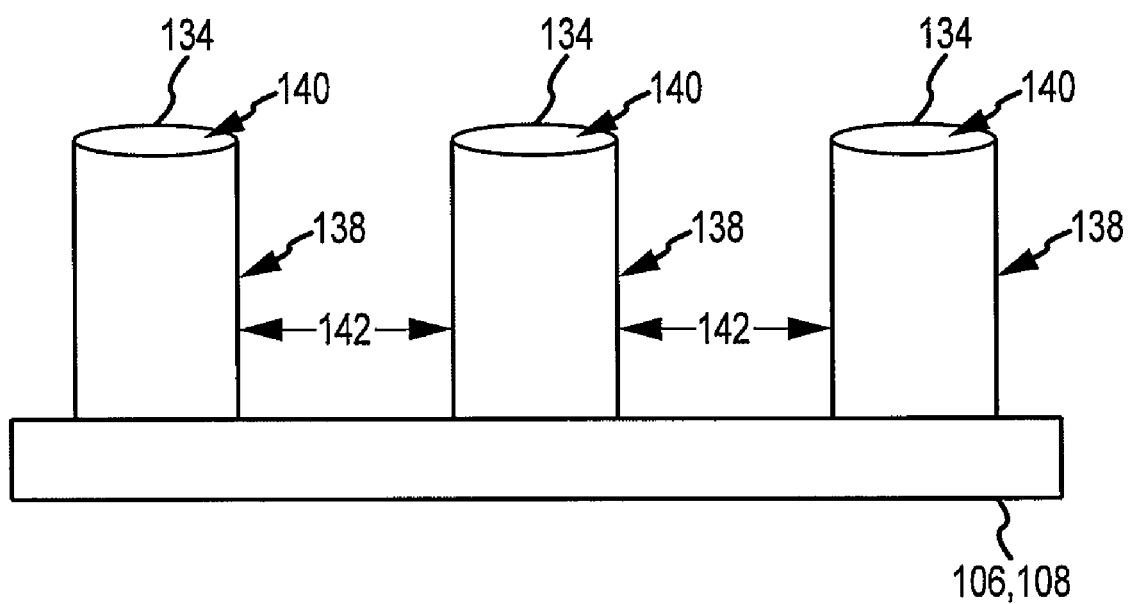
FIG. 15 depicts a cross-sectional view of perpendicularly aligned carbon nanotubes.
Figure 16:
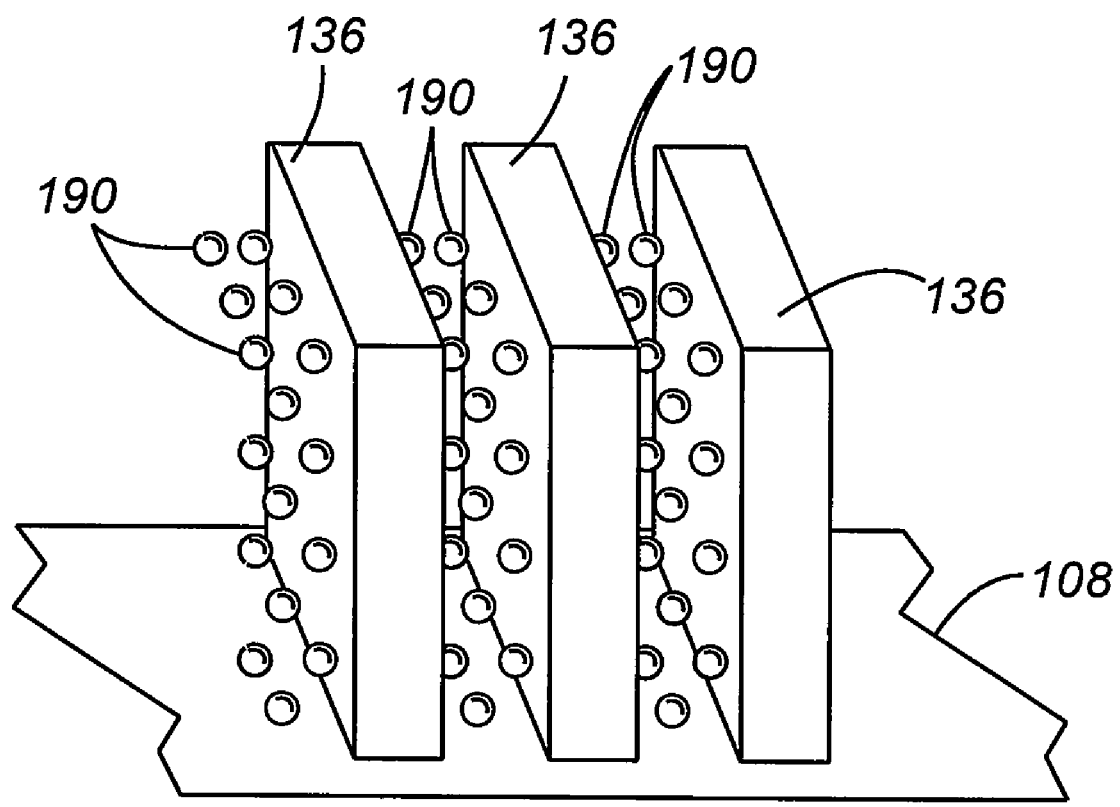
FIG. 16 depicts an elevation view of lithium ion intercalation according to an embodiment of the present invention.
Figure 28:
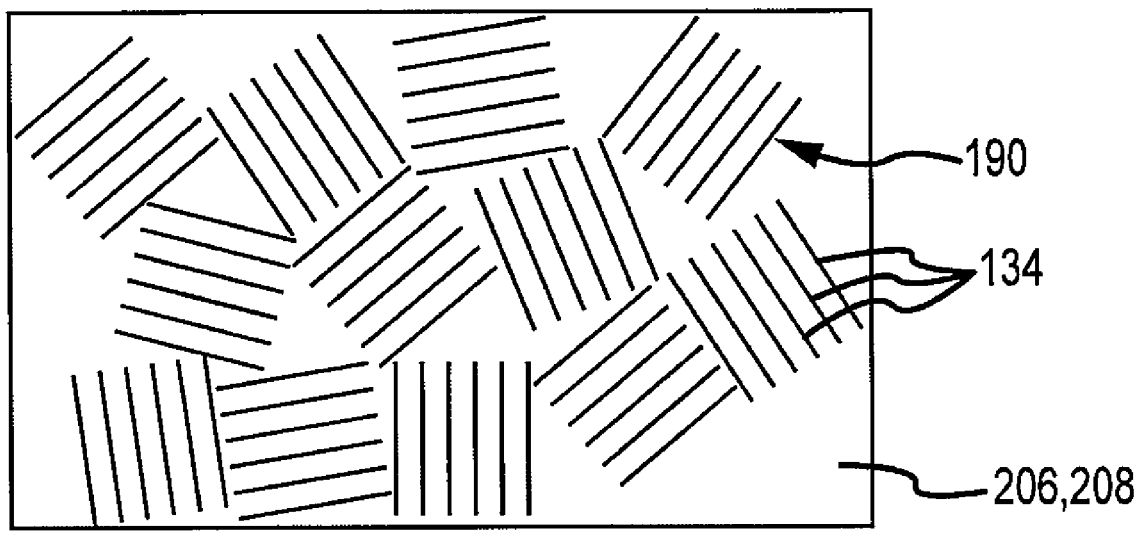
FIG. 28 is an elevated view of a plurality of aligned groups of graphene nanotubes according to an embodiment of the present invention.

In a particularly preferred configuration, at least one or both of the anode 106 and cathode 108 electrodes are formed primarily from aligned 182 or non-aligned 184 (that is, random) carbon nano-ribbons 134, with aligned carbon nano-ribbons 182 being preferred (FIGS. 12-15). It has been found that lithium-ion intercalation/de-intercalation and/or electrolyte 110 accessibility is improved by aligning the graphene nano-ribbons 134 and/or increasing the mass loading of graphene nano-ribbons 134 per electrode surface area. FIG. 16 depicts lithium-ions 190 intercalated on graphene nano-ribbons 134. By way of illustration, aligned CNTs 200 are depicted in FIGS. 12-15. As can be seen from these figures, the longitudinal axes of the individual CNTs are substantially parallel to one another along substantially their entire lengths very much like the fibers on a brush (FIGS. 14 and 15). The longitudinal axes are substantially normal or perpendicular to the planar interface 120 between the electrode and ionic liquid electrolyte 110. In contrast, FIG. 29 shows randomly entangled CNTs 500 having the appearance of a birds nest in which the longitudinal axes of the individual CNTs are not substantially parallel to one another along their entire lengths. Graphene nano-ribbons 134 (such as, CNTs) can provide high electrical conductivity, high surface area, high mesoporosity, and high electrolyte accessibility. As will be appreciated, mesopores (2 to 50 nm) are accessible by the ionic liquid electrolyte 110. While not wishing to be bound by any theory, it is believed that aligned or patterned graphene nano-ribbons 134 (due to their well-defined spacing between ribbons) are even more accessible by electrolytes, particularly organic electrolytes, such as ionic liquids. The substantially perpendicularly aligned graphene nano-ribbons 134 are arranged with a spacing 124 between the graphene nano-ribbons 134 of from about 1 nm to about 1,000 nm. In a preferred embodiment, the graphene nano-ribbon spacing 124 ranges from about 10 nm to about 250 nm. In a more preferred embodiment, the graphene nano-ribbon spacing 124 refers to the spacing between nearest neighbor graphene nano-ribbons 134 arranged in a parallel grouping 196 (FIG. 28). It can be appreciated that, a plurality of parallel groupings 196 can be positioned on positioned on the electrode.

Figure 17:
FIG. 17 is a scanning electron microscope image of aligned carbon nanotubes before plasma-treatment of the carbon nanotubes.
Figure 18:
FIG. 18 is a scanning electron microscope image of aligned carbon nanotubes after plasma-treatment of the carbon nanotubes.

Plasma etching (or other forms of etching or milling) of the plurality of graphene nano-ribbons 134 on the electrode (that is the anode 106 and/or cathode 108) substantially improves the accessibility of the ionic liquid electrolyte 110, the conductivity and current carrying ability of the graphene nano-ribbons 134 and the electrode. More specifically, removing the ends or tips of the CNTs by etching or ball milling substantially "opens up" the interior of the CNTs to the electrolyte, thereby effectively doubling the electrolyte-accessible surface area of the CNT-based electrode. Etching also purifies CNTs by eliminating residual catalysts. With etching CNTs can have an electrolyte-accessible surface area of at least about 400 m$^2$/g. FIG. 17 depicts CNTs prior to etching, and shows that the tips or ends are occluded. FIG. 18 shows CNTs after etching and shows that the ends or tips of the CNTs are opened. To provide effective electrolyte access, the diameters of the CNTs must exceed the molecular size(s) of the cations and anions in the ionic liquid electrolyte 110.

Preferably, the etching is an oxygen plasma etching. The oxygen plasma etching substantially removes any surface contamination and/or amorphous carbon on the graphene nano-ribbon 134. The oxygen plasma etching is performed by a commercial radio frequency generator operating at 250 kHz, 30 W and 0.62 Torr for 20 minutes. It has been found that conducting the plasma etching under these conditions substantially removes any dense amorphous layer that covers the graphen nano-ribbon 134 without substantially damaging the graphene nano-ribbon 134. Furthermore, the oxygen plasma etching increases the spacing 134 between graphene nano-ribbons to substantially enhance accessibility of the electrolyte 110.

While not wanting to be bound by theory, the removal of the amorphous carbon layer from the graphene nano-ribbon 134 substantially increases the ionic liquid electrolyte 110 access to the graphene nano-ribbon 134. The plasma etch increases the graphene nano-ribbon 134 surface area available to the ionic liquid electrolyte 110 (compare FIG. 12 (aligned CNTs with FIG. 13 (random CNTs). That is, the graphene nano-ribbon spacing 142 after the plasma etching is greater than the graphene nano-ribbon spacing 142 before the plasma etching. In a preferred embodiment, the graphene nano-ribbon spacing 142 after the plasma etching is from about 5 nm to about 1000 nanometers. More preferred the graphene nano-ribbon spacing is from about 10 nm to about 250 nm after the plasma etching.

The surface area of each opened graphene nano-ribbon 134 comprises the sum of the surface areas of the opposing first 138, second 140 nano-ribbon surfaces and the internal wall 188. It can be appreciated that, when the graphene nano-ribbons comprise CNTs, the opposing surfaces comprise the internal 188 and external 186 walls of the CNT. In one configuration, the plurality of aligned carbon nano-ribbons 182 has a greater total graphene nano-ribbon surface area than the plurality of non-aligned (or random) graphene nano-ribbons 184. In a preferred embodiment, the nano-ribbon 134 surface area is at least about 200 square meters per gram and even more preferred the nano-ribbon 134 surface area is at least about 400 square meters per gram. At least most of the graphene nano-ribbons 134 are arranged in a substantially perpendicular alignment. In yet another embodiment, the surface area of the graphene nano-ribbon 134 can be increased by etching, as for example, the at least partial opening-up of a carbon nanotube.

It can be appreciated that, in general, the greater the mass loading of graphene nano-ribbons 134 per electrode (anode 106 and/or cathode 108) surface area the greater the total graphene nano-ribbon 134 surface area per electrode. That is, for a given graphene nano-ribbon 134 size (such as, CNT diameter 120 and/or length 122), the greater the mass loading of graphene nano-ribbons 134 per the electrode surface area the greater the total graphene nano-ribbon surface area per electrode. Preferred graphene nano-ribbon 134 mass loading ranges from about 0.1 mg/cm$^2$ to about 4.5 mg/cm$^2$ of electrode, even more preferred loading level ranges from about 1.0 mg/cm$^2$ to about 2.0 mg/cm$^2$ of electrode.

In one preferred embodiment, lithium-ion intercalation/de-intercalation and/or electrolyte 110 accessibility is facilitated by aligning the graphene nano-ribbons 134. The aligned graphene nano-ribbons 134 have a total nano-ribbon surface area from about 250 cm$^2$ to about 10,000 cm$^2$ per cm$^2$ of the electrode. In a preferred embodiment, the nano-ribbon surface area is from about 600 cm$^2$ to about 3,500 cm$^2$ per cm$^2$ of the electrode (that is, anode 106 and/or cathode 108). It can be appreciated, that the total nano-ribbon surface area refers to the surface available for lithium-ion intercalation/de-intercalaration and/or electrolyte. That is, the total nano-ribbon surface does not include occluded surface areas, such the internal surface area of CNTs having a plugged, capped and/or blocked first 144 and/or second 146 ends.

The alignment, orientation and loading levels of the graphene ribbons 134 on the electrodes (that is, anode 106 and/or cathode 108) ensures sufficiently high rate of lithium-ion intercalation and/or de-intercalation and fast charge transport through the electrolyte 110. The fast charge transport and high rate capability support high power density electrochemical batteries.

Furthermore, by increasing the graphene nano-ribbons 134 spacing 142 on the electrode (that is, the anode 106 and cathode 108) increases the acceptable range of ionic liquid electrolyte 110 viscosities. That is, the more aligned and/or the greater the spacing 142 of the graphene nano-ribbons 134 the greater the range of ionic liquid viscosities that are acceptable.

The anode 106 includes the graphene nano-ribbons 134 aligned substantially perpendicular on the anode 106. The plasma etching of the graphene nano-ribblons 134 substantially improves one or both of lithium-ion intercalation and de-intercalation capacities of the anode 106. The improved lithium-ion intercalation/de-intercalation substantially decreases and/or eliminates the undesirable charging/discharging voltage hysteresis associated with the lithium-ion battery anodes of the prior art.

In one embodiment, at least one of the anodic lithium-ion intercalation and de-intercalation levels is at least about 200 mAh/g and in a preferred embodiment, at least about 400 mAh/g. In an even more preferred embodiment, the lithium-ion intercalation/de-intercalation is at least about 700 mAh/g.

The cathode 108 includes the graphene nano-ribbon 134 and a metal oxide, preferably a thin layer metal oxide positioned on the graphene nano-ribbon 134. The metal oxide layer can be continuous or discontinuous. In a preferred embodiment, the metal oxide coating is applied, continuously or discontinuously, on one or more of the exterior wall 186 and/or interior wall 188 of the graphene nano-ribbon and/or nanotube. In some configurations, the metal oxide coating can bridge and/or occlude the nanotube open-end. In one embodiment, the metal oxide layer comprises particles of metal oxide.

Preferred metal oxides intercalate/de-intercalate at least about two moles of lithium-ions per mole of metal oxide. More preferred are metal oxides that can intercalate/de-intercalate at least about four moles of lithium-ions per mole of metal oxide.

In a preferred embodiment, the metal oxide comprises one of: a cobalt oxide, a lithium-containing cobalt oxide; an iron phosphate; a lithium-containing iron phosphate; a metal-containing spinel; a lithium-containing spinel; manganese oxide; a lithium-containing manganese oxide, titanium disulfide; a lithium-containing titanium disulfide; a vanadium oxide; a lithium-containing vanadium oxide; and combinations thereof. In a more preferred embodiment, the metal oxide comprise: cobalt oxides; lithium-containing cobalt oxides; vanadium oxides; lithium-containing vanadium oxides, and composites and mixtures thereof. Even more preferred are vanadium oxides and lithium-containing vanadium oxides comprising $V_2O_5$ and its lithium-containing analogues.

Vanadium oxide ($V_2O_5$) is a metal oxide that can intercalate/de-intercalate about four moles of lithium-ions per mole of $V_2O_5$. However, vanadium oxide has relatively low conductivity (about $10^{-6}$ to about $10^{-7}$ S/cm) and a relatively low lithium-ion diffusion rate ($10^{-13}$ cm$^2$/s). The low conductivity and lithium-ion diffusion rate has hampered the use of vanadium oxide for electrode applications.

It was surprisingly found that applying a coating of vanadium oxide to graphene nano-ribbons 134 having a large nano-structured surface area allows for a cathode 108 having substantially sufficient large lithium-ion intercalation/de-intercalation levels, lithium-ion diffusion rates, and conductivity. In a preferred embodiment, the cathode 108 comprises graphene nano-ribbons 134 having a thin layer of vanadium oxide applied thereto. More preferred are cathodes 108 having vanadium oxide coated graphene nano-ribbons 134 having a surface area from about 250 cm$^2$ to about 10,000 cm$^2$ of graphene nano-ribbon per cm$^2$ of the cathode.

Cathodes 108 comprising vanadium oxide coated graphene nano-ribbons 134 can have capacities of at least about 400 mAh per gram of vanadium oxide. In a preferred embodiment, the capacity of vanadium oxide coated graphene ribbon cathode 108 is about 500 mAh or greater per gram of vanadium oxide. Stated another way, the cathode 108 can have a capacity of at least about 250 mAh per gram of vanadium oxide coated graphene nano-ribbon 134. In a preferred embodiment, the capacity of the cathode 108 is at least about 350 mAh per garm of vanadium oxide coated graphene nano-ribbon 134. It can be appreciated that the graphene nano-ribbon 134 can be one of a planar graphene nano-ribbon 114, a non-plananr graphene nano-ribbon 116, and a cylindrical graphene nano-ribbon 118 (as for example, a SWCNT or a MWCNT).

The metal oxide coating can be applied to the graphene nano-ribbon 134 by any suitable method know within the art. Non-limiting examples of suitable coating methods are, without limitation: electrochemical deposition; chemical vapor deposition; vapor deposition; sputtering deposition; and reactive deposition.

Electrochemical deposition is a preferred process for depositing vanadium oxide on the graphene nano-ribbons 134. The preferred electrochemical process is a potential cycling voltammetric method which deposits vanadium oxide (V$_2$O$_5$) by the following the chemical reaction depicted in equation (3):

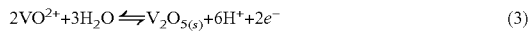

$$2VO^{2+} + 3H_2O \rightleftharpoons V_2O_{5(s)} + 6H^+ + 2e^- \quad (3)$$

The VO$^{2+}$ cation can be supplied as any VOX salt, where X is an anion. Non-limiting examples of suitable VOX salts are: VOSO$_4$, VOF$_2$, VOCl$_2$, VOBr$_2$, VO(NO$_3$)$_2$, (VO)$_3$(PO$_4$)$_2$, VOCO$_3$, VO(acetylacetonate), VO(dialkyloxide) [such as, without limitation, dipropoxide, diethoxide, and such) and mixtures thereof. A preferred VOX salt is VOSO$_4$. During the deposition of V$_2$O$_5$ on the graphene nano-ribbons 134 an increase in current is observed during the potential cycling. The amount of V$_2$O$_5$ deposited can be controlled by one of the current applied during the deposition process and/or number of potential cycles.

Figure 35:
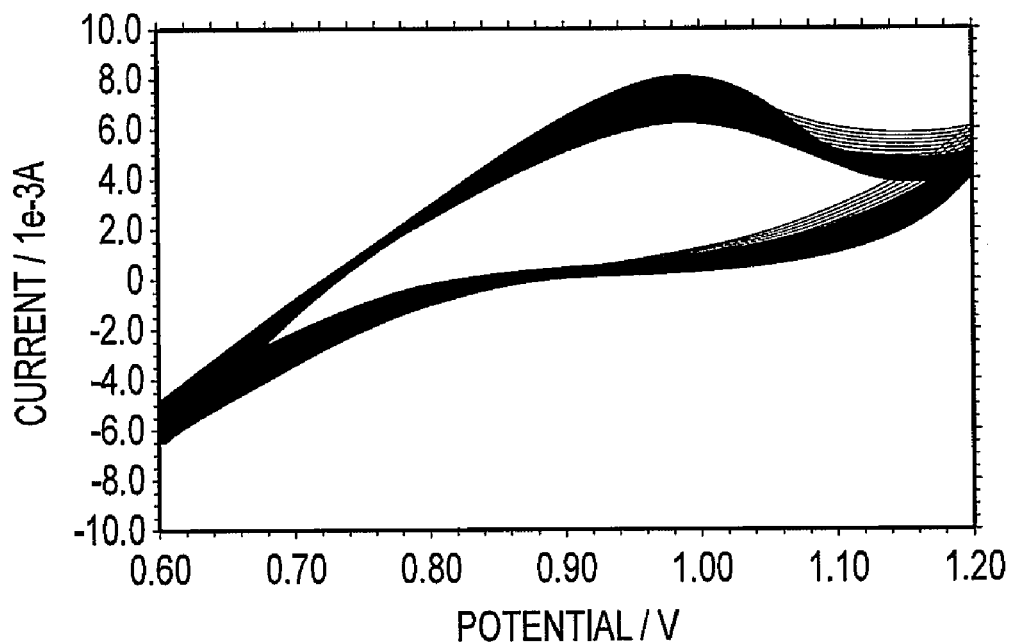
FIG. 35 depicts a family of cyclic voltammograms for a plasma-etched carbon nanotube electrode in 0.1 M VO[SO$_4$] in a pH 1.8 sulfuric acid solution.

At least one of the current and/or number of potential cycles is controlled to substantially achieve a uniform substantially thin coating of V$_2$O$_5$ along the entire length and/or surface of the graphene nano-ribbon 134. FIG. 35 depicts an increase in current during potential cycling deposition of vanadium oxide on the graphene nano-ribbons 134. The cyclic voltammometric potential deposition was conducted in 0.1 M VO[SO$_4$] sulfuric acid solution having a pH of about pH 1.8, at a scan rate of about 50 millivolts per second. The graphene nano-ribbon coated electrode surface area was about 1 cm$^2$. The auxiliary electrode was Pt wire (1.5 mm diameter) auxiliary electrode and the reference electrode was Ag/AgCl (3M NaCl). The total of about 200 cyclic voltammometric potential scans were conducted, the current increased during the scans from about 0.6 to about 1.2 volts (versus, the Ag/AgCl reference electrode). The electrochemical deposition of V$_2$O$_5$ is preferably conducted in a solution comprising: 0.1 M VOCl$_2$, or 0.1 M (VO)$_3$(PO$_4$)$_2$, or 0.1 M VO[SO$_4$] sulfuric acid solution having a pH of about pH 1.8, or mixtures thereof. Preferred, electrochemical deposition voltages range from about 0 volt to about 2 volts vs. Ag/AgCl reference electrode. More preferred electrochemical volts range from about 0.6 volt to about 1.2 volts vs. Ag/AgCl reference electrode. The electrochemical deposition current densities are from about 0.1 amps/cm2 to about 20 amps/cm2, more preferred electrochemical deposition current densities are from about 1 amps/cm$^2$ to about 10 amps/cm2.

The charging/discharging capacity of the V$_2$O$_5$ coated graphene nano-ribbon 134 can be substantially controlled by the amount of V$_2$O$_5$ deposited on the graphene nano-ribbon 134. In a preferred embodiment, the mass of V$_2$O$_5$ deposited ranges from 0.2 grams V$_2$O$_5$ to 2.5 grams V$_2$O$_5$ per cm$^2$ surface area of graphene nano-ribbons 134.

Figure 19:
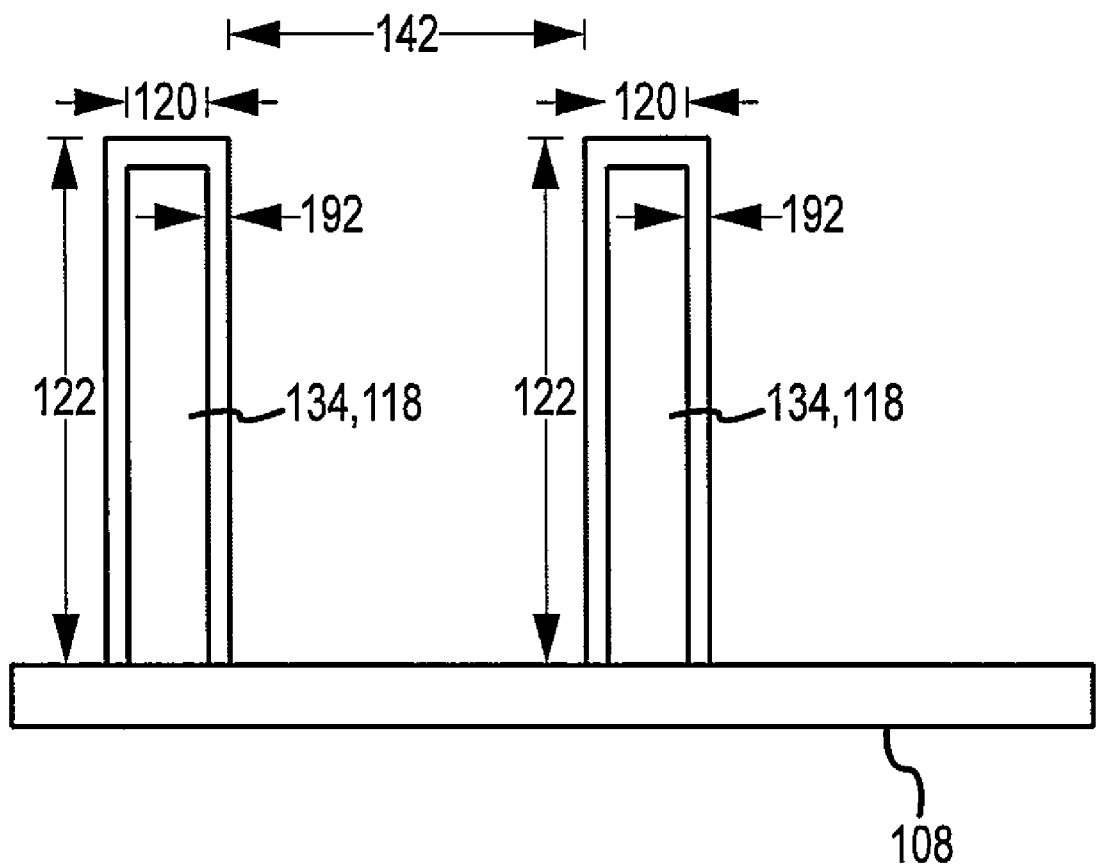
FIG. 19 is a cross-sectional view of a closed-off and/or occluded composite cathode according to an embodiment of the present invention.
Figure 36:
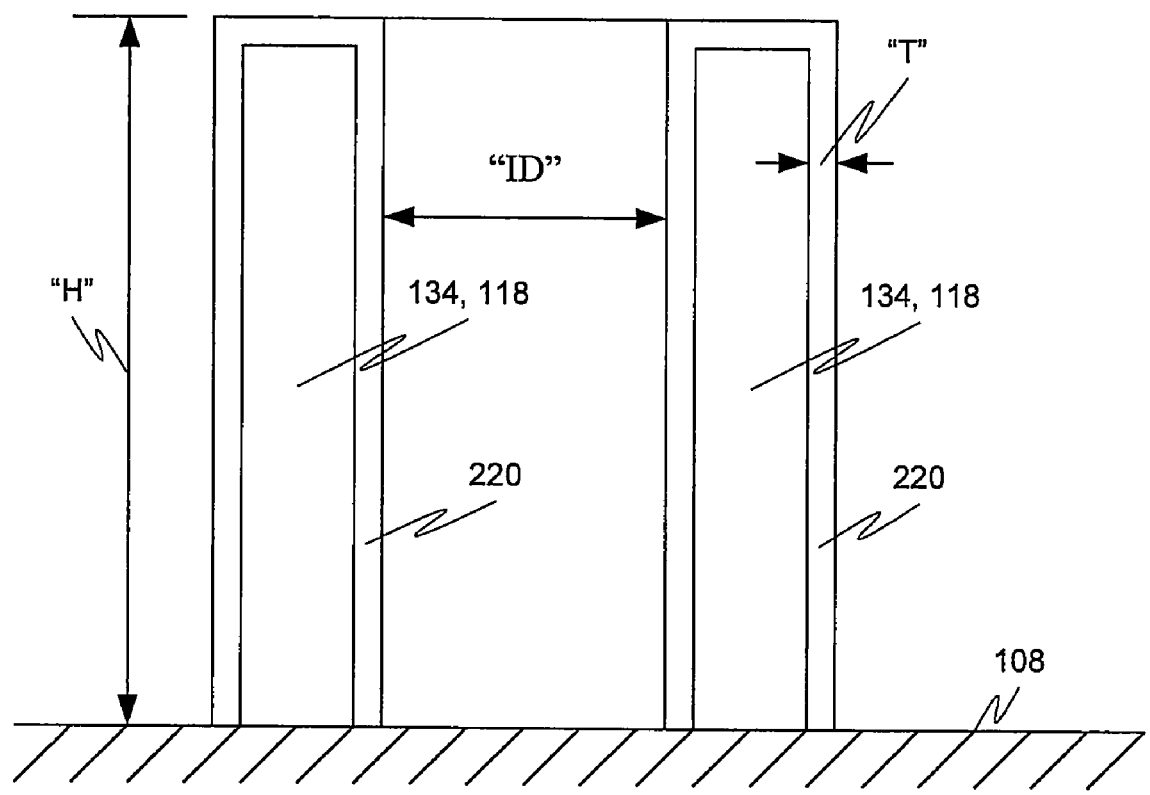
FIG. 36 depicts a cross-sectional view of a nanotube having a metal-containing coating on inside and outside of the nanotube according to an embodiment of the present invention.

After coating the graphene nano-ribbons 134 with V$_2$O$_5$, the V$_2$O$_5$ coated graphene nano-ribbons 134 are annelated to a thin film crystalline V$_2$O$_5$ structure. The thin film crystalline V$_2$O$_5$ 220 on the graphene nano-ribbons 134 forms a composite cathode structure 148 (FIGS. 19 and 36) having a thickness 192. The annealing process is conducted at a temperature ranging from about 100° C. to about 1,000° C., preferably from about 150° C. to about 250° C. and for a period of time ranging from about 0.25 hours to about 36 hours, more preferably from about 8 hours to about 12 hours. FIG. 19 depicts a vanadium oxide coated cathode having a closed-off and/or occluded end. FIG. 37 depicts an open-ended vanadium oxide coated cathode having a height "H" and an inner diameter "ID" and a thin film vanadium oxide 220 coated inner wall In a preferred embodiment, the composite cathode structure 148 has a CNT length 122 is from about 10 μm to about 2,500 μm and in a more preferred embodiment, the CNT length is from about 100 μm to about 1,000 μm. The composite cathode 148 has a CNT length 122 in an even more preferred embodiment from about 300 μm to about 700 μm.

The thickness of the metal-oxide coating can be important. Increasing the thickness of the metal-oxide coating has been found to result in a decrease in the capacity and rate performance of the cathode. While not wishing to be bound by any theory, it is believed that the metal-oxide coating blocks the pores within the graphene nano-ribbons, resulting in a reduction of the electrochemical utilization of the metal oxide and, hence, the decreased performance of the composite cathode. Aligned graphene nano-ribbons can provide a high capacity and high rate capability for the composite cathode due to its high surface area.

In a preferred embodiment, the V$_2$O$_5$ has a film thickness ("T") 192 ranging from about 0.5 nm to about 100 nm, in a more preferred embodiment the film thickness 192 ranges from about 1 nm to about 15 nm, and in an even more preferred embodiment the film thickness 192 ranges from about 1 nm to about 10 nm. In another preferred embodiment, the V$_2$O$_5$ film has a current density ranging from about 0.5 amps per gram of V$_2$O$_5$ film to about 200 amps per gram of V$_2$O$_5$ and a more preferred current density ranging from about 3 amps per gram of V$_2$O$_5$ to about 100 amps per gram V$_2$O$_5$. In an even more preferred embodiment, the V$_2$O$_5$ film has a current density ranging from about 3 amps per gram of V$_2$O$_5$ to about 10 amps per gram of V$_2$O$_5$.

The high cathodic current densities are due at least to one or more of: having more active V$_2$O$_5$ available and positioned adjacent to and/or in contact with highly conductive graphene nano-ribbon 134. The $V_2O_5$ is more active due the vanadium oxide being deposited as a thin film. The vanadium oxide thin film is more conductive and more diffusive to lithium-ions than the $V_2O_5$ thick films of the prior art. For a given mass of $V_2O_5$, a thin film of $V_2O_5$ coated on graphene nano-ribbons presents more $V_2O_5$ in contact with one of the lithium-ions and/or ionic electrolyte 110 than a thick film of $V_2O_5$. That is, a thin film of $V_2O_5$ has a greater amount of $V_2O_5$ available for lithium-ion intercalation/de-intercalation and ionic electrolytic accessibility than a thick film of $V_2O_5$ of the same mass. It can be appreciated that, $V_2O_5$ positioned adjacent to and/or in contact with highly conductive graphene nano-ribbon 134 can more easily and more effectively conduct electrical energy. That is, a thin film of $V_2O_5$ positioned adjacent to and/or in contact with highly conductive graphene nano-ribbon 134 can transmit more current with less resistance than a thick film of $V_2O_5$ positioned adjacent to and/or in contact with a less conductive substance.

The graphene nano-ribbons 134 retain at least most, if not all, of their alignment and graphene nano-ribbon spacing 142 during the coating deposition and annealing processes. The retention of at least most, if not all, of the graphene nano-ribbon spacing 142 and alignment is important for creating a large nano-structured surface area for a substantially sufficient large lithium-ion intercalation/de-intercalation levels and ionic liquid accessibility.

Figure 32:
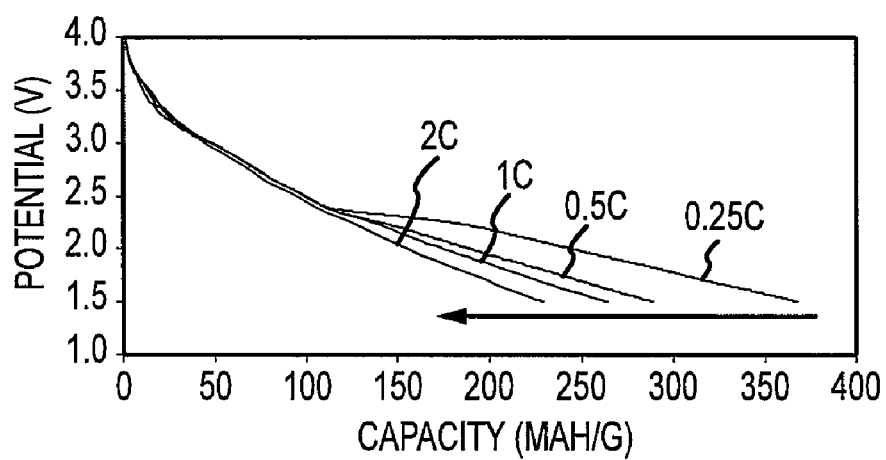
FIG. 32 depicts a family of galanvostatic deischarges for a vanadium oxide-carbon nano-tube composite cathode obtained in 1 M Li[TFSI], 20 volume % ethylene carbonate in [EDMMEA][TFSI]

The capacity of the composite cathode 148 is determined by the vanadium oxide loading level. For example, a vanadium oxide loading of about 0.5 g of $V_2O_5$ per gram of cathode can produce a cathodic capacity of at least about 300 mAh/g. In a preferred embodiment the capacity of composite cathode 148 ranges from about 350 mAh/g to about 1,000 mAh/g (based on on $V_2O_5$ mass). In a more preferred embodiment, the cathodic capacity ranges from about of about 500 to about 800 mAh/g (based on $V_2O_5$ mass), with a capacity greater than the theoretical value of 590 mAh/g for pure $V_2O_5$. While not wanting to be bound by any theory, this is believed to be due to the high-surface-area CNTs of the $V_2O_5$—CNT composite cathode 148. That is, the aligned CNTs nanostructure improves the electroactivity of $V_2O_5$ and the high CNT surface area improves the double-layer-charging energy storage. Furthermore, the capacity (based on $V_2O_5$ mass) can decrease with increased $V_2O_5$ loading on the CNTs. This decrease in capacity is presumably due to the reduced electroactivity of a relatively thick $V_2O_5$ film. However, it should be noted that, the capacity as measured by the overall mass of the $V_2O_5$—CNT composite cathode 148 (see FIG. 32) can improve. Even more $V_2O_5$ loading of the CNTs blocked the spaces between CNTs, further reducing the composite electrode capacity and rate capability.

The $V_2O_5$ loading of the composite electrode 148 is from about 30% to about 90% of the composite. In a preferred embodiment, the $V_2O_5$ loading of the composite electrode 148 is from about 50% to about 70% of the composite, even more preferred the $V_2O_5$ loading is about 60% loading level on the composite. The $V_2O_5$ loading of the composite electrode 148 is about two times greater than the loading level on a randomly entangled CNT paper substrate. Not wanting to be bound by any theory, the higher $V_2O_5$ loading on the aligned CNTs is due to the higher surface area of aligned CNTs compared to randomly entangled CNT paper. The greater electrode capacity and rate capability are achieved with the $V_2O_5$—CNT composite cathode having a greater $V_2O_5$ loading.

Figure 33:
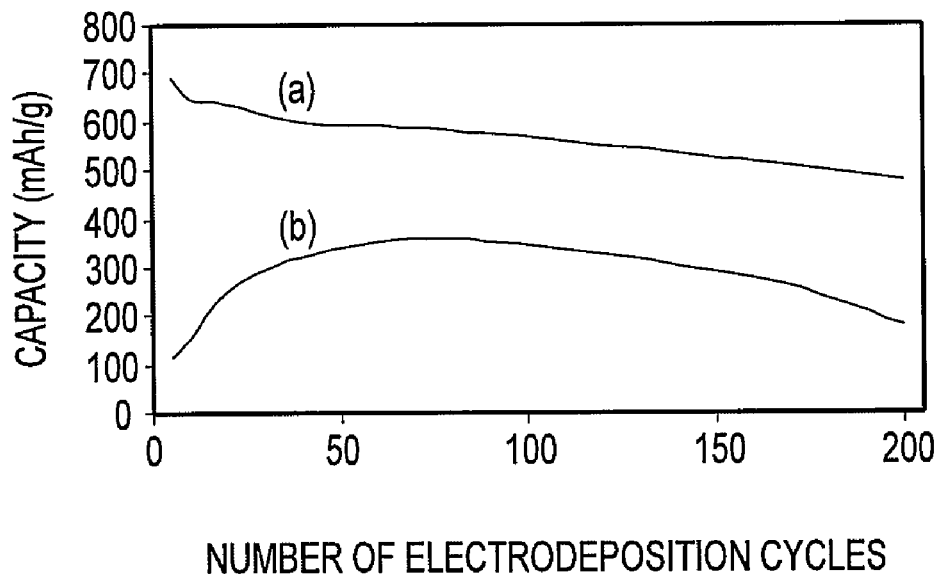
FIG. 33 depicts the affect the vanadium oxide electrodeposition has on the capacity of the composite cathode.

FIG. 33 depicts the affect the vanadium oxide electrodeposition has on the capacity of the composite cathode 148. That is, FIG. 33 depicts the capacity of the composite cathode by vanadium oxide mass, line (a) and by vanadium oxide-carbon nano-tube mass, line (b) as measured at a discharge rate of 0.25 C per standard conditions of Experimental section II and FIG. 32. The optimum level of vanadium oxide loading is obtained from about 25 to about 150 potential cycles. More preferred, optimum loading after about 50 to about 120 potential cycles.

Table I lists anode 206 and composite cathode 148 properties according to one embodiment of the present invention. For example, for a composite cathode 148 prepared according to one embodiment can have a capacity of at least about 360 mAh/g and a columbic efficiency of least about 99%. The capacity of the composite cathode 148 (FIG. 32) is more than about two times the capacity (140 mAh/g) of conventional $LiCoO_2$ cathode materials. The capacity was determined by a galvanostatic charge/discharge test at a rate of 0.25 C. A capacitive-like discharge can appear with an increase in the discharge rate. At a charge/discharge rate of about 2 C, the $V_2O_5$—CNT composite cathode 148 has a capacity of at least about 230 mAh/g, which corresponds to a capacity retention of at least about 64%. In other words, $V_2O_5$—CNT composite cathode 148 can have excellent reversibility, cycle life, and high-power charge/discharge properties.

TABLE 1

Electrochemical properties of CNT anode and $V_2O_5$-CNT composite cathode obtained in 1M LiTFSI, 20% EC in [EDMMEA][TFSI] electrolyte

| Property | Aligned CNT anode | $V_2O_5$-CNT composite cathode |
|---|---|---|
| Columbic efficiency (%) | 90 | 99% |
| Capacity (mAh)* | 600 | 585 (by $V_2O_5$ mass) or 360 (by $V_2O_5$-CNT mass) |
| Capacity retention (%)** | 61 | 64 |

*Measured at 2 C.
**Ratio of capacity at 2 C to that at 0.25 C.

Figure 34:
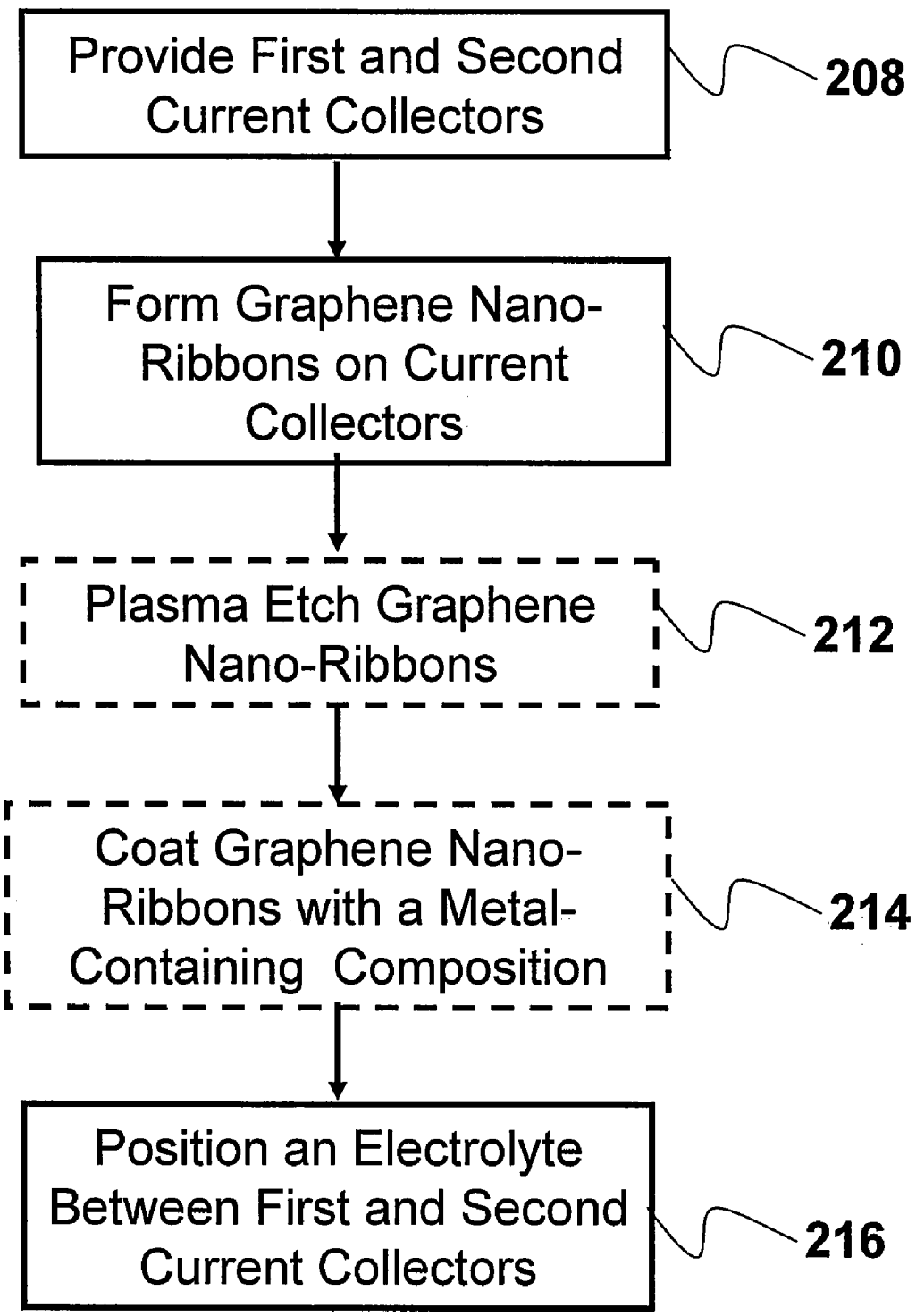
FIG. 34 depicts a process for making a battery according to an embodiment of the present invention.

Another aspect of the present invention (depicted in FIG. 34) is a process for making a battery. In step 208, first 102 and second 104 current collectors are provided. Graphene nano-ribbons 134 are formed on the first 102 and second current collectors in step 210. In optional step 212, the graphene nano-ribbons on one or both of the first 102 and second 104 current collectors are plasma etched. The graphene nano-ribbons 134 on the first current collector 102 are coated with at a metal-containing composition (such as, a metal or metal oxide) in optional step 214. In step 216, an electrolyte is position between the first 102 and second 104 current collectors. In a preferred embodiment, the electrolyte is an ionic liquid electrolyte 110. In optional embodiment, the ionic liquid electrolyte 110 contains one or more of a membrane 112, a solid electrolyte interphase film-forming additive, and a salt.

EXPERIMENTAL

Section I—Lithium Salt-Doped Ionic Liquid Electrolytes

Figure 30:
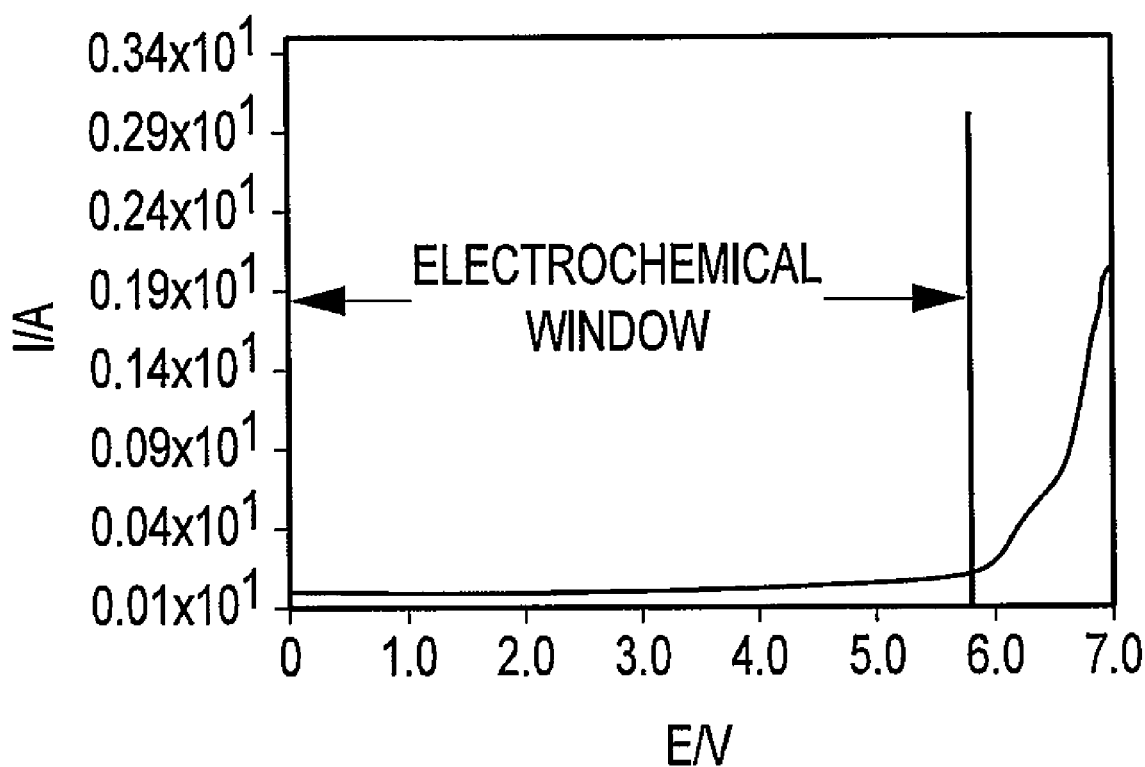
FIG. 30 is a linear sweep voltammogram obtained in 1 M Li[TFSI], 20 volume % ethylene carbonate in [EDMMEA][TFSI]

Ionic conductivity was measured by AC impedance spectroscopy and electrochemical stability was measured using linear sweep voltammetry (FIG. 30). In general, the pyrrolidinium ionic liquid-based electrolytes showed a relatively higher ionic conductivity but a narrower electrochemical window than the ammonium ionic liquid-based ones. While on the other hand, the ammonium ionic liquid-based electrolytes showed a broader electrochemical window and a reasonably high ionic conductivity.

Figure 31:
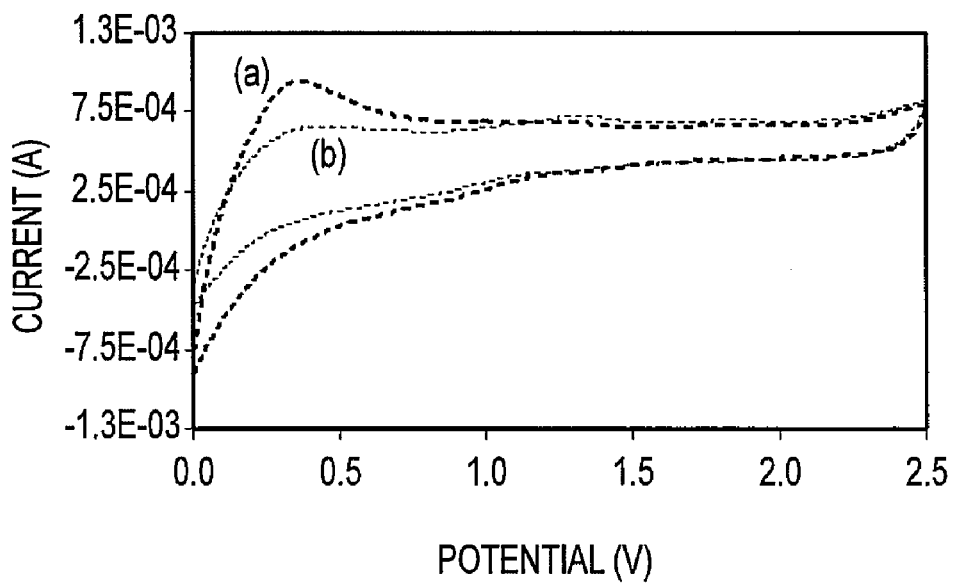
FIG. 31 is a family of cyclicvoltammograms obtained in 1 M Li[TFSI], 20 volume % ethylene carbonate in [EDMMEA][TFSI]

In each of the ionic liquid electrolytes tested, Li[TFSI] was the most soluble lithium salt (compared to Li[BOB] and LiBF$_4$) and Li[BOB] was the least soluble. Furthermore, the ionic liquid electrolyte containing Li[TFSI] had the highest ionic conductivity and the ionic liquid containing Li[BOB] had the lowest ionic conductivity. The properties of the Li[TFSI] containing electrolytes are summarized in Table 2 and the electrochemical window of the electrolyte incorporating Li[TFSI], ethylene carbonate, and [EDMMEA][TFSI] is shown in FIG. 30.

was an irreversible reduction peak at 1.1 V (vs. Li/Lie) and attributed to the reduction of the ethylene carbonate to form solid electrolyte interphase. The reduction peak at 1.1 v (vs. Li/Li$^+$) diminished and eventually disappeared with further voltammetric cycling, indicating the formation of a stable solid electrolyte interphase on the graphene nano-ribbon coated anode. After about five cycles, a stable lithium-ion intercalation/de-intercalation was observed at a low potential of 0.35 V vs. Li/Li$^+$ (FIG. 31).

Figure 21:
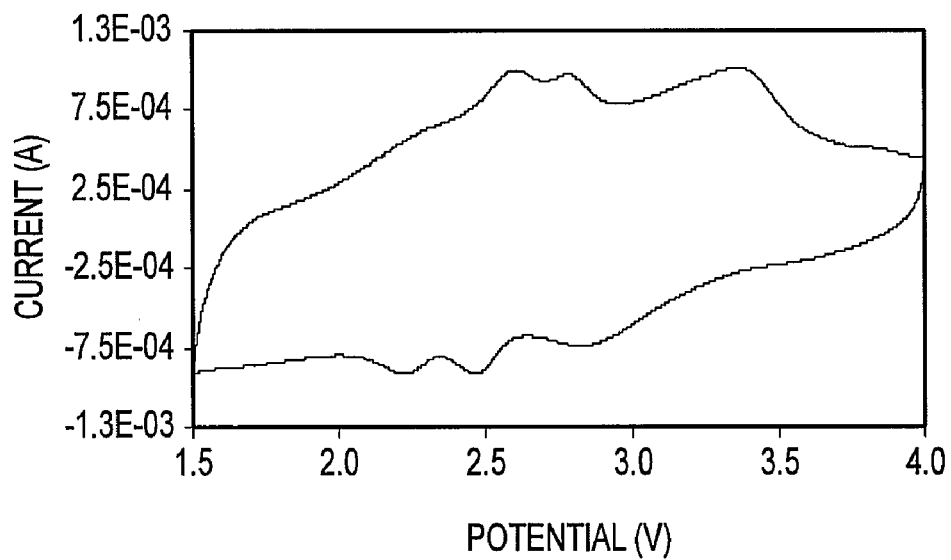
FIG. 21 is a cyclic voltammogram of a vanadium oxide composite electrode obtained in 1 M Li[TFSI], 20 volume % ethylene carbonate in [EDMMEA][TFSI]

Similarly, well defined cyclic voltamograms were observed for a cathode comprising V$_2$O$_5$ coated aligned graphene nano-ribbons (FIG. 21) The cyclic voltamogram comprised three pairs of redox peaks (at 2.20V/2.62V, 2.44V/

TABLE 2

Properties of ionic liquids and Li salt-doped ionic liquid electrolytes

|  | Ionic liquid | | | |
| --- | --- | --- | --- | --- |
|  | Ammonium ionic liquid | | Pyrrolidinium ionic liquid | |
| Property | [EDMPA][TFSI] | [EDMMEA][TFSI] | [BMP][TFSI] | [BMP][DCA] |
| Melting point (° C.) | −11 | <−50 | <−50 | −90 |
| Decomposition temp (° C.) | 320 | 300 | 360 | 230 |
| Viscosity (cp) at 25° C. | 71.63 | 53.63 | 71.5 | 41 |
| Vapor pressure at 25° C. | Not measurable | Not measurable | Not measurable | Not measurable |
| Flammability | Not flammable | Not flammable | Not flammable | Not flammable |
| Hydro-phobicity/philicity | hydrophobic | hydrophobic | hydrophobic | hydrophilic |
| Ionic conductivity (mS/cm)* | 2.8 | 3.0 | 4.5 | 11.3 |
| Electrochemical window (V)* | 5.5 | 5.8 | 3.9 | 3.7 |

[EDMPA][TFSI] = Ethyl-dimethyl-propylammonium bis(trifluoromethylsulfonyl)imide
[EDMMEA][TFSI] = N-Ethyl-N,N-dimethyl-2-methoxyethylammoniumbis(trifluormethylsulfonyl)imide
[BMP][TFSI] = 1-Butyl-1-methyl pyrrolidinium bis(trifluoromethylsulfonyl)imide
[BMP][DCA] = 1-Butyl-1-methylpyrrolidinium dicyanamide
*In a cell consisting of two identical Pt plate electrodes (size S of each electrode: 0.5 cm$^2$, distance d between two electrodes: 0.038 cm), ionic conductivity and electrochemical window were measured for electrolytes prepared by doping an ionic liquid with 1M LiTFSI and 20% EC (by volume). Conditions for ionic conductivity measurement (by AC impedance spectroscopy): AC voltage amplitude: 0.005 V, frequency range: 1 MHz~1 KHz. The real resistance Z' at the imaginary resistance Z" = 0 Ω was used to calculate ionic conductivity of the electrolyte according to σ = d/(SZ').

Thus, based on the consideration of a high ionic conductivity (>1 mS/cm) and a large electrochemical window (>5 V) for a lithium-ion battery electrolyte, ammonium ionic liquid-based electrolytes are well suited electrolytes. The [EDMMEA][TFSI] ionic liquid electrolyte containing about 1 M Li[TFSI] and about 20 volume % ethylene carbonate has a wide liquid-phase-range, a low viscosity, a high ionic conductivity (>about 1 mS/cm) and a large electrochemical window (>about 5 volts).

Section II—Cyclic Voltammetry Scans

Unless noted otherwise the 10$^{th}$ CV scan is depicted and the cyclic voltammetry scans were generated under the following conditions: a 1 cm$^2$ CNT working electrode, a lithium foil reference/auxillary electrode (thickness 1 mm, size 1.23 cm$^2$), and a scan rate of 1 mV/s. Additionally, unless noted otherwise the electrolyte is 1 M Li[TFSI], 20 volume % ethylene carbonate in [EDMMEA][TFSI] ionic liquid.

Section III—Electrode Characterization

Figure 20A:
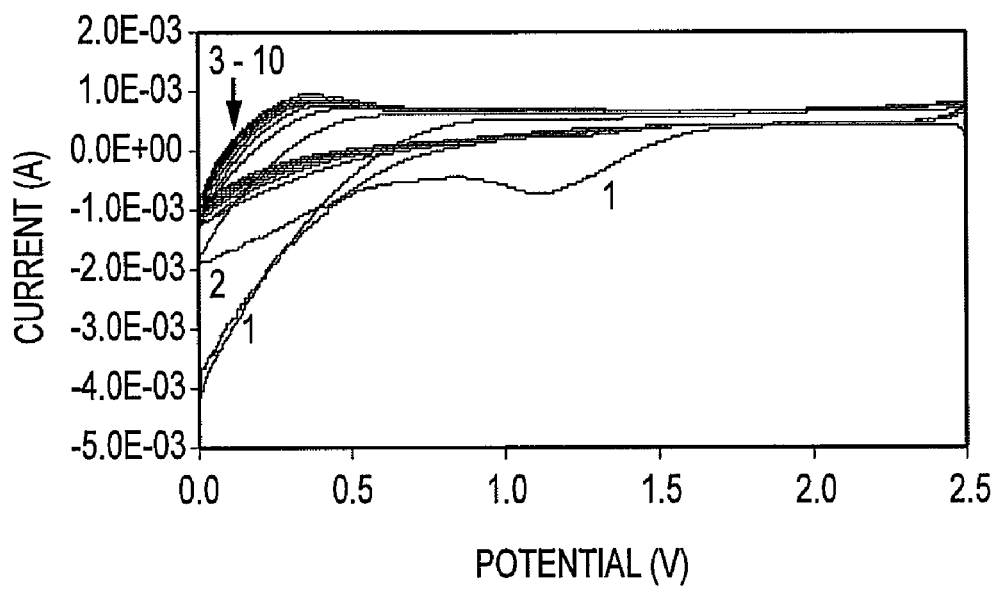
FIGS. 20A and 20B are cyclic voltammogramms of plasma-etched aligned carbon nano-tube electrodes obtained in 1 M Li[TFSI], 20 volume % ethylene carbonate in [EDMMEA][TFSI]
Figure 20B:
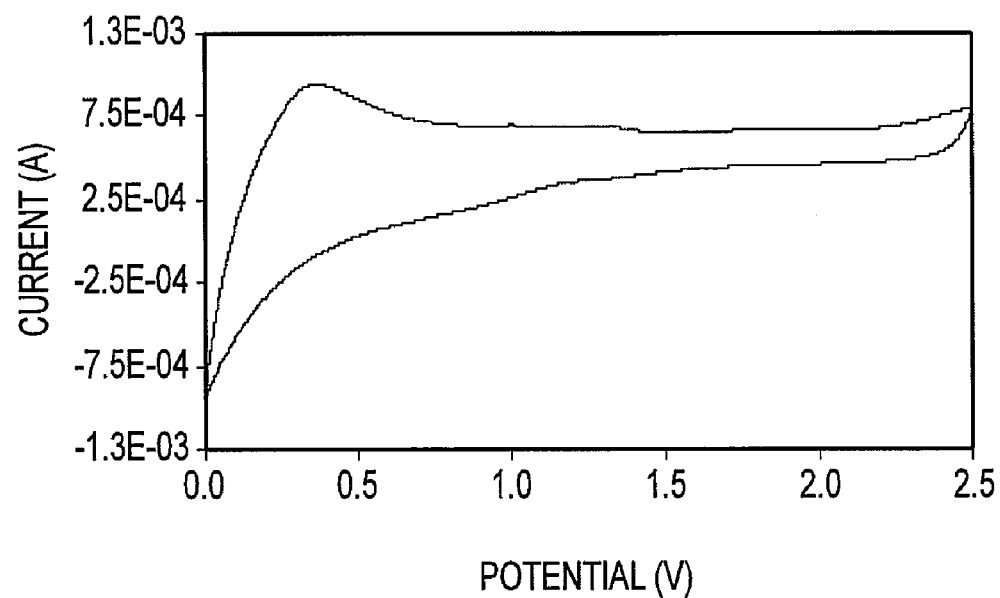

The electrochemical properties of the graphene nano-ribbon coated anodes and cathodes were determined by cyclic voltammetry. The cyclic voltamograms of plasma-etched aligned graphene nano-ribbon coated anode is well-defined (as shown in FIGS. 20A and 20B). The first cathodic scan, 2.80V, and 2.80V/3.39V). The three peaks can be attributed to the known three-step successive phase transformations for lithium-ion insertion and extraction of V$_2$O$_5$. The well defined voltammetric peaks demonstrate that the electroactivity of V$_2$O$_5$ is enhanced by coating aligned graphene nano-ribbons (on the conductive cathode substrate) with a thin film of V$_2$O$_5$. This enhancement is surprising considering the low electronic conductivity (10$^{-6}$~10$^{-7}$ S/cm) and slow lithium-ion diffusion (diffusion coefficient: ~10$^{-13}$ cm$^2$/s) within V$_2$O$_5$.

Figure 22A:
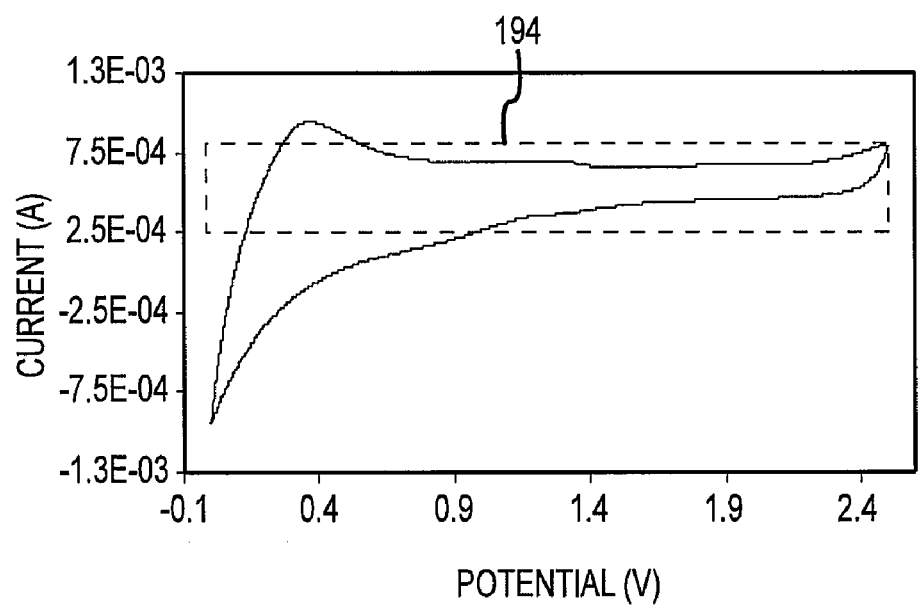
FIGS. 22A and 22B are cyclic voltammograms of the $10^{th}$ scan of a plasma-etched aligned carbon nano-tube electrode (FIG. 22A) and a vanadium oxide composite electrode (FIG. 22B) obtained in 1 M Li[TFSI], 20 volume % ethylene carbonate in [EDMMEA][TFSI]
Figure 22B:
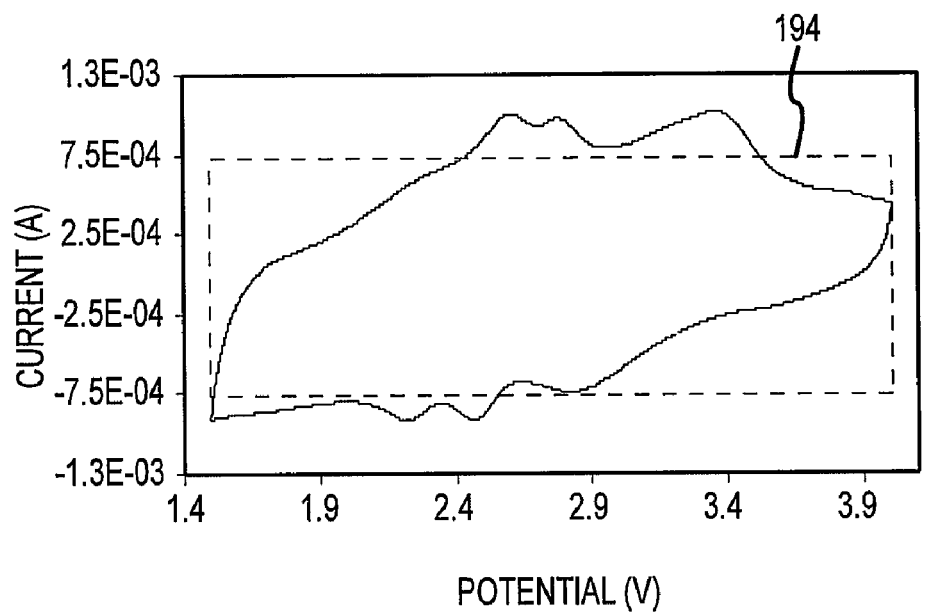

Additionally, the cyclic voltammogram indicates redox processes related to lithium-ion intercalation/de-intercalation. A box-like 194 shaped cyclic voltammogram is observed for both the graphene nano-ribbon coated anode and the V$_2$O$_5$ thin film coated graphene nano-ribbon cathode (FIGS. 22A and 22B). The box-like 194 shaped cyclic voltammogram is indicative of a double-layer charging/discharging electrode process. The double-layer charging/discharging process is due to the porous nanostructures and high surface area of the graphene nano-ribbons. The combined energy from the oxidative/reductive lithium-ion intercalation/de-intercalation and the double-layer charging/discharging produce highly energetic electrode materials. The CV scans of FIG. 20 indicate a lithium-ion intercalation potential of about 0.35 V (vs. Li/Li$^+$) and a columbic efficiency about 90% for the aligned plasma-etched CNT anode 106.

Section IV—Electrolyte Characterization

Figure 23:
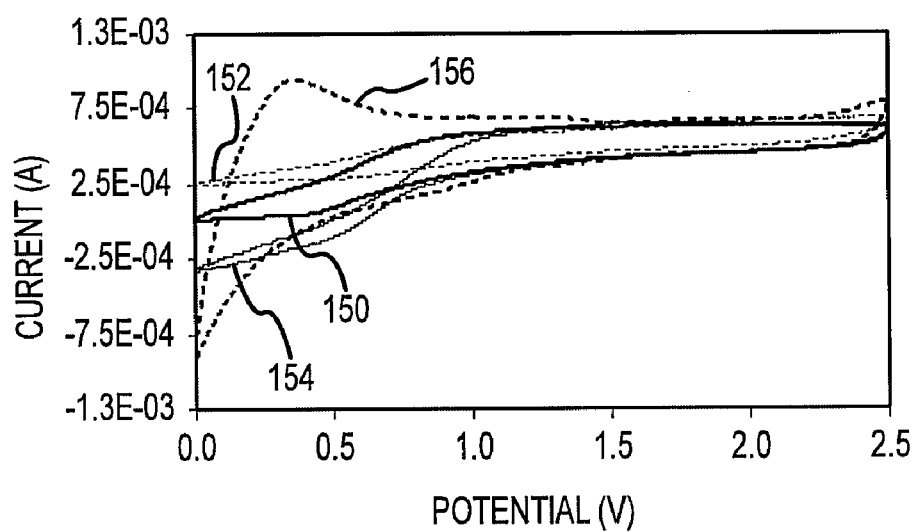
FIG. 23 is a family of cyclic voltammograms for an aligned, plasma-etched carbon nano-tube electrode obtained in different electrolytes.

FIG. 23 depicts the affect the ionic liquid 110 can have on the electrochemical behavior of an electrode, in particular on the anode 106. Four different ionic liquid electrolyte 110 systems were studied using the CV scan procedure of Example II: CV scan 150 depicts an ionic liquid of [EDMMEA][TFSI]; CV scan 152 depicts an ionic liquid having 1 M LiTFS in [EDMMEA][TFSI]; CV scan 156 depicts an ionic liquid having 20 volume % of ethylene carbonate in [EDMMEA][TFSI]; and CV scan 156 depicts an ionic liquid having 1 M LiTFS and 20 volume % ethylene carbonate in [EDMMEA][TFSI]. The well-defined current peaks of CV scan 156 (compared to CV scans 152, 154 and 150) indicate that an ionic electrolyte 110 comprising a lithium salt and a solid electrolyte interphase film-forming additive supports better lithium-ion intercalation/de-intercalation the ionic electrolyte alone or an ionic liquid containing one of a lithium salt or a SEI film-forming additive.

Section V—Anode Electrode Characterization

Figure 24:
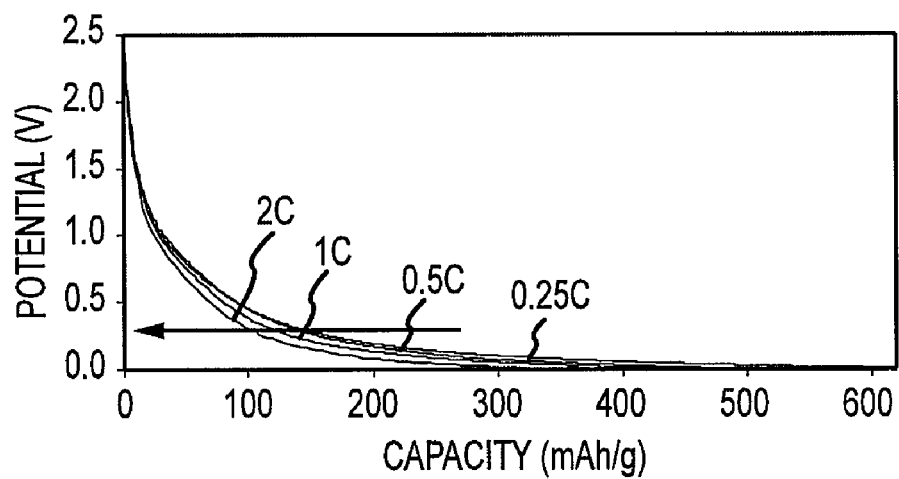
FIG. 24 is a family of galvanostatic discharge curves of an aligned, plasma-etched carbon nano-tube electrode obtained in 1 M Li[TFSI], 20 volume % ethylene carbonate in [EDMMEA][TFSI]

FIG. 24 depicts a galvanostatic charge/discharge an aligned plasma-etched CNT anode 106. The test conditions depicted are: [EDMMEA][TFSI] containing 1 M Li[TFSI] and 20 volume % ethylene carbonate, increasing galanostatic rates from 0.25 C to 2 C (as indicated) with a cut-off potential at 2.5 volts and all other scan conditions the Example II. At galvanostatic charge/discharge of 0.25 C the anode 106 exhibited a lithium-ion intercalation plateau at about 0 volts vs. lithium/lithium-ion and a reversible capacity of about 600 mAh/g. The 600 mAh/g reversible capacity of the anode is about two time that of a conventional graphite anode. At a galvanic charge/discharge rate of about 2 C the anode 106 retained a capacity of about 365 nAh/g, which corresponds to capacity retention of about 61%.

Section VI—Composite Electrode Characterization

FIG. 33 depicts the galvanostatic charge/discharge for the vanadium composite electrode 148. At a charge/discharge rate of 0.25 C, the composite cathode 148 exhibited a capacity of about 360 mAh/g. The 0.25 C charge/discharge curve exhibited two small plateaus at about 3.25 V to about 2.60 V (corresponding to the reduction peak of $V_2O_5$ at 2.80 V) and at about 2.60 to about 2.00 V (corresponding to vanadium oxide reduction peaks of $V_2O_5$ at 2.44 V and 2.20 V, FIG. 21). The capacity of the composite cathode 148 is more than two times that of conventional $LiCoO_2$ (140 mAh/g) cathode. At galvostic charge/discharge raters greater than 0.25 C the composite cathode 148 exhibited typical capacitor-like discharge behavior (linear potential decline without a plateau) was observed. With a charge/discharge rate up of about 2 C, the capacity of the composite cathode 148 was about 230 mAh/g, which corresponds to a high capacity retention of 64% and indicating a high rate capability of the composite cathode 148.

Section VII—Lithium-Ion Battery Construction and Characterization

A lithium-ion battery 100 comprising the CNT anode having a capacity of about 600 mAh/g (hereafter high-capacity anode 160), the $V_2O_5$—CNT composite cathode having a capacity of about 690 mAh/g based on $V_2O_5$ mass (hereafter high-capacity cathode 162), and ionic liquid electrolyte comprising 1 M LiTFSI, 20% EC in [EDMMEA][TFSI] (hereafter high-capacity electrolyte 164) was fabricated.

Figure 25:
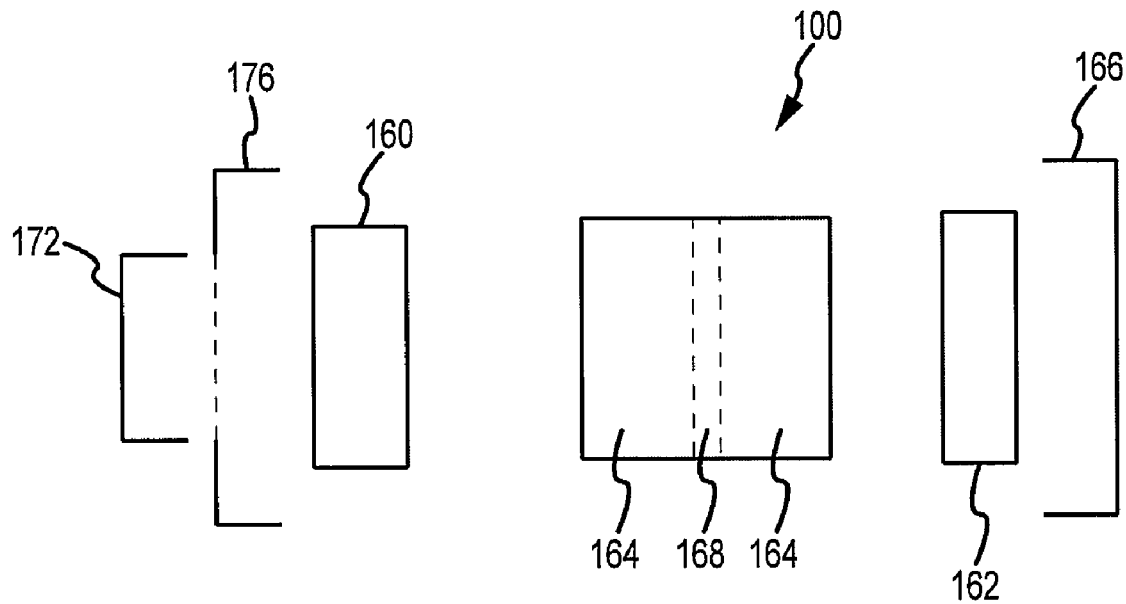
FIG. 25 is an exploded view of a lithium-ion battery according to another embodiment of the present invention.

FIG. 25 depicts a lithium-ion battery 100 comprising:
a) the high-capacity cathode 162 positioned adjacent to a case 166;
b) the high-capacity anode 160 positioned adjacent to a cap 172;
c) a high-capacity membrane separator 168 positioned between the high-capacity anode 160 and the high-capacity cathode 162;
d) the high-capacity electrolyte 164, wherein the high-capacity electrolyte 164 is in contact with at least with the high-capacity cathode 162, the high-capacity anode 160, the case 166, the cap 17, and the high-capacity membrane separator 168; and
f) a gasket 170, wherein the gasket 170 operatively engages the cap 172 and the case 166 to form a substantial sealed lithium-ion battery 100.

The lithium-ion battery 100 was constructed according to the standard lithium-ion battery size of CR2032 (International Electrotechnical Commission button cell coding system). The high-capacity membrane separator 168 preferably comprises a highly-porous PTFE membrane having a thickness from about 2 μm to about 200 μm. In a preferred embodiment, the high-capacity membrane separator has a thickness from about 10 μm to about 50. The high-capacity membrane separator 168 is fully wettable by hydrophobic and hydrophilic ionic liquids.

The lithium-ion battery 100 had a cell voltage of about 3.7 volts, as determined by cyclic voltammetry. The cell voltage of 3.7 volts is similar to the difference in the high-capacity anode and cathode lithium-ion intercalation/de-intercalation potentials.

Figure 26:
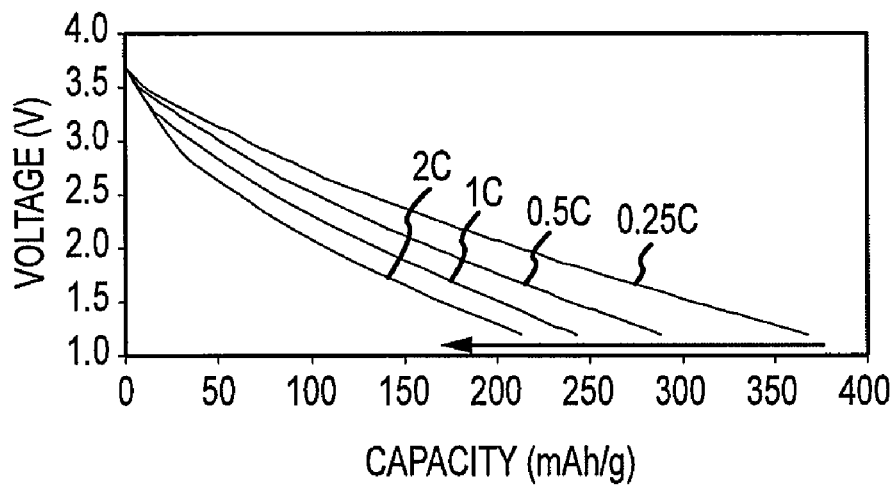
FIG. 26 is a family of galvanostatic discharge curves for the lithium-ion battery of FIG. 25.
Figure 27:
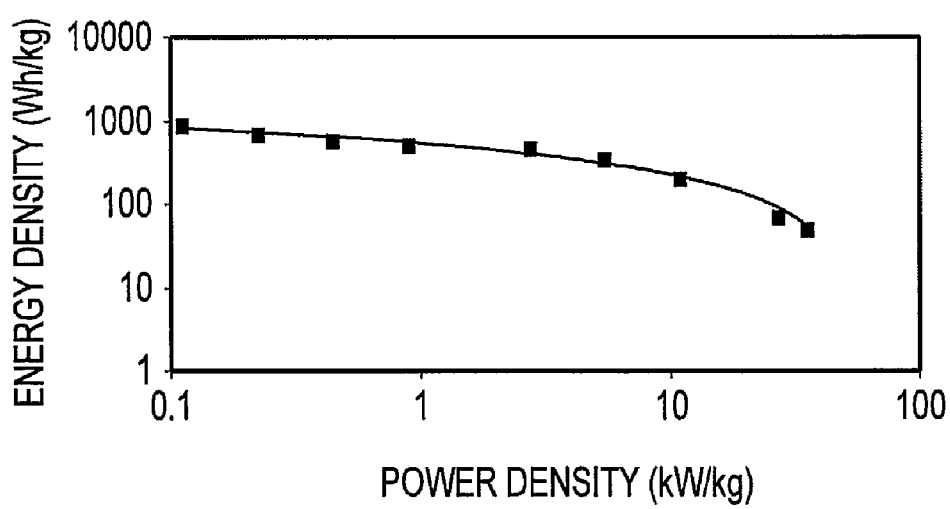
FIG. 27 is a Ragone plot for the lithium-ion battery of FIG. 25.

Energy and power densities obtained from the galvanostatic charge/discharge rates determined from about 0.25 C to about 2 C (FIG. 26) were plotted as a Ragone plot (FIG. 27). The lithium-ion battery 100 has a linear voltage decline at a fixed rate, very similar to a capacitor. This capacitive characteristic means that the lithium-ion battery can store (and deliver) more energy than a conventional lithium-ion battery. The only energy storage process available in the conventional lithium-ion battery is the anodic/cathodic oxidative/reductive processes due to lithium-ion intercalation/de-intercalation. The capacitive characteristics of lithium-ion battery 100 indicate that the lithium-ion battery 100 has in addition to oxidative/reductive processes due to lithium-ion intercalation/de-intercalation a double-layer charging at both of these two electrodes due to the porous nanostructures and high surface area of the CNTs. Furthermore, the capacitive characteristic of the lithium-ion battery 100 allows for a fully discharged state (i.e., zero cell voltage).

While not wanting to be bound by any theory, the electroactive $V_2O_5$—CNT composite cathode substantially contributes to the combined energy storage contribution from the oxidative/reductive processes due to lithium-ion intercalation/de-intercalation and the double-layer charging. Furthermore, the porous nanostructures and high surface area of the CNT anode also combined energy storage anodic processes.

The rapid capacitive charge/discharge characteristics of the lithium-ion battery 100 is shown in FIG. 26. FIG. 26 depicts a well-defined discharge straight line 174. Discharge line 174 is uniquely characteristic of the discharge behavior of an ultracapacitor. In other words, the lithium-ion battery 100 can be capable of the storage, high power density and rapid energy delivery kinetics of an ultracapacitor. While not wanting to be bound by any theory, the storage and rapid energy delivery kinetics is due the vertically aligned CNTs connected directly to a current-collector (that is, to one of an anode or cathode). The connection to a current-collector ensures a high-energy capacity and a rapid energy delivery to the electrode from the CNTs. In other words, the lithium ion battery 100 is a high power density battery.

In other words, the lithium-in battery 100 combines the high energy-storage-capability of conventional lithium-ion batteries with the high power-delivery-capability of conventional ultracapacitors to form a high-energy, high-power lithium-ion battery. For example, a high energy density of 520 Wh/kg can be maintained at a power density of at most about 1 kW/kg, and an energy density of at most about (900 Wh/kg) and a power density of at most about 35 kW/kg (FIG. 27).

Additionally, the lithium-ion battery 100 with a packaging factor of 0.35 can achieve an energy density ranging from about 200 to about 500 Wh/kg and a power density from about 5 to about 20 kW/kg. The power density of the lithium-ion battery exceeds the power density of conventional ultracapacitors (which range from about 1 to about 2 kW/kg) and that of conventional "high-power" and "very-high-power" lithium-ion batteries (which range from about 1 to 10 kW/kg).

A number of variations and modifications of the invention can be used. It would be possible to provide for some features of the invention without providing others.

In other embodiments, one or both of the anode and cathode comprising graphene ribbons with or without a metal oxide coating are used in other electrochemical devices such as capacitors, fuel cells, and primary and secondary batteries. For example, the aligned graphene ribbons can replace graphite electrodes or graphite-coated electrodes in capacitors, fuel cell, and primary and secondary batteries. In another embodiment, metal- and/or metal oxide-coated the graphene electrodes can replace metal and/or metal oxide electrodes in capacitor, fuel cell, and primary and secondary battery applications. The surface area of the graphene ribbons, with or without the metal- and/or metal oxide-coating, substantially increases the effective electrode surface area and electrode performance properties. One or both of the anode and cathode of zinc-carbon, alkaline, lead-acid, nickel-cadmium, and nickel metal-hydride batteries can be replaced with a graphene nano-ribbon electrode.

In other embodiments, the lithium-ion batteries of the present invention are used in applications other than hybrid electric vehicles. For example, in consumer electronics, they can be used for notebook computers, cellular telephones, pagers, videocameras, and hand-held tools. In medical electronics, they can be used for portable defibrillators, drug delivery units, and neurological stimulators. In the military and defense, the lithium-ion batteries can be used in specialized mobile power applications such as communication devices, unmanned aerial vehicles, spacecraft probes, and missile systems. Environmentally friendly solid-state ion liquid-containing gel polymer electrolytes can benefit a wide range of other electrochemical devices (such as batteries, electrochromic devices, sensors, photoelectrochemical solar cells, and light emitting electrochemical cells) with high performance and extended lifetimes.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An electrochemical battery, comprising:
   (a) an ionic liquid electrolyte;
   (b) first and second sets of aligned carbon nanotubes, wherein members of the second set of carbon nanotubes comprise a vanadium oxide coating having a thickness form about 1 to about 100 nm, wherein the cathode has a capacity of at least about 400 hAh per gram of vanadium oxide;
   (c) an anode comprising the first set of carbon nanotubes;
   (d) a cathode comprising the second set of carbon nanotubes, and
   (e) a microporous membrane separator, wherein the ionic liquid and microporous membrane separator are positioned between the anode and cathode, wherein, for the cathode, the carbon nanotubes having a length is from about 300 to about 700 µm;

2. The battery of claim 1, wherein the first and second set of carbon nanotubes are plasma etched to open free ends of at least most of the carbon nanotubes, and wherein longitudinal axes of at least most of the carbon nanotubes are substantially parallel to one another along substantially the entire length of the carbon nanotubes.

3. The battery of claim 2, wherein the first and second sets of carbon nanotubes have surface areas of at least about 200 $m^2/g$.

4. The battery of claim 2, wherein the first and second sets of carbon nanotubes have surface areas ranging from about 250 to about 10,000 $cm^2$ per $cm^2$ of one of the anode and cathode.

5. The battery of claim 2, wherein at least one of the anode and cathode has a carbon nanotube loading from about 0.1 to about 4.5 $mg/cm^2$.

6. The battery of claim 1, wherein at least most of the first set of aligned carbon nanotubes have lengths ranging from about 20 to about 1,000 microns, diameters ranging from about 3 to about 50 nm, and inter-carbon nanotube spacings from about 10 to about 250 nm.

7. The battery of claim 1, wherein a solid electrolyte interphase is located on the carbon nanotubes in the anode and wherein the vanadium oxide coating is at least one of a continuous and discontinuous film.

8. The battery of claim 1, wherein each of the first and second sets of carbon nanotubes have opposing first and second ends; wherein the first ends of the first and second sets of carbon nanotubes are, respectively, positioned on the anode and cathode, and wherein the first and second sets of carbon nanotubes are substantially perpendicular to at least one of a conductive and semiconductive substantially planar electrode component of the anode and cathode, respectively.

9. The battery of claim 1, wherein the carbon nanotubes are hollow, wherein the carbon nanotubes have a diameter of about 3 nm to about 50 nm, wherein the first set of carbon nanotubes have average, mean, and or modal lengths from about 200 to about 1,000 μm, and wherein the carbon nanotubes have an electron mobility of at least about 15,000 $cm^2V^{-1}s^{-1}$.

10. The battery of claim 1, wherein the anode has a lithium-ion intercalation and/or de-intercalation value of at least 200 mAh/g.

11. The battery of claim 1, wherein the cathode has a capacity of about 500 mAh per gram of vanadium oxide.

12. The battery of claim 1, wherein the electrolyte comprises an ionic liquid comprising:
(A) a lithium-containing salt;
(B) a solid electrolyte interphase film-forming additive;
(C) at least one cation selected from the group consisting essentially of the following compounds and mixtures thereof:

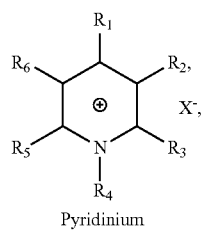
Pyridinium

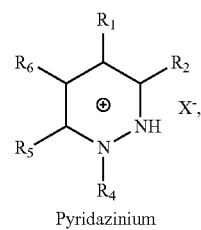
Pyridazinium

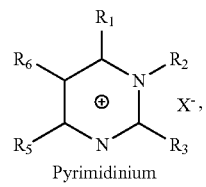
Pyrimidinium

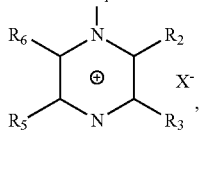
Pyrazinium

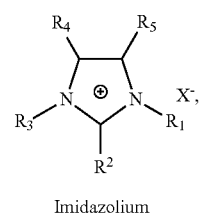
Imidazolium

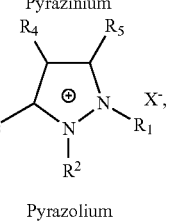
Pyrazolium

-continued

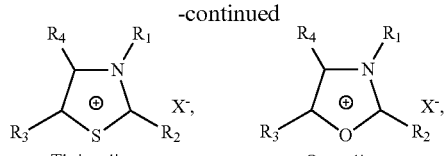
Thriazolium     Oxazolium

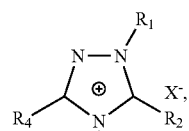
Triazolium

Ammonium

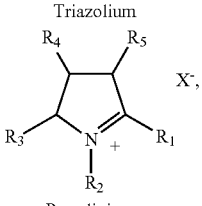
Pyrrolinium

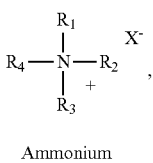
Pyrrolidinium

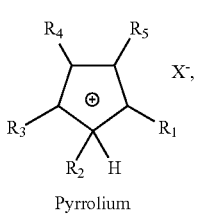
Pyrrolium

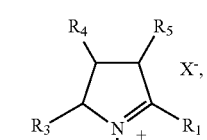
Piperidium

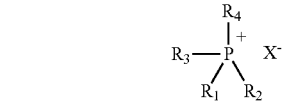
Phosphonium wherein $R_1$, $R_2$, $R_3$, $R_4$, $R_5$, and $R_6$ of the cationic components are identical or different and are selected from the group consisting essentially of:
(i) a hydrogen;
(ii) a halogen;
(iii) a hydroxyl;
(iv) an amine;
(v) a thiol;
(vi) a $C_1$ to $C_{25}$ straight-chain, or branched aliphatic hydrocarbon radical;
(vii) a $C_5$ to $C_{30}$ cycloaliphatic hydrocarbon radical;
(viii) a $C_6$ to $C_{30}$ aromatic hydrocarbon radical;
(ix) a $C_7$ to $C_{40}$ alkylaryl radical;
(x) a $C_2$ to $C_{25}$ linear or branched aliphatic hydrocarbon radical having interruption by one or more heteroatoms, such as, oxygen, nitrogen or sulfur;
(xi) a $C_2$ to $C_{25}$ linear or branched aliphatic hydrocarbon radical having interruption by one or more functionalities selected from the group consisting essentially of:
(a') a carbonyl;
(b') an ester;
(c') an amide, where R' is selected from the group consisting essentially of hydrogen, $C_1$-$C_{12}$ straight-chain, branched or cyclic alkane or alkene;
(d') a sulfonate;
(e') a sulfonamide, where R' is selected from the group consisting essentially of hydrogen, $C_1$-$C_{12}$ straight-chain, branched or cyclic alkane or alkene;

(xii) a $C_2$ to $C_{25}$ linear or branched aliphatic hydrocarbon radical terminally functionalized by Cl, Br, F, I, NH, OH, $NH_2$, $NHCH_3$ or SH;

(xiii) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH;

(xiv) a $C_7$ to $C_{40}$ alkylaryl radical having at least one heteroatom selected from the group consisting essentially of O, N, S, and optionally substituted with at least one of the following:

(a") a $C_2$ to $C_{25}$ straight-chain or branched hydrocarbon radical substituted with at least one of the following Cl, Br, F, I, NH, OH, $NH_2$, $NHCH_3$ or SH;

(b") a $C_5$ to $C_{30}$ cycloaliphatic hydrocarbon radical substituted with at least one of the following Cl, Br, F, I, NH, OH, $NH_2$, $NHCH_3$ or SH (c") a hydroxyl;

(d") an amine;

(e") a thiol;

(xv) a polyether of the type —O—(—$R_7$—O—)$_n$—$R_8$ or block or random type —O—(—$R_7$—O—)$_n$—(—$R_{7'}$—O—)$_m$—$R_8$, wherein at least one of the following is true:

(a''') $R_7$ is a linear or branched hydrocarbon radical having from 2 to 4 carbon atoms;

(b''') $R_{7'}$ is a linear or branched hydrocarbon radical having from 2 to 4 carbon atoms; and (c''') wherein n is from 1 to 40; and (d''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (xvi) a polyether of the type —O—(—$R_7$—O—)$_n$—C(O)—$R_8$ or block or random type —O—(—$R_7$—O—)$_n$—(—$R_{7'}$—O—)$_m$—C(O)—$R_8$, wherein at least one of the following is true:

(a'''') $R_7$ is a linear or branched hydrocarbon radical having from 2 to 4 carbon atoms;

(b'''') $R_{7'}$ is a linear or branched hydrocarbon radical having from 2 to 4 carbon atoms; and (c'''') wherein n is from 1 to 40; and (d'''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (D) at least one anion selected from the group consisting essentially of $F^-$; $Cl^-$; $Br^-$; $I^-$; $NO_3^-$; $N(CN)_2^-$; $BF_4^-$; $ClO_4^-$; $PF_6^-$; $RSO_3^-$; $RCOO^-$, where R is an alkyl group, substituted alkyl group, or phenyl group; $(CF_3)_2PF_4^-$; $(CF_3)_3PF_3^-$; $(CF_3)_4PF_2^-$; $(CF_3)_5PF^-$; $(CF_3)_6P^-$; $(CF_2SO_3^-)_2$; $(CF_2CF_2SO_3^-)_2$; $(CF_3SO_2^-)_2N^-$; $CF_3CF_2(CF_3)_2CO^-$; $(CF_3SO_2^-)_2CH^-$; $(SF_5)_3C^-$; $(CF_3SO_2)_3C^-$; $[O(CF_3)_2C_2(CF_3)_2O]_2PO^-$; $(CF_3(CF_2)_7SO_3^-$; and mixtures thereof.

13. The battery of claim 1, wherein the electrolyte comprises an ionic liquid having a melting point of no more than about 100 degrees Celsius, a decomposition temperature of at least about 200 degrees Celsius, a viscosity of no more than about 200 Cp, an ionic conductivity of at least about 0.01 mS/cm, and an electrochemical window of at least about 4 Volts.

14. The battery of claim 1, further comprising a polymer host is selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof.

15. The battery of claim 14, wherein a molar ratio of ionic liquid to polymer host ranges from about 0.1:1 to about 10:1.

16. The battery of claim 1, wherein the microporous membrane separator has a thickness from about 2 μm to about 200 μm and wherein the membrane separator is fully wettable by at least one of a hydrophobic and a hydrophilic ionic liquid.

17. An electrochemical battery, comprising:

(a) an ionic liquid electrolyte;

(b) an anode having carbon nanotubes;

(c) a cathode having vanadium oxide-coated carbon nanotubes, the vanadium oxide coating has a thickness from about 1 to about 100 nm and the cathode has a capacity of at least about 400 mAh per gram of vanadium oxide, wherein at least one of the anode and cathode comprise aligned carbon nanotubes; and (d) a microporous membrane separator, wherein the ionic liquid and microporous membrane separator are positioned between the anode and cathode.

18. The battery of claim 17, wherein each of the carbon nanotubes and the vanadium oxide-coated carbon nanotubes have opposing first and second ends; wherein the first ends of the carbon nanotubes and vanadium oxide-coated carbon nanotubes are, respectively, positioned on the anode and cathode, and wherein the carbon nanotubes and vanadium oxide-coated carbon nanotubes are substantially perpendicular to at least one of a conductive and semiconductive substantially planar electrode component of the anode and cathode, respectively, wherein at least most of the carbon nanotubes and the vanadium oxide-coated carbon nanotubes have open free ends, wherein longitudinal axes of at least most of the carbon nanotubes and vanadium-oxide coated carbon nanotubes are substantially parallel to one another along the entire length of the nanotubes and the vanadium oxide-coated carbon nanotubes, wherein a solid electrolyte interphase is positioned on the carbon nanotubes, wherein the carbon nanotubes and the vanadium oxide-coated carbon nanotubes have surface areas of at least about 200 $m^2$/g, wherein the vanadium oxide coating is at least one of a continuous and discontinuous film, wherein at least most of the carbon nanotubes:

i) are hollow;

ii) have a length from about 20 to about 1,000 microns;

iii) have diameters from about 3 to about 50 nm;

iv) have an electron mobility of at least about 15,000 $cm^2V^{-1}s^{-1}$; and v) have inter-carbon nanotube spacings from about 10 to about 250 nm.

19. The battery of claim 17, wherein the carbon nanotubes and the vanadium oxide-coated carbon nanotubes have surface areas of at least about 200 $m^2$/g, wherein the cathode has a loading of the carbon nanotubes and the vanadium oxide-coated carbon nanotubes from about 0.1 to about 4.5 mg/$cm^2$, wherein the carbon nanotubes have an average, mean, or modal length from about 200 to about 1,000 μm.

20. The battery of claim 17, wherein the carbon nanotubes and the vanadium oxide-coated carbon nanotubes have surface areas ranging from about 250 to about 10,000 $cm^2$ per $cm^2$ of one of the anode and cathode.

21. The battery of claim 17, wherein the cathode has a capacity of about 500 mAh per gram of vanadium oxide.

22. The battery of claim 17, wherein the electrolyte comprises an ionic liquid comprising:
- (A) a lithium-containing salt;
- (B) a solid electrolyte interphase film-forming additive;
- (C) at least one cation selected from the group consisting essentially of the following compounds and mixtures thereof:

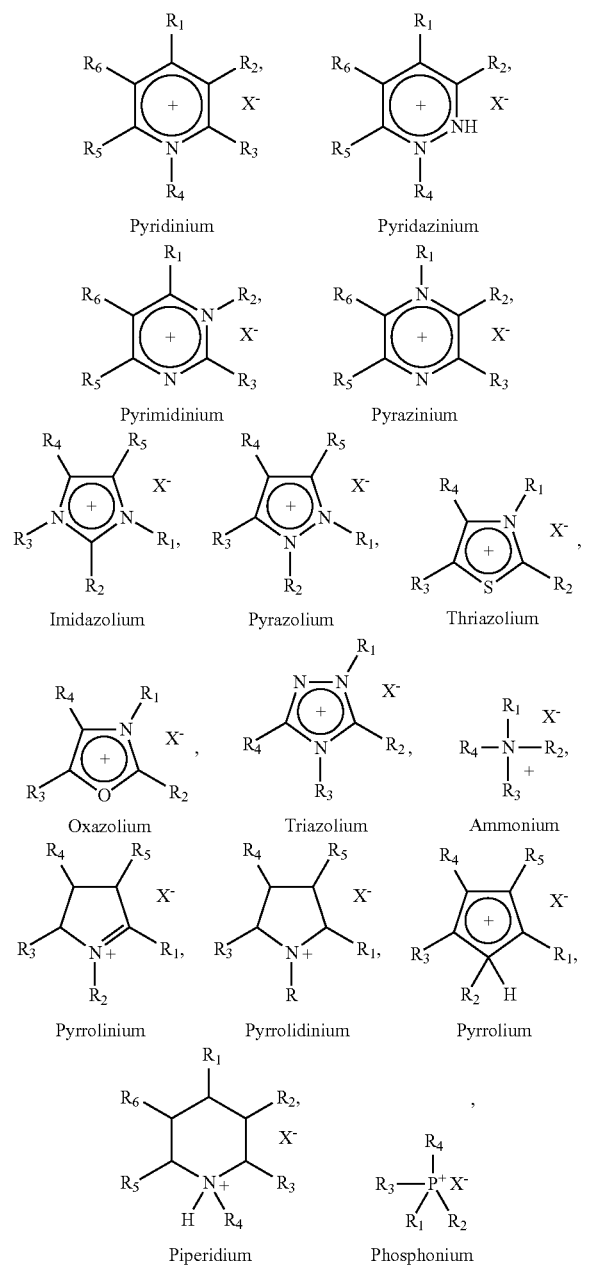

wherein $R_1$, $R_2$, $R_3$, $R_4$, $R_5$, and $R_6$ of the cationic components are identical or different and are selected from the group consisting essentially of:
- (i) a hydrogen;
- (ii) a halogen;
- (iii) a hydroxyl;
- (iv) an amine;
- (v) a thiol;
- (vi) a $C_1$ to $C_{25}$ straight-chain or branched aliphatic hydrocarbon radical;
- (vii) a $C_5$ to $C_{30}$ cycloaliphatic hydrocarbon radical;
- (viii) a $C_6$ to $C_{30}$ aromatic hydrocarbon radical;
- (ix) a $C_7$ to $C_{40}$ alkylaryl radical;
- (x) a $C_2$ to $C_{25}$ linear or branched aliphatic hydrocarbon radical having interruption by one or more heteroatoms, such as, oxygen, nitrogen or sulfur;
- (xi) a $C_2$ to $C_{25}$ linear or branched aliphatic hydrocarbon radical having interruption by one or more functionalities selected from the group consisting essentially of:
  - (a') a carbonyl;
  - (b') an ester;
  - (c') an amide, where R' is selected from the group consisting essentially of hydrogen, $C_1$-$C_{12}$ straight-chain, branched or cyclic alkane or alkene;
  - (d') a sulfonate;
  - (e') a sulfonamide, where R' is selected from the group consisting essentially of hydrogen, $C_1$-$C_{12}$ straight-chain, branched or cyclic alkane or alkene;
- (xii) a $C_2$ to $C_{25}$ linear or branched aliphatic hydrocarbon radical terminally functionalized by Cl, Br, F, I, NH, OH, $NH_2$, $NHCH_3$ or SH;
- (xiii) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH;
- (xiv) a $C_7$ to $C_{40}$ alkylaryl radical having at least one heteroatom selected from the group consisting essentially of O, N, S, and optionally substituted with at least one of the following:
  - (a") a $C_2$ to $C_{25}$ straight-chain, branched hydrocarbon radical substituted with at least one of the following Cl, Br, F, I, NH, OH, $NH_2$, $NHCH_3$ or SH;
  - (b") a $C_5$ to $C_{30}$ cycloaliphatic hydrocarbon radical substituted with at least one of the following Cl, Br, F, I, NH, OH, $NH_2$, $NHCH_3$ or SH
  - (c") a hydroxyl;
  - (d") an amine;
  - (e") a thiol;
- (xv) a polyether of the type $-O-(-R_7-O-)_n-R_8$ or block or random type $-O-(-R_7-O-)_n-(-R_{7'}-O-)_m-R_8$, wherein at least one of the following is true:
  - (a''') $R_7$ is a linear or branched hydrocarbon radical having from 2 to 4 carbon atoms;
  - (b''') $R_{7'}$ is a linear or branched hydrocarbon radical having from 2 to 4 carbon atoms; and
  - (c''') wherein n is from 1 to 40; and
  - (d''') $R_8$ is hydrogen, or a $C_5$ to $C_{30}$ straight-chain or branched hydrocarbon radical, or a $C_5$ to $C_{30}$-cycloaliphatic hydrocarbon radical, or a $C_6$ to $C_{30}$ aromatic hydrocarbon radical, or a $C_7$ to $C_{40}$ alkylaryl radical; and
- (xvi) a polyether of the type $-O-(-R_7-O-)_n-C(O)-R_8$ or block or random type $-O-(-R_7-O-)_n-(-R_{7'}-O-)_m-C(O)-R_8$, wherein at least one of the following is true:
  - (a'''') $R_7$ is a linear or branched hydrocarbon radical having from 2 to 4 carbon atoms;
  - (b'''') $R_{7'}$ is a linear or branched hydrocarbon radical having from 2 to 4 carbon atoms; and
  - (c'''') wherein n is from 1 to 40; and (d'''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (D) at least one anion selected from the group consisting essentially of $F^-$; $Cl^-$; $Br^-$; $I^-$; $NO_3^-$; $N(CN)_2^-$; $BF_4^-$; $ClO_4^-$; $PF_6^-$; $RSO_3^-$; $RCOO^-$, where R is an alkyl group, substituted alkyl group, or phenyl group; $(CF_3)_2PF_4^-$; $(CF_3)_3PF_3^-$; $(CF_3)_4PF_2^-$; $(CF_3)_5PF^-$; $(CF_3)_6P^-$; $(CF_2SO_3^-)_2$; $(CF_2CF_2SO_3^-)_2$; $(CF_3SO_2^-)_2N^-$; $CF_3CF_2(CF_3)_2CO^-$; $(CF_3SO_2^-)_2CH^-$; $(SF_5)_3C^-$; $(CF_3SO_2)_3C^-$; $[O(CF_3)_2C_2(CF_3)_2O]_2PO^-$; $(CF_3(CF_2)_7SO_3^-$; and mixtures thereof, wherein the ionic liquid has a melting point of no more than about 100 degrees Celsius, a decomposition temperature of at least about 200 degrees Celsius, a viscosity of no more than about 200 Cp, an ionic conductivity of at least about 0.01 mS/cm, and an electrochemical window of at least about 4 Volts.

23. The battery of claim 17, further comprising a polymer host selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof, wherein a molar ratio of ionic liquid to polymer host ranges from about 0.1:1 to about 10:1, wherein the microporous membrane separator has a thickness from about 2 μm to about 200 μM and wherein the membrane separator is fully wettable by at least one of a hydrophobic and a hydrophilic ionic liquid.

24. An electrochemical battery, comprising:
    (a) an ionic liquid electrolyte;
    (b) an anode having carbon nanotubes;
    (c) a cathode having vanadium oxide-coated carbon nanotubes, the vanadium oxide coating has a thickness from about 1 to about 100 nm, wherein at least one of the anode and cathode comprise aligned carbon nanotubes; and
    (d) a microporous membrane separator, wherein the ionic liquid and microporous membrane separator are positioned between the anode and cathode.

25. The battery of claim 24, wherein the cathode has a capacity of at least about 400 mAh per gram of vanadium oxide, wherein each of the carbon nanotubes and the vanadium oxide-coated carbon nanotubes have opposing first and second ends; wherein the first ends of the carbon nanotubes and vanadium-coated carbon nanotubes are, respectively, positioned on the anode and cathode, and wherein the carbon nanotubes and vanadium oxide-coated carbon nanotubes are substantially perpendicular to at least one of a conductive and semiconductive substantially planar electrode component of the anode and cathode, respectively, wherein at least most of the carbon nanotubes and the vanadium oxide-coated carbon nanotubes have open free ends, wherein longitudinal axes of at least most of the carbon nanotubes and vanadium oxide-coated carbon nanotubes are substantially parallel to one another along the entire longitudinal axes of the nanotubes and vanadium oxide-coated carbon nanotubes, wherein a solid electrolyte interphase is positioned on the carbon nanotubes, wherein the carbon nanotubes and the vanadium oxide-coated carbon nanotubes have surface areas of at least about 200 m²/g, wherein the vanadium oxide coating is at least one of a continuous and discontinuous film, wherein at least most of the carbon nanotubes:
    i) are hollow;
    ii) have a length from about 20 to about 1,000 microns;
    iii) have diameters from about 3 to about 50 nm;
    iv) have an electron mobility of at least about 15,000 $cm^2V^{-1}s^{-1}$; and
    v) have inter-carbon nanotube spacings from about 10 to about 250 nm.

26. The battery of claim 24, wherein the carbon nanotubes and the vanadium oxide-coated carbon nanotubes have surface areas of at least about 200 m²/g, wherein the cathode has a loading of the carbon nanotubes and vanadium oxide-coated carbon nanotubes from about 0.1 to about 4.5 mg/cm², wherein the carbon nanotubes have an average, mean, or modal length from about 200 to about 1,000 μm.

27. The battery of claim 24, wherein the carbon nanotubes and the vanadium oxide-coated carbon nanotubes have surface areas ranging from about 250 to about 10,000 cm² per cm² of one of the anode and cathode.

28. The battery of claim 24, wherein the cathode has a capacity of about 500 mAh per gram of vanadium oxide.

29. The battery of claim 24, wherein the electrolyte comprises an ionic liquid comprising:
    (A) a lithium-containing salt;
    (B) a solid electrolyte interphase film-forming additive;
    (C) at least one cation selected from the group consisting essentially of the following compounds and mixtures thereof:

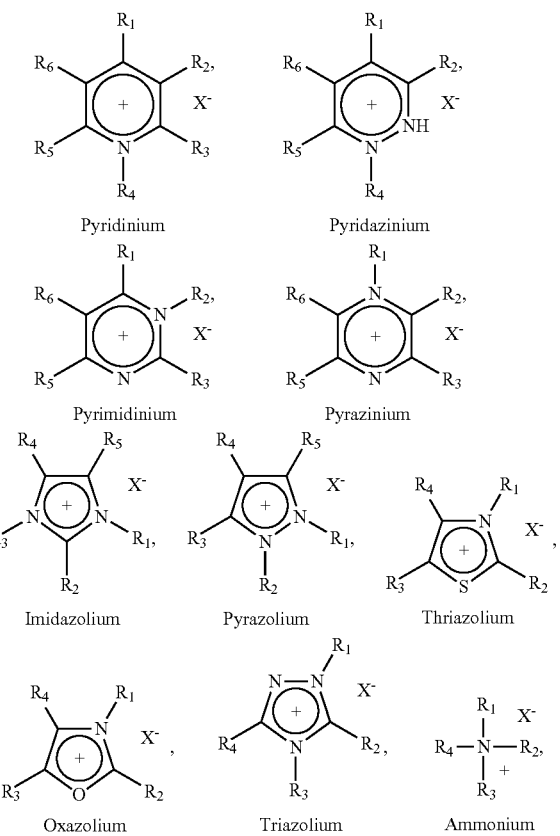

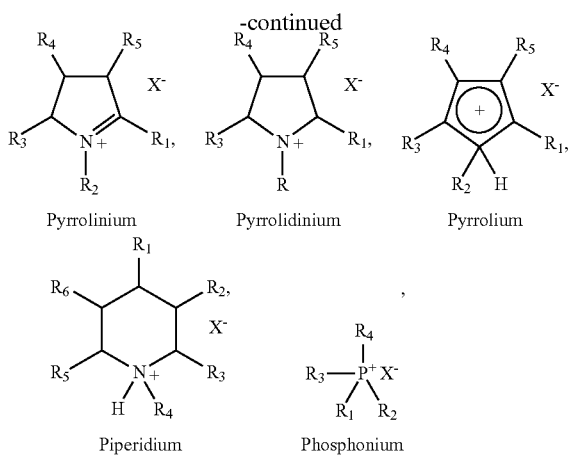

Pyrrolinium   Pyrrolidinium   Pyrrolium

Piperidium   Phosphonium wherein $R_1$, $R_2$, $R_3$, $R_4$, $R_5$, and $R_6$ of the cationic components are identical or different and are selected from the group consisting essentially of:
(i) a hydrogen;
(ii) a halogen;
(iii) a hydroxyl;
(iv) an amine;
(v) a thiol;
(vi) a $C_1$ to $C_{25}$ straight-chain, branched aliphatic hydrocarbon radical;
(vii) a $C_5$ to $C_{30}$ cycloaliphatic hydrocarbon radical;
(viii) a $C_6$ to $C_{30}$ aromatic hydrocarbon radical;
(ix) a $C_7$ to $C_{40}$ alkylaryl radical;
(x) a $C_2$ to $C_{25}$ linear or branched aliphatic hydrocarbon radical having interruption by one or more heteroatoms, such as, oxygen, nitrogen or sulfur;
(xi) a $C_2$ to $C_{25}$ linear or branched aliphatic hydrocarbon radical having interruption by one or more functionalities selected from the group consisting essentially of:
  (a') a carbonyl;
  (b') an ester;
  (c') an amide, where R' is selected from the group consisting essentially of hydrogen, $C_1$-$C_{12}$ straight-chain, branched or cyclic alkane or alkene;
  (d') a sulfonate;
  (e') a sulfonamide, where R' is selected from the group consisting essentially of hydrogen, $C_1$-$C_{12}$ straight-chain, branched or cyclic alkane or alkene;
(xii) a $C_2$ to $C_{25}$ linear or branched aliphatic hydrocarbon radical terminally functionalized by Cl, Br, F, I, NH, OH, $NH_2$, $NHCH_3$ or SH;
(xiii) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH;
(xiv) a $C_7$ to $C_{40}$ alkylaryl radical having at least one heteroatom selected from the group consisting essentially of O, N, S, and optionally substituted with at least one of the following:
  (a'') a $C_2$ to $C_{25}$ straight-chain, branched hydrocarbon radical substituted with at least one of the following Cl, Br, F, I, NH, OH, $NH_2$, $NHCH_3$ or SH;
  (b'') a $C_5$ to $C_{30}$ cycloaliphatic hydrocarbon radical substituted with at least one of the following Cl, Br, F, I, NH, OH, $NH_2$, $NHCH_3$ or SH (c'') a hydroxyl;
  (d'') an amine;
  (e'') a thiol;

(xv) a polyether of the type —O—(—$R_7$—O—)$_n$—$R_8$ or block or random type —O—(—$R_7$—O—)$_n$—(—$R_{7'}$—O—)$_m$—$R_8$, wherein at least of the following is true:
  (a''') $R_7$ is a linear or branched hydrocarbon radical having from 2 to 4 carbon atoms;
  (b''') $R_{7'}$ is a linear or branched hydrocarbon radical having from 2 to 4 carbon atoms; and
  (c''') wherein n is from 1 to 40; and
  (d''') $R_8$ is hydrogen, or a $C_5$ to $C_{30}$ straight-chain or branched hydrocarbon radical, or a $C_5$ to $C_{30}$-cycloaliphatic hydrocarbon radical, or a $C_6$ to $C_{30}$ aromatic hydrocarbon radical, or a $C_7$ to $C_{40}$ alkylaryl radical; and
(xvi) a polyether of the type —O—(—$R_7$—O—)$_n$—C(O)—$R_8$ or block or random type —O—(—$R_7$—O—)$_n$(—$R_{7'}$—O—)$_m$—C(O)—$R_8$, wherein at least of the following is true:
  (a'''') $R_7$ is a linear or branched hydrocarbon radical having from 2 to 4 carbon atoms;
  (b'''') $R_{7'}$ is a linear or branched hydrocarbon radical having from 2 to 4 carbon atoms; and
  (c'''') wherein n is from 1 to 40; and
  (d'''') $R_8$ is hydrogen, or a $C_5$ to $C_{30}$ straight-chain or branched hydrocarbon radical, or a $C_5$ to $C_{30}$-cycloaliphatic hydrocarbon radical, or a $C_6$ to $C_{30}$ aromatic hydrocarbon radical, or a $C_7$ to $C_{40}$ alkylaryl radical; and
(D) at least one anion selected from the group consisting essentially of $F^-$; $Cl^-$; $Br^-$; $I^-$; $NO_3^-$; $N(CN)_2^-$; $BF_4^-$; $ClO_4^-$; $PF_6^-$; $RSO_3^-$; $RCOO^-$, where R is an alkyl group, substituted alkyl group, or phenyl group; $(CF_3)_2PF_4^-$; $(CF_3)_3PF_3^-$; $(CF_3)_4PF_2^-$; $(CF_3)_5PF^-$; $(CF_3)_6P^-$; $(CF_2SO_3^-)_2$; $(CF_2CF_2SO_3^-)_2$; $(CF_3SO_2^-)_2N^-$; $CF_3CF_2(CF_3)_2CO^-$; $(CF_3SO_2^-)_2CH^-$; $(SF_5)_3C^-$; $(CF_3SO_2)_3C^-$; $[O(CF_3)_2C_2(CF_3)_2O]_2PO^-$; $(CF_3(CF_2)_7SO_3^-$; and mixtures thereof, wherein the ionic liquid has a melting point of no more than about 100 degrees Celsius, a decomposition temperature of at least about 200 degrees Celsius, a viscosity of no more than about 200 Cp, an ionic conductivity of at least about 0.01 mS/cm, and an electrochemical window of at least about 4 Volts.

30. The battery of claim 24, further comprising a polymer host selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof, wherein a molar ratio of ionic liquid to polymer host ranges from about 0.1:1 to about 10:1, wherein the microporous membrane separator has a thickness from about 2 μm to about 200 μm and wherein the membrane separator is fully wettable by at least one of a hydrophobic and a hydrophilic ionic liquid.

31. An electrochemical battery, comprising:
(a) an ionic liquid electrolyte;
(b) an anode having carbon nanotubes;
(c) a cathode having vanadium oxide-coated carbon nanotubes, wherein the cathode has a capacity of at least about 400 mAh per gram of vanadium oxide, wherein at least one of the anode and cathode comprise aligned carbon nanotubes; and (d) a microporous membrane separator, wherein the ionic liquid and microporous membrane separator are positioned between the anode and cathode.

32. The battery of claim 31, wherein the vanadium oxide coating has a thickness from about 1 to about 100 nm, wherein each of the carbon nanotubes and the vanadium oxide-coated carbon nanotubes have opposing first and second ends; wherein the first ends of the carbon nanotubes and vanadium oxide-coated carbon nanotubes are, respectively, positioned on the anode and cathode, and wherein the carbon nanotubes and vanadium oxide coated-carbon nanotubes are substantially perpendicular to at least one of a conductive and semiconductive substantially planar electrode component of the anode and cathode, respectively, wherein at least most of the carbon nanotubes and the vanadium oxide-coated carbon nanotubes have open free ends, wherein longitudinal axes of at least most of the carbon nanotubes and vanadium-oxide coated carbon nanotubes are substantially parallel to one another along the entire length of the nanotubes, wherein a solid electrolyte interphase is positioned on the carbon nanotubes, wherein the carbon nanotubes and the vanadium oxide-coated carbon nanotubes have surface areas of at least about 200 m$^2$/g, wherein the vanadium oxide coating is at least one of a continuous and discontinuous film, wherein at least most of the carbon nanotubes:

i) are hollow;
ii) have a length from about 20 to about 1,000 microns;
iii) have diameters from about 3 to about 50 nm;
iv) have an electron mobility of at least about 15,000 cm$^2$V$^{-1}$s$^{-1}$; and
v) have inter-carbon nanotube spacings from about 10 to about 250 nm.

33. The battery of claim 31, wherein the carbon nanotubes and the vanadium oxide-coated carbon nanotubes have surface areas of at least about 200 m$^2$/g, wherein the cathode has a loading of carbon nanotubes and the vanadium oxide-coated carbon nanotubes from about 0.1 to about 4.5 mg/cm$^2$, wherein the carbon nanotubes have an average, mean, or modal length from about 200 to about 1,000 μm.

34. The battery of claim 31, wherein the carbon nanotubes and the vanadium oxide-coated carbon nanotubes have surface areas ranging from about 250 to about 10,000 cm$^2$ per cm$^2$ of one of the anode and cathode.

35. The battery of claim 31, wherein the cathode has a capacity of about 500 mAh per gram of vanadium oxide.

36. The battery of claim 31, wherein the electrolyte comprises an ionic liquid comprising:

(A) a lithium-containing salt;
(B) a solid electrolyte interphase film-forming additive;
(C) at least one cation selected from the group consisting essentially of the following compounds and mixtures thereof:

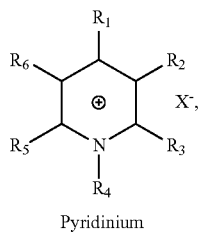
Pyridinium

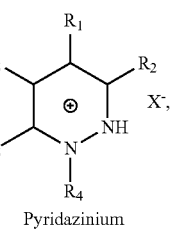
Pyridazinium

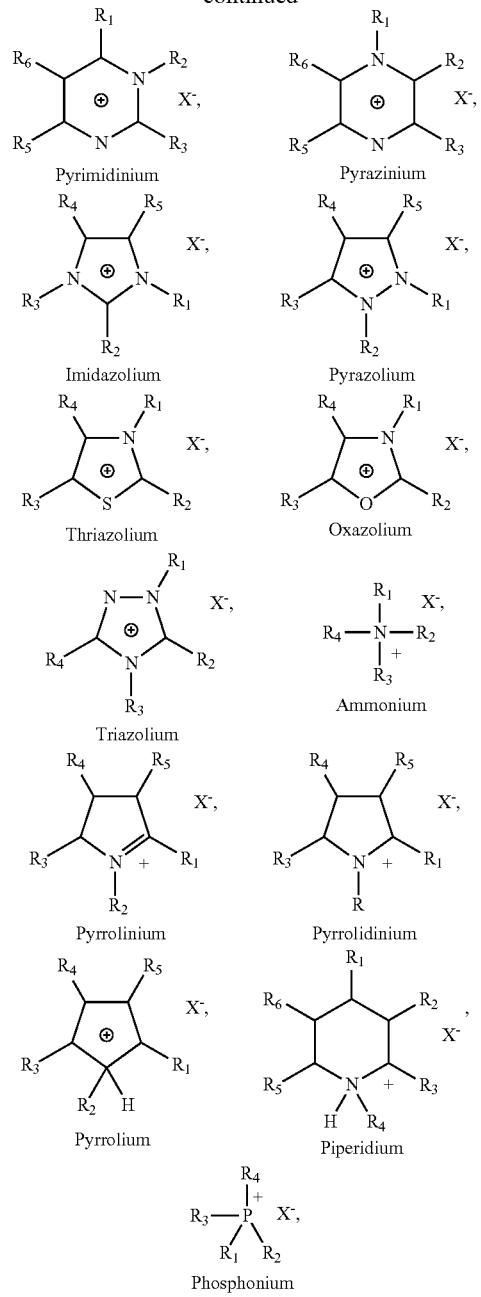

wherein $R_1$, $R_2$, $R_3$, $R_4$, $R_5$, and $R_6$ of the cationic components are identical or different and are selected from the group consisting essentially of:
(i) a hydrogen;
(ii) a halogen;
(iii) a hydroxyl;
(iv) an amine;
(v) a thiol;
(vi) a $C_1$ to $C_{25}$ straight-chain or branched aliphatic hydrocarbon radical;
(vii) a $C_5$ to $C_{30}$ cycloaliphatic hydrocarbon radical;
(viii) a $C_6$ to $C_{30}$ aromatic hydrocarbon radical;
(ix) a $C_7$ to $C_{40}$ alkylaryl radical;
(x) a $C_2$ to $C_{25}$ linear or branched aliphatic hydrocarbon radical having interruption by one or more heteroatoms, such as, oxygen, nitrogen or sulfur;

(xi) a $C_2$ to $C_{25}$ linear or branched aliphatic hydrocarbon radical having interruption by one or more functionalities selected from the group consisting essentially of:
  (a') a carbonyl;
  (b') an ester;
  (c') an amide, where R' is selected from the group consisting essentially of hydrogen, $C_1$-$C_{12}$ straight-chain, branched or cyclic alkane or alkene;
  (d') a sulfonate;
  (e') a sulfonamide, where R' is selected from the group consisting essentially of hydrogen, $C_1$-$C_{12}$ straight-chain, branched or cyclic alkane or alkene;

(xii) a $C_2$ to $C_{25}$ linear or branched aliphatic hydrocarbon radical terminally functionalized by Cl, Br, F, I, NH, OH, $NH_2$, $NHCH_3$ or SH;

(xiii) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, $NH_2$, $NHCH_3$ or SH;

(xiv) a $C_7$ to $C_{40}$ alkylaryl radical having at least one heteroatom selected from the group consisting essentially of O, N, S, and optionally substituted with at least one of the following:
  (a") a $C_2$ to $C_{25}$ straight-chain, branched hydrocarbon radical substituted with at least one of the following Cl, Br, F, I, NH, OH, $NH_2$, $NHCH_3$ or SH;
  (b") a $C_5$ to $C_{30}$ cycloaliphatic hydrocarbon radical substituted with at least one of the following Cl, Br, F, I, NH, OH, $NH_2$, $NHCH_3$ or SH
  (c") a hydroxyl;
  (d") an amine;
  (e") a thiol;

(xv) a polyether of the type —O—(—$R_7$—O—)$_n$—$R_8$ or block or random type —O—(—$R_7$—O—)$_n$—(—$R_{7'}$—O—)$_m$—$R_8$, wherein at least one of the following is true:
  (a''') $R_7$ is a linear or branched hydrocarbon radical having from 2 to 4 carbon atoms;
  (b''') $R_{7'}$ is a linear or branched hydrocarbon radical having from 2 to 4 carbon atoms; and
  (c''') wherein n is from 1 to 40; and
  (d''') $R_8$ is hydrogen, or a $C_5$ to $C_{30}$ straight-chain or branched hydrocarbon radical, or a $C_5$ to $C_{30}$-cycloaliphatic hydrocarbon radical, or a $C_6$ to $C_{30}$ aromatic hydrocarbon radical, or a $C_7$ to $C_{40}$ alkylaryl radical; and (xvi) a polyether of the type —O—(—$R_7$—O—)$_n$—C(O)—$R_8$ or block or random type —O—(—$R_7$—O—)$_n$—(—$R_{7'}$—O—)$_m$—C(O)—$R_8$, wherein at least one of the following is true:
  (a'''') $R_7$ is a linear or branched hydrocarbon radical having from 2 to 4 carbon atoms;
  (b'''') $R_{7'}$ is a linear or branched hydrocarbon radical having from 2 to 4 carbon atoms; and
  (c'''') wherein n is from 1 to 40; and
  (d'''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (D) at least one anion selected from the group consisting essentially of $F^-$; $Cl^-$, $Br^-$; $NO_3^-$; $N(CN)_2^-$; $BF_4^-$; $ClO_4^-$; $PF_6^-$; $RSO_3^-$; $RCOO^-$, where R is an alkyl group, substituted alkyl group, or phenyl group; $(CF_3)_2PF_4^-$; $(CF_3)_3PF_3^-$; $(CF_3)_4PF_2^-$; $(CF_3)_5PF^-$; $(CF_3)_6P^-$; $(CF_2SO_3^-)_2$; $(CF_2CF_2SO_3^-)_2$; $(CF_3SO_2^-)_2N^-$; $CF_3CF_2(CF_3)_2CO^-$; $(CF_3SO_2^-)_2CH^-$; $(SF_5)_3C^-$; $(CF_3SO_2)_3C^-$; $[O(CF_3)_2C_2(CF_3)_2O]_2PO^-$; $(CF_3(CF_2)_7SO_3^-$; and mixtures thereof, wherein the ionic liquid has a melting point of no more than about 100 degrees Celsius, a decomposition temperature of at least about 200 degrees Celsius, a viscosity of no more than about 200 Cp, an ionic conductivity of at least about 0.01 mS/cm, and an electrochemical window of at least about 4 Volts.

37. The battery of claim 31, further comprising a polymer host selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof, wherein a molar ratio of ionic liquid to polymer host ranges from about 0.1:1 to about 10:1, wherein the microporous membrane separator has a thickness from about 2 μm to about 200 μm and wherein the membrane separator is fully wettable by at least one of a hydrophobic and a hydrophilic ionic liquid.

\* \* \* \* \*